US012649226B2

(12) United States Patent
Doerksen et al.

(10) Patent No.: US 12,649,226 B2
(45) Date of Patent: Jun. 9, 2026

(54) STUD GAP MARKER FOR WALL BUILDING

(71) Applicants: Peter Doerksen, Seminole, TX (US);
Jethro Bennett, Liverpool (GB)

(72) Inventors: Peter Doerksen, Seminole, TX (US);
Jethro Bennett, Liverpool (GB)

( * ) Notice: Subject to any disclaimer, the term of this patent is extended or adjusted under 35 U.S.C. 154(b) by 230 days.

(21) Appl. No.: 18/032,962

(22) PCT Filed: Oct. 21, 2021

(86) PCT No.: PCT/IB2021/059705
§ 371 (c)(1),
(2) Date: Apr. 20, 2023

(87) PCT Pub. No.: WO2022/084903
PCT Pub. Date: Apr. 28, 2022

(65) Prior Publication Data
US 2023/0381946 A1 Nov. 30, 2023

(30) Foreign Application Priority Data
Oct. 21, 2020 (GB) ...................................... 2016666

(51) Int. Cl.
*G01B 3/1003* (2020.01)
*B25H 7/04* (2006.01)
*E04G 21/18* (2006.01)
*G01B 5/16* (2006.01)

(52) U.S. Cl.
CPC ........... *B25H 7/04* (2013.01); *E04G 21/1891* (2013.01); *G01B 3/1004* (2020.01); *G01B 5/16* (2013.01)

(58) Field of Classification Search
CPC ....... B25H 7/04; E04G 21/1891; E04G 21/18; G01B 3/1004; G01B 5/16; G01B 11/14; G01B 3/10
See application file for complete search history.

(56) References Cited

U.S. PATENT DOCUMENTS

| | | | | | |
|---|---|---|---|---|---|
| 4,149,320 A | * | 4/1979 | Troyer | ................. | G01B 3/1004 |
| | | | | | 33/758 |
| 4,301,596 A | * | 11/1981 | Sedlock | ................... | G01B 3/02 |
| | | | | | 33/494 |
| 4,367,590 A | * | 1/1983 | Winter | ..................... | G01B 3/02 |
| | | | | | 33/562 |
| 4,845,858 A | * | 7/1989 | Thomas | .............. | E04G 21/1891 |
| | | | | | 33/759 |
| 4,942,670 A | * | 7/1990 | Brandt | ................ | E04G 21/1891 |
| | | | | | 33/759 |
| 5,012,590 A | * | 5/1991 | Wagner | ............... | E04G 21/1891 |
| | | | | | 33/759 |

(Continued)

*Primary Examiner* — Yaritza Guadalupe-Mccall

(57) ABSTRACT

A method of stud positioning for wall building, comprises: lining a stud gap marker tape along a plate, the stud gap marker tape comprising a plurality of gap marks, visible on a top side of the tape, that define stud positions at repeating 8-inch intervals that may or may not be used for positioning a stud at, a centre of one of the stud positions being at a start of the plate, the stud gap marker tape thus being configured to facilitate both: stud positioning at each 16-inch interval taken from the start of the plate via using an interval of two said gap marks as a guide for stud positioning; and stud positioning at each 24-inch interval taken from the start of the plate via using an interval of three said gap marks as a guide for stud positioning.

20 Claims, 15 Drawing Sheets

(56) References Cited

U.S. PATENT DOCUMENTS

| | | | |
|---|---|---|---|
| 2007/0011959 A1* | 1/2007 | DeBene | E04G 21/1891 |
| | | | 52/167.3 |
| 2008/0010910 A1* | 1/2008 | Baij | E04B 2/706 |
| | | | 52/105 |
| 2023/0266110 A1* | 8/2023 | Hatzopoulos | G01B 3/006 |
| | | | 33/758 |
| 2023/0381946 A1* | 11/2023 | Doerksen | G01B 3/1004 |

* cited by examiner

18T

10

10

14    14

14    14

20

18B

10

14 14

P1

18b    18a

18

Fig 20
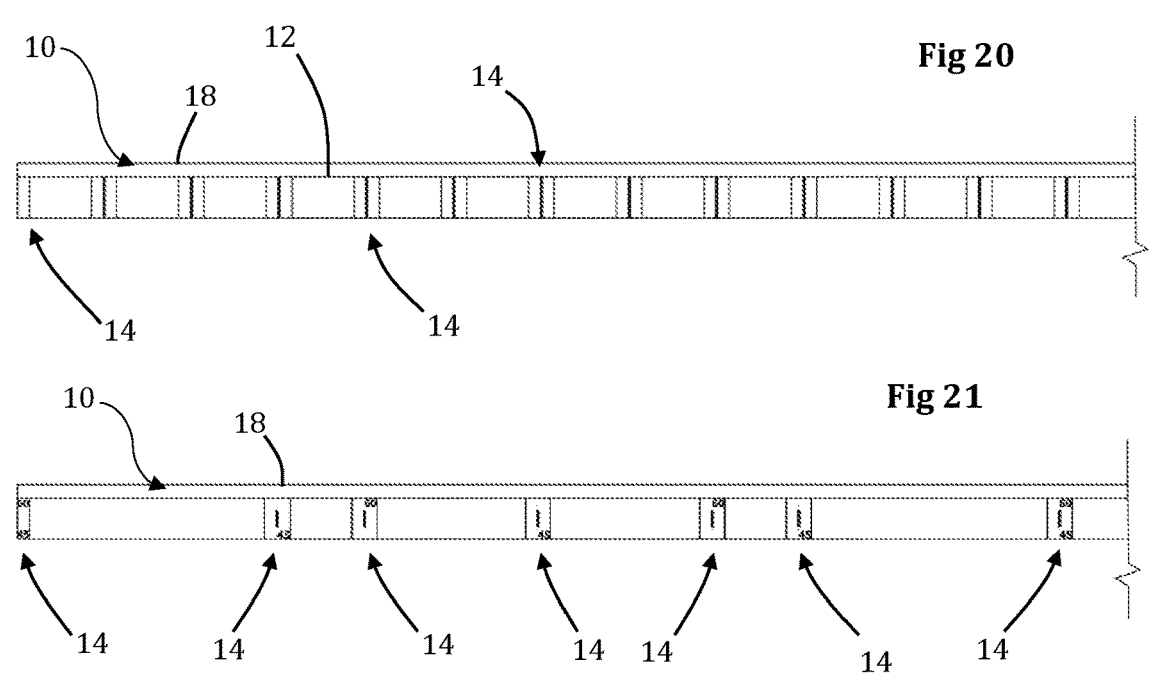
Fig 21
Fig 22
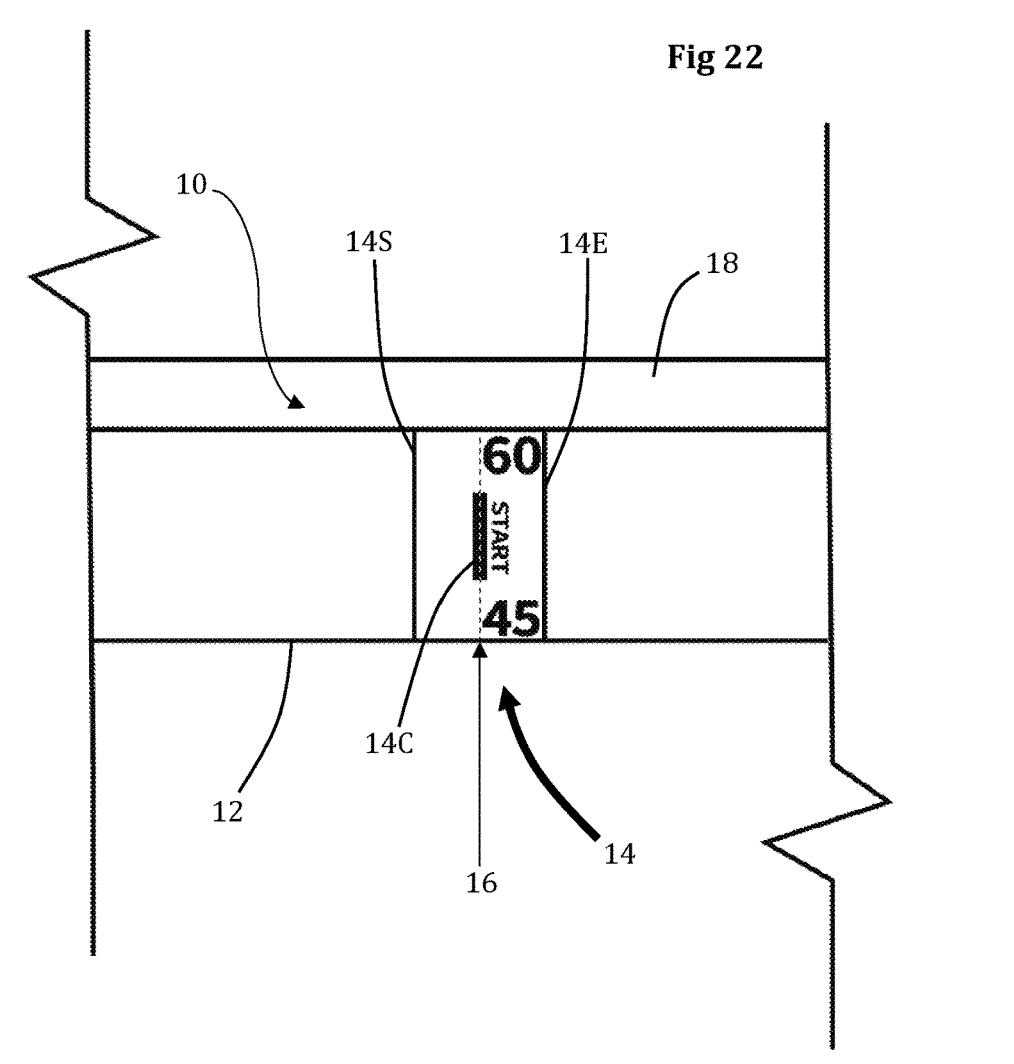

Fig 25

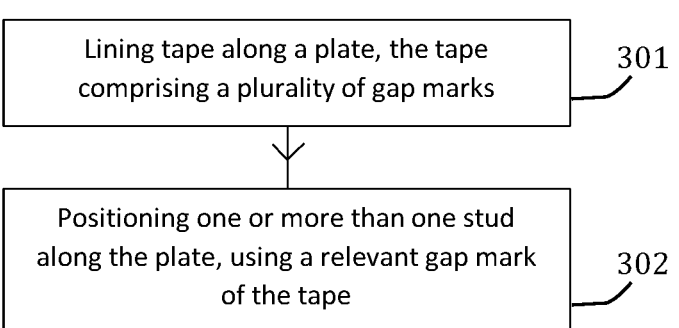

| Lining tape along a plate, the tape comprising a plurality of gap marks | 301 |

| Positioning one or more than one stud along the plate, using a relevant gap mark of the tape | 302 |

Fig 26

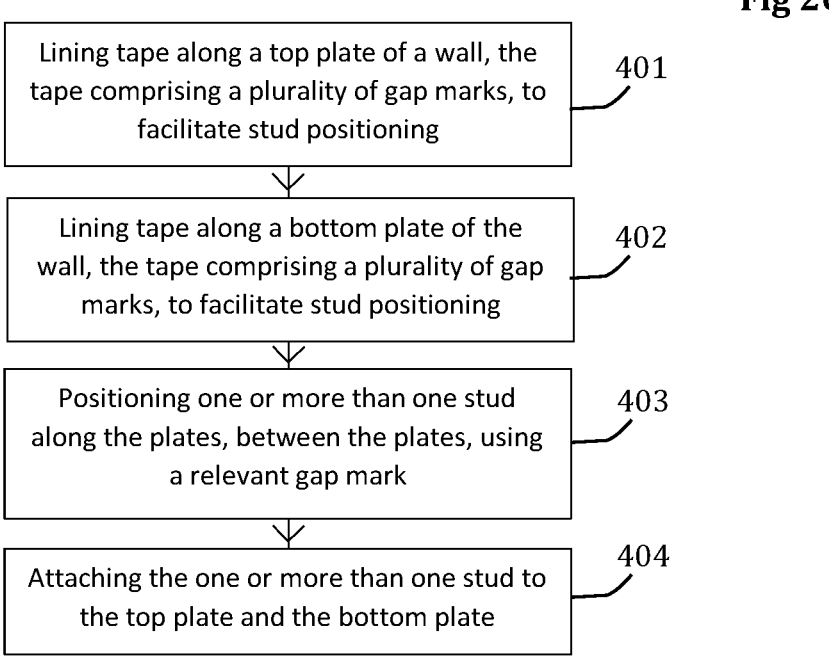

| Lining tape along a top plate of a wall, the tape comprising a plurality of gap marks, to facilitate stud positioning | 401 |

| Lining tape along a bottom plate of the wall, the tape comprising a plurality of gap marks, to facilitate stud positioning | 402 |

| Positioning one or more than one stud along the plates, between the plates, using a relevant gap mark | 403 |

| Attaching the one or more than one stud to the top plate and the bottom plate | 404 |

STUD GAP MARKER FOR WALL BUILDING

The present invention relates to marking stud gaps along a plate, to facilitate stud positioning, (and thus wall building). Disclosure is included of tape, comprising a plurality of gap marks, to facilitate stud positioning.

CROSS REFERENCE TO RELATED APPLICATIONS

The present application claims benefit of priority to British patent application GB2016666.6, filed 21 Oct. 2020, the disclosure of which is herein incorporated by reference, in its entirety.

Terms/Definitions

'Arrangement':

The term arrangement is a technical term which means a feature, or combination of features, (usually with a given purpose). For example, a 'measuring arrangement' is a feature or features, to facilitate measuring. A 'holding arrangement' is a feature or features, to facilitate holding.

'Feature':

The term 'feature' is a broad term that includes within its scope any feature under the Sun. A feature may, for example, be an element, body, member, or may even be an aperture (eg opening/hole/gap or the such like). Thus the term 'holding feature' includes within its scope, for example, any element, body, member, or even aperture, to facilitate holding. A 'feature' may also be a 'part' of a broader feature; for example, if a part of an invention is disclosed/claimed as comprising a 'padding feature', this does not limit the padding feature to being a separate feature that is added to the invention (eg a sponge element, adhered to the invention); the invention, for example, may have a part made of sponge, or have an inner sponge (or soft) layer—in such a case, if that part of the invention is clearly of a material/nature that provides padding, then this falls within a scope of what is defined in the present application as a 'padding feature'.

'Substantially':

It is known, to those with skill in the art of patenting, that the word 'substantially' can, in some instances, be used to broaden a term. It should be stated that, in the present application, use of the word 'substantially' with a term, to define a (characterizing) feature(s), gets all the benefit (ie the benefit of any broadening) afforded by use of the word 'substantially', and also includes within its scope the feature(s) being that term exactly, (without broadening). For example, if two features are described/defined in the present application as being 'substantially parallel', then that includes, within its scope, the features being 'close' to parallel (in so far as the word 'substantially' is deemed to broaden the term 'parallel'), and also includes within its scope the features being 'exactly' parallel).

'Velcro® ' and 'Velcro®-Type':

It will be known that the term 'Velcro®' has become synonymous (in layman's terms) for hook-and-hook, hook-and-loop, loop-and-loop, and all such similar attachment solutions. In the present application, where the term 'Velcro®' is used, in includes within its scope all of the above, and whatever solutions would be considered to be, from a layman's point of view, 'Velcro®'. Thus it is a broad term. The term 'Velcro®', or 'Velcro®-type', may be used, (in the disclosure generally, and may also be used in a claim(s)), and is thus a broad term which includes within its scope any solutions/features which would be considered, from a layman's point of view, to be 'Velcro®'.

'Attached' And 'Connected':

If a feature (or two features) are defined in a claim as being attached, that would include within its scope the feature (or two features) being permanently attached, (of course), and would also include within its scope the feature (or two features) being removably attachable, (because, if removably attachable, the feature (or two features) can be attached, and therefore, when attached, would be within a scope of being 'attached'). Furthermore, the feature (or two features) being defined in a claim as being 'attached' would also include within its scope the feature that is defined as being 'attached' being formed as one part with a portion or a whole of the other feature it is defined as being 'attached' to. For example, if a table leg is defined in a claim as being 'attached' to a table top, that would include within its scope the table leg being formed as one part with a whole of the table top (eg if the table leg and table top were formed as one piece of plastic, for example) and would also include within its scope the table leg being formed as one part with a portion (rather than a whole) of the table top (eg if the table top was formed of more than one part, and the table leg was formed as one part with a part of the table top, but not a whole of it). (It would also include within its scope a portion (rather than a whole) of the feature that is defined as being 'attached' being formed as one part with a portion (or a whole) of the other feature it is defined as being 'attached' to. Thus if the table leg had a separate top half and bottom half, for example, (that are attached together, in use), an embodiment where the top half of the leg is formed as one part with a portion (or a whole) of the table top would also be within a scope of the table leg being 'attached' to the table top). It should be noted, some (few) patent offices require structural connection/relationship terms (in claims), to define structural connection/relationship between features of the claim. With this in mind, (and if it should be required, although it often is not), the term 'connected', if used in a claim, is a broad term, which includes within its scope direct connection, and also includes within its scope indirect connection. ('Direct' connection would be where two features, for example, are directly connected to each other (eg an arm is 'directly' connected to a shoulder). 'Indirect' connection would be where two features, for example, are connected, but via intermediate feature(s) (eg a person's foot is 'connected' to their head, but 'indirectly', (via their leg, abdomen, torso, etc, which are 'intermediate features')). Where the term 'connected' is used in a claim, it includes within its scope 'direct' connection, and also includes within its scope 'indirect' connection. The term may be used in a claim, (and is deemed supported), whether 'direct' and/or 'indirect' connection embodiment(s) is (/are) disclosed in the present application, and, as stated, includes within its scope 'direct' connection, and also includes within its scope 'indirect' connection. Furthermore, if a feature(s) is (/are) defined as being 'connected', that would include within its scope the (or any—ie more than one of the said) feature(s) being removably attachable, if, when attached, the feature(s) is (/are) in a state of being 'connected', (directly or indirectly). Thus if a first feature is defined as being 'connected' to a second feature, it would include within its scope the first feature and/or the second feature being removably attachable, if, when attached, the first feature is connected to the second feature, (directly or indirectly). Furthermore, of course, (and similarly to the word 'attached'), if a feature (or two features) are defined in a claim as being 'connected' it would also include within its scope the feature that is defined as being 'connected' being formed as one part with a portion or a whole of the other feature it is defined as being 'connected' to.

'The or Each' and 'the or Any':

The term 'the or each' (either in disclosure and/or a claim) can refer back to a single feature/thing, and/or can refer back to a plurality of features/things. When the term is read as referring back to a plurality of features/things, it should be taken as meaning, and including within its scope, 'at least one, or more, or all (ie each)' of the said features/things. Thus, to give an example, if a square is referred to/disclosed that has four corners, if the term 'the or each corner' is used, it includes within its scope 'one of the corners, (or two, or three, or all of the corners)'.

When any one feature/thing is afforded any feature(s)/ definition in the present application, it is taken as read that, where a plurality of the said feature/thing is provided, 'the or each' said feature/thing may be provided/claimed comprising the said feature(s)/definition (ie at least one, or more or all). Similarly, wherever a plurality of the said feature/ thing are afforded any feature(s)/definition, it is taken as read that 'the or each' said feature/thing may be provided/claimed comprising the feature(s)/definition (ie at least one, or more, or all of the plurality), and/or that even just one said feature/thing may be provided/claimed comprising the fea-ture(s)/definition in an embodiment/claim wherein an inven-tion is defined as comprising 'a' (eg singular) said feature/ thing.

(The term 'the or any' may be used (again including within its scope, 'at least one, or more, or all (ie each)', instead of the term 'the or each').

'User Means':

It will be well known that, in certain patenting territories, (for example, the United States), use of the term 'means' or 'means for', if used in a (granted) patent claim, can be seen as a limiting term, limited to only giving the applicant/ proprietor of the patent protection of means that are dis-closed in the granted patent, or 'equivalent' means. This is not the case with the term 'user means' as it is used in the present application. The term 'user means' is a very broad term that is used in the field of product design/user-interface, and defines any means under the sun, provided for a user, for whatever action/result the user means is provided for. For example—a 'user means' to turn on a television could be provided by way of an ON/OFF button on the television. But it could also be provided by a button on a remote control which turns on the television when pressed. Both of these would fall (in the technical field of product design/user-interface) under the scope of the term 'user means' to turn on the television. Similarly, with certain inventions/prod-ucts, a 'user means' may be provided to 'initiate' an action, for example. Thus, in the present application, a claim that defines an invention which comprises a 'user means' for [a particular action/result] is not subject to any 'means for' limitations that certain patent office territories (such as the United States) may appropriate to the term 'means for', but should be read as (and given protection for, if granted) any means under the sun, provided for a user, for [that particular action/result defined]. 'User means' is a technical term in the field of product design/user-interface.

Reference to Multiple Similar Elements in Plural

In the present application, there may be provided/num-bered features wherein the same primary number is used, with a suffix. For example, a first side of the/an invention may be numbered 600', and a second side of the/an invention numbered 600". In any such case, (or where any other suffix is used, such as 'L' and 'R' to denote 'left' and 'right', or 'a' and 'b', for example), when such features are referred to together (ie 'the sides'), the plural may be numbered/ referred to with the primary number (without the suffix). Thus the first side 600' (or 600a, for example) and second side 600" (or 600b, for example) may, for example, be referred to simply as 'the sides 600'. Furthermore, if a side is referred to (not specifying which one of the sides), the primary number (ie 600, for example) may be used, without any suffix.

BACKGROUND

When building a wall, there is a top plate and a bottom plate, (usually made of wood), and studs (also usually pieces of wood) are attached, usually at regular intervals, at a perpendicular orientation, along the plate. The industry standard, (in America), is for the gaps between the studs to either be sixteen inches, or twenty four inches. (Most usually, the gaps are sixteen inches). It is important the gaps are correct, because boards (of a predetermined length) tend to be attached to (and between) the studs after the studs are in place. These boards tend to be, (in America), forty-eight inches. Therefore, if the studs are at sixteen inch gaps, the boards will be attached to every stud that is three sixteen inch gaps along, and if the studs are at twenty-four inch gaps, the boards will be attached to every stud that is two twenty-four inch gaps along. If the gaps are wrong, it may not be possible for the boards to be attached between the studs. The regular gaps are also useful because, if there is a problem with the wall, and if a person can locate where one of the studs is, they will then know where all the studs are, (due to the regular gaps). Therefore good accuracy tends to be required and/or be essential.

Presently, the only way to get the gaps/stud placement correct is to measure them, and mark them. This tends to be done with the basic implements of a tape measure, and a pencil. (Sometimes a framing square, (or the like), is used, to help mark the gaps the whole way across the plates). However, this process is relatively time consuming and cumbersome. Furthermore, the builder may have to get down on their hands and knees to do this, which is not ideal (and may even be challenging for those with injuries, and/or the elderly, etc). Furthermore, this requires two different tools (the tape measure and the pencil), or more. It would be desirable if a solution were provided that marked the gaps with far less (and preferably almost no) work, on behalf of the builder (or whoever is marking the gaps). This could allow the builder/person to move on to the next job, with little effort (and hopefully a large saving of time). It would also be desirable if a solution were provided that required less manual work for the builder/person, (and especially if it meant that they did not have to bend over (or even get down on their knees) so much, to mark the gaps.

If the builder/person is building the walls with the studs at sixteen inch gaps, (which is the American standard), they start by measuring from the start of one end of the plate. Because studs tend to be 1.5 inch thick in America, they will usually make a mark at 15.25 inches from that end of the plate, for where the stud will start, (so that the stud is 'centred' at sixteen inches). Marks will then be made along the plate so that each stud is spaced sixteen inches apart. This is often referred to as 'sixteen inch on centre'. A stud also tends to be positioned right at the start, and right at the end of the plate. Whilst sixteen inches is the standard, in America, sometimes the studs are positioned twenty four inches 'on centre'. Furthermore, it should be stated, in some areas of the United Kingdom for example, (and perhaps other territories), the standard is for studs to be positioned at 400 mm (40 cm) intervals, or 600 mm (60 cm) intervals. In Australia, for example, the standard is 450 mm (45 cm), or 600 mm (60 cm).

Thus standards may differ, in different territories.

SUMMARY

An invention(s) is defined by the accompanying claims, to which reference should now be made.

Examples of the present invention seek to provide a solution to any or all of the above problem(s) by providing, according to one aspect of what is invented: stud gap marker tape, comprising:

a strip element; and a plurality of gap marks, to facilitate stud positioning.

Preferably a plurality or all of the gap marks are at intervals that are a multiple of eight inches, or at intervals that are a multiple of twenty centimetres or, at intervals that are a multiple of fifteen centimetres. (Thus preferably there is provided stud gap marker tape, comprising: a strip element; and a plurality of gap marks, at intervals that are a multiple of eight inches, or at intervals that are a multiple of twenty centimetres or, at intervals that are a multiple of fifteen centimetres). (The term 'multiple' of eight inches here means any number that is directly divisible by eight. For example, eight, sixteen, and twenty-four are all within the scope of being a 'multiple of eight'. Similarly, the term 'multiple' of twenty centimetres here means any number that is directly divisible by twenty. For example, twenty, forty, and sixty are all within the scope of being a 'multiple of twenty').

Most preferably, preferably the intervals are eight inches, or the intervals are twenty centimetres. This is particularly beneficial, since, (referring to U.S. (American) standards now), whilst studs are usually positioned 'sixteen inch on centre', (at sixteen inches intervals), in some circumstances, they are positioned 'twenty-four inch on centre', (at twenty-four inch intervals). With the gap marks being at eight inch intervals, it means the tape can easily be used for either circumstance. For example, if the studs are being placed every sixteen inches, a stud can simply be placed for every two gap marks shown on the tape. (Two multiplied by eight inches is sixteen inches). Similarly, if studs are to be placed every twenty-four inches, a stud can simply be placed for every three gap marks shown on the tape. (Three multiplied by eight inches is twenty-four inches). However, it should also be stated, it is feasible embodiments could be provided where the intervals are sixteen inches. (This could, of course, be fine for when studs are to be placed every sixteen inches). Similarly, it should also be stated, it is feasible embodiments could be provided where the intervals are twenty-four inches. (This could, of course, be fine for when studs are to be placed every twenty-four inches). But because intervals of eight inches so easily facilitate stud placement at both sixteen inches or twenty-four inches, preferably the intervals are eight inches. Similarly, some in the United Kingdom, for example, (and perhaps some other territories), position studs at four hundred millimetre (forty centimetre) intervals, (and in some circumstances position studs at six hundred millimetre (sixty centimetre) intervals). With the gap marks being at twenty centimetre intervals, it means the tape can easily be used for either circumstance. For example, if the studs are being placed every forty centimetres, a stud can simply be placed for every two gap marks shown on the tape. (Two multiplied by twenty centimetres is forty centimetres). Similarly, if studs are to be placed every sixty centimetres, a stud can simply be placed for every three gap marks shown on the tape. (Three multiplied by twenty centimetres is sixty centimetres). However, it should also be stated, it is feasible embodiments could be provided where the intervals are forty centimetres. (This could, of course, be fine for when studs are to be placed every forty centimetres). Similarly, it should also be stated, it is feasible embodiments could be provided where the intervals are sixty centimetres. (This could, of course, be fine for when studs are to be placed every sixty centimetres).

Preferably a plurality or all of the gap marks mark a centre of a stud position defined by the gap mark.

Preferably a plurality or all of the gap marks mark a start and/or mark an end of a stud position defined by the gap mark. (This can be extremely useful, to help the user position the stud as perfectly as possible).

Preferably, the tape comprises a tearable area, configured for tearing, to facilitate tearing the strip element, across the strip element. (Preferably, the tape comprises more than one said tearable area, configured for tearing, to facilitate tearing the strip element, across the strip element).

Preferably, for at least one of the gap marks, there is a said tearable area, wherein a portion or a whole of the tearable area is within a stud position defined by the gap mark. (Preferably, for at least one of the gap marks, there is a said tearable area, wherein the whole of the tearable area is within a stud position defined by the gap mark).

Preferably, for a plurality or all of the gap marks, there is a said tearable area, wherein a portion or a whole of the tearable area is within a stud position defined by the gap mark. (Preferably, for a plurality or all of the gap marks, there is a said tearable area, wherein the whole of the tearable area is within a stud position defined by the gap mark).

Preferably, for at least one of the gap marks, there is a said tearable area, wherein a portion or a whole of the tearable area is at a centre of a stud position defined by the gap mark. (This includes within its scope a portion or a whole of the tearable area being aligned with the centre of the stud position defined by the gap mark. It should also be stated, this includes within its scope any part of the tearable area cutting across' the centre of the stud position defined by the gap mark. Thus if the tearable area and the centre of the stud position defined by the gap mark meet at any point(s), that would be within a scope of a portion or a whole of the tearable area being at a centre of a stud position defined by the gap mark).

(Preferably, for a plurality or all of the gap marks, there is a said tearable area, wherein a portion or a whole of the tearable area is at a centre of a stud position defined by the gap mark).

Preferably a portion or a whole of an underside of the strip element is adhesive, (ie 'sticky'), to facilitate sticking the strip element to a plate. (This allows the tape to function as, (and effectively 'be'), sticky tape). (Whilst other methods could be used, to attach the tape to a plate, this is particularly quick, simple, and effective, (and thus elegant)).

Preferably the stud gap marker tape is provided rolled up, as a roll of tape. (Thus it can take much the same form as sticky tape, for example, (that users may already be accustomed to)).

According to another aspect of what is invented, there is provided: a method of marking stud positions along a plate, for wall building, comprising: lining tape along a plate, the tape comprising a plurality of gap marks.

Preferably, the method comprises attaching the tape to the plate. (Preferably this is done via adhesion, a portion or a whole of an underside of the tape being adhesive).

Tape could be lined along both a top plate and a bottom plate of a wall. Thus there may be provided a method of marking stud positions along a top and bottom plate of a wall, comprising: lining tape along the top plate; and lining tape along the bottom plate; wherein the tape comprises a plurality of gap marks on a top side of the tape. Stud(s) can then be positioned and attached to the top and bottom plate, (as part of a method for building a wall).

It will be apparent that lining the top plate and lining the bottom plate can be done separately, (ie lining a first length of tape along the top plate, and lining a second length of tape along the bottom plate), and it will be apparent that the tape provides an elegant way to mark the plates, to facilitate stud positioning. However, in an even more preferred method, (which may allow for even more quick marking, (and even more quick wall building), preferably the top plate and the bottom plate are marked simultaneously, using one length of tape. This can be done by positioning the top and bottom plate next to each other, and lining tape along the plates simultaneously, with one length of tape. The tape can then be 'broken', (which is a broad term, including within its scope, for example, cutting the tape). Thus a portion can be left, lined along the top plate, and a portion left lined along the bottom plate. Stud(s) can then be positioned, and attached to the top and bottom plate, (as part of a method for building a wall).

(The method may draw upon any of the disclosure relating to the stud gap marker tape).

According to another aspect of what is invented, there is provided an apparatus that marks gap marks along a plate, to facilitate stud positioning.

Preferably the apparatus is electronic.

Preferably the apparatus comprises an electronic interface. Thus the user may be able to choose how they want the plate marked, (via the electronic interface).

Preferably the apparatus is able to mark the plate by laser.

(The machine may comprise a gap marker that this slidable in position. This may be important, to facilitate marking the plate, across the plate).

The apparatus may comprise a side guide. (This may be useful/important, to stop the apparatus veering off-track, as it moves along the plate).

(Note: This aspect of what is invented, (relating to a stud gap marking apparatus), may draw upon any of the disclosure relating to the stud gap marker tape, in terms of the fact the apparatus may be able to create gap marks with any of the same feature(s), and/or at any of the same intervals, etc, as what is disclosed with reference to gap marks of the tape. Thus the apparatus may be able to mark gap marks in any of the gap mark configurations disclosed with reference to the stud gap marker tape).

BRIEF DESCRIPTION OF THE DRAWINGS

Examples of the present invention will now be more particularly described, with reference to the accompanying drawings, by way of example only, in no way limiting a scope of the invention, in which:

FIG. 20 is a cut-off view, directly from above, of another embodiment of stud gap marker tape, along a plate, where the gap marks are at fifteen centimetre intervals;

FIG. 21 is a cut-off view, directly from above, of another embodiment of stud gap marker tape, along a plate, that is shown facilitating options of stud positioning at forty-five centimetres on centre, or sixty centimetres on centre;

FIG. 22 is a close-up cut-off view of a portion of the tape shown in FIG. 21, showing a gap mark that defines a stud position, whether the user is positioning studs at forty-five centimetre intervals, or sixty centimetre inch intervals;

FIG. 25 is a basic flowchart, showing a basic method of positioning stud(s) along a plate, using tape that has gap marks;

FIG. 26 is a basic flowchart, showing a basic method of building a wall, using tape that has gap marks.

Figure 1:
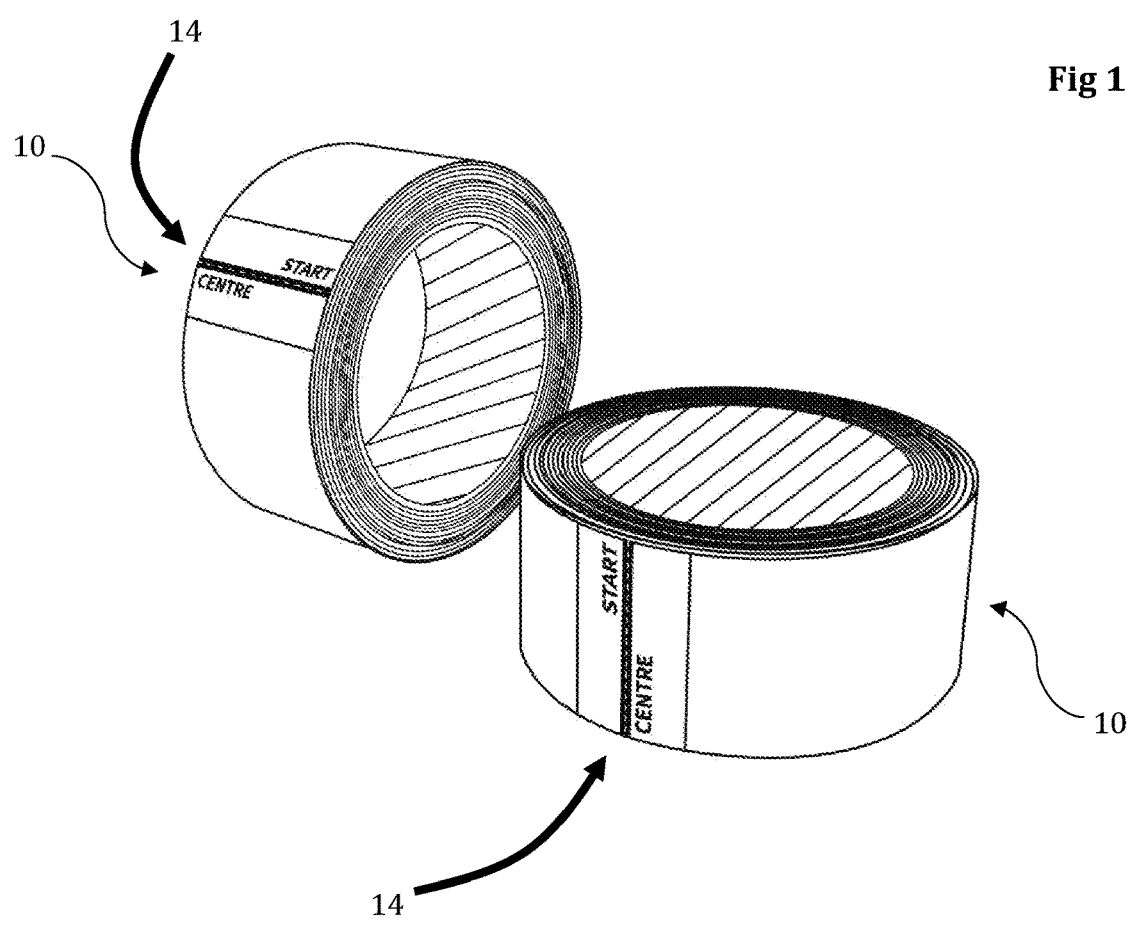
FIG. 1 is a view of an embodiment of stud gap marker tape, provided rolled up, as a roll of tape, (showing two rolls)

Note: At some patent offices, when claim(s) are allowed for patent, it is required that Figures that do not show all the feature(s) of the/an invention claimed (and/or that are not within a scope of what is claimed) are denoted as 'not being claimed' or 'not within a scope of what is claimed' (or words to that effect). Even in such case, it will be apparent that such Figure(s) may or do show feature(s) that are essential, or preferable and/or optional, to the/an invention claimed, which will be apparent, in light of the disclosure. Thus such Figure(s) (and/or disclosure related to such Figure(s) and/or embodiment(s)), should nevertheless be considered relevant to the/an invention claimed.

DETAILED DESCRIPTION

Referring to the drawings, there is shown stud gap marker tape 10, comprising: a strip element 12; and a plurality of gap marks 14, to facilitate stud positioning.

In the drawings, there can be seen a plurality of gap marks 14 visible on a top side of the strip element 12. (Note: The term 'top side', (and 'underside'), (of the strip element), is interpreted in terms of 'use', (ie along the plate). For example, looking at FIG. 5, for example, (and many other Figures also show this well), it is clear that the example gap marks 14 are visible on the top side of the strip element. In those Figures, what is deem the 'underside' of the strip element is shown engaging a plate. Thus, because the term 'top side', (and 'underside'), (of the strip element), is interpreted in terms of 'use', it is technically feasible that, looking at FIG. 1, for example, the gap marks could be on the other side from the side that they are shown in FIG. 1, (provided that, in use, the gap marks are visible on the top side of the strip element). For example, (simply to provide an example, by way of example only), looking at FIG. 1, if an embodiment was provided that was extremely similar, but the gap marks were on the other side of the tape, (and, for example, the side of the tape that we see, in FIG. 1, was, (for example), covered in a removable covering element(s), that could be removed, and the tape could then be stuck down to a plate on that side, that, (provided simply by way of example only), would be an example of the gap marks being visible on a top side of the strip element, (because the term 'top side', (and 'underside'), (of the strip element), is interpreted in terms of 'use').

It should be also made clear, whilst, in the example embodiments, the gap marks are provided at a top of the strip element, it should be stated, it is feasible, (if (relevant portion(s) or a whole of) the strip element was sufficiently transparent), that gap mark(s) could be provided at an underside of the strip element, and yet still be visible on the top side of the strip element, (and thus would be within a scope of being 'visible on a top side' (of the strip element)). It is even feasible, (although it may add manufacturing challenges), that gap mark(s) could be provided 'within' the strip element, (ie not at the top of the strip element, nor at the bottom, but 'within', and, (again if (relevant portion(s) or a whole of) the strip element was sufficiently transparent), could still be visible on the top side of the strip element, (and thus would be within a scope of being 'visible on a top side' (of the strip element)). Thus various options and/or embodiments are possible, within a scope of there being gap marks that are visible on the top side of the strip element.

Preferably a plurality or all of the gap marks are at intervals that are a multiple of eight inches; or intervals that are a multiple of twenty centimetres; or intervals that are a multiple of fifteen centimetres. (Thus preferably there is provided stud gap marker tape 10, comprising: a strip element 12; and a plurality of gap marks 14, visible on a top side of the strip element, at intervals that are a multiple of eight inches; or at intervals that are a multiple of twenty centimetres; or at intervals that are a multiple of fifteen centimetres).

Figure 6:
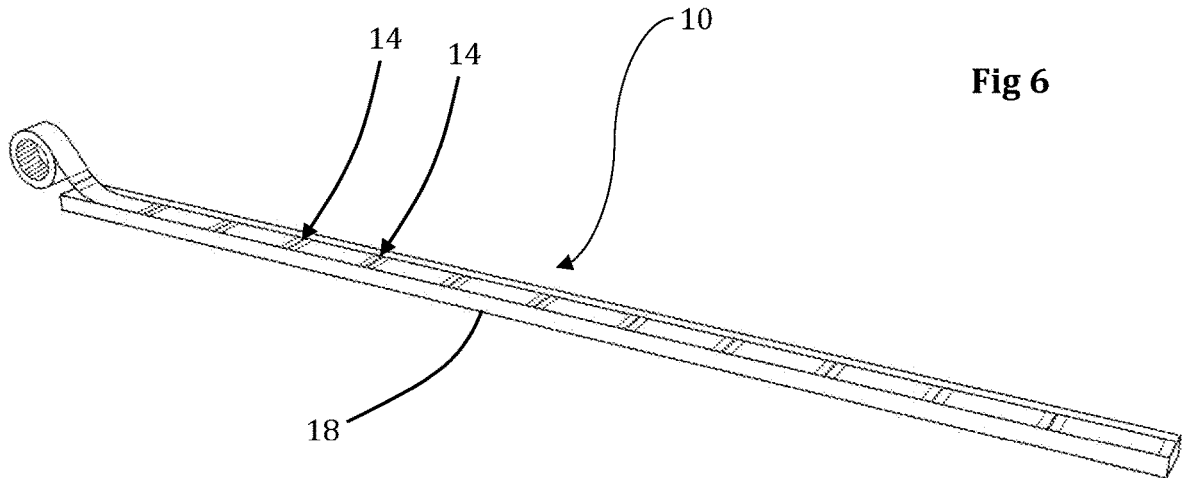
FIG. 6 is a perspective view, from a greater distance than the view of FIG. 5, now showing tape almost having been stuck along the whole of the example plate.

Preferably a plurality or all of the gap marks are at intervals of eight inches; or at intervals of twenty centimetres; or at intervals of fifteen centimetres. (The reason for this is that, by American standards, studs are positioned at sixteen inch gaps, (or sometimes twenty-four inch gaps). Both of those, (of course), are multiples of eight inches. (Sixteen inches is two times eight inches; Twenty-four inches is three times eight inches). Thus, by the gap marks being at eight inch intervals, they can mark both options, (ie sixteen inches, (via two gap mark intervals), and twenty-four inches, (via three gap mark intervals). Thus, (looking at FIG. 6, for example), if the gap marks are at eight inch intervals, it will be very easy for a user to place studs at two gap mark intervals, (thus giving a result, (as can be seen by virtue of looking at FIG. 6), of studs at sixteen inches on centre). And if they happen to be wanting to position studs at twenty-four inch gaps, then it will be very easy for a user to place studs at three gap mark intervals, (thus giving a result, (as can be seen by virtue of looking at FIG. 6), of studs at twenty-four inches on centre). Thus what is shown in FIG. 6 is an extremely good solution, to achieve either option. (Some, in the United Kingdom, (and possibly other territories), may position studs at 400 mm, (ie 40 cm), gaps, (or 600 mm, (ie 60 cm), gaps. These measurements, (40 cm and 60 cm), are extremely similar to sixteen inches and twenty-four inches, (and have the same ratio to each other—ie twenty-four inches is one and a half times (ie 150%) of sixteen inches, and ie sixty centimetres is one and a half times (ie 150%) of forty centimetres. Thus, again looking at FIG. 6, exactly the same as what had been stated for if the gap marks were at eight inches would be the case, if the gap marks were at 20 cm). (With regards to gap marks being at fifteen centimetre intervals, this may be useful for Australian standards, for example, where studs tend to be positioned at 450 mm, (ie 45 cm), gaps, (or 600 mm, (ie 60 cm), gaps. Thus, similarly to as explained with regard to sixteen and twenty-four being multiples of eight, (and forty (centimetres) and sixty (centimetres) being multiples of 20 (centimetres), so 45 cm and 60 cm are multiples of 15 cm. Thus, a plurality or all of the gap marks may be at intervals of fifteen centimetres. Thus, if the user was placing studs at 45 cm gaps, they could do this via placing a stud at every three gap mark intervals, (15 cm times three is 45 cm). And if they happened to want to places studs at 60 cm gaps, they could do this via placing a stud at every four gap mark intervals, (15 cm times three is 45 cm). Thus, in such way, again, the same tape could facilitate either option.

However, embodiments may be provided wherein a plurality or all of the gap marks are at intervals of sixteen inches; or at intervals of forty centimetres; or at intervals of forty-five centimetres. Similarly, embodiments may be provided wherein a plurality or all of the gap marks are at intervals of twenty-four inches; or at intervals of sixty centimetres.

Preferably a plurality or all of the gap marks mark a centre of a stud position defined by the gap mark. (Examples of this are shown, for example, in all of FIGS. 1 to 24, except for FIGS. 14, 15, 16 and 24, which do not mark the centre of the stud position defined by the gap mark).

(Examples are shown in the Figures of gap marks that comprise a centre mark 14C, to mark the centre of the stud position defined by the gap mark. (The 'C' here, (in '14C'), is short for 'centre')).

(Note: In the present application, the term 'a plurality or all' includes within its scope 'two', (ie more than one), and any amount more than this, (if there are more than two of what is being described), including, of course, 'all' of what is being described. It also includes within its scope, (and is deemed support for a claim for), any of the following: 'at least half;' more than half; 'most'. This statement is here clearly made, so as not to have to repeat it every time the term 'a plurality or all' is used. (Note: Whilst the term 'or' is used in 'a plurality or all', it will be apparent that 'all' will also be 'a plurality' of a plural amount of things. To make clear, 'all' is within a scope of 'a plurality or all'). (Similarly, the term 'a portion or a whole', of course, includes within its scope a 'portion', and includes within its scope a 'whole'. It also includes within its scope, (and is deemed support for a claim for), any of the following: 'at least half;' more than half; 'most'. This statement is here clearly made, so as not to have to repeat it every time the term 'a plurality or all' is used)).

Note: With reference to the term 'stud position' in the present application, it will be apparent, (especially looking at any of FIGS. 8, 9, 10, and 17), that embodiments can be provided where there are gap marks that may not be 'used', (ie where a stud is not positioned, when the wall is built). This is particularly relevant, for example, if the gap marks are at eight inch (or 20 cm) intervals, for example, with the studs then being positioned at sixteen inch (or 40 cm) intervals, (or at twenty-four inch (or 60 cm) intervals).

Figures 8, 9:
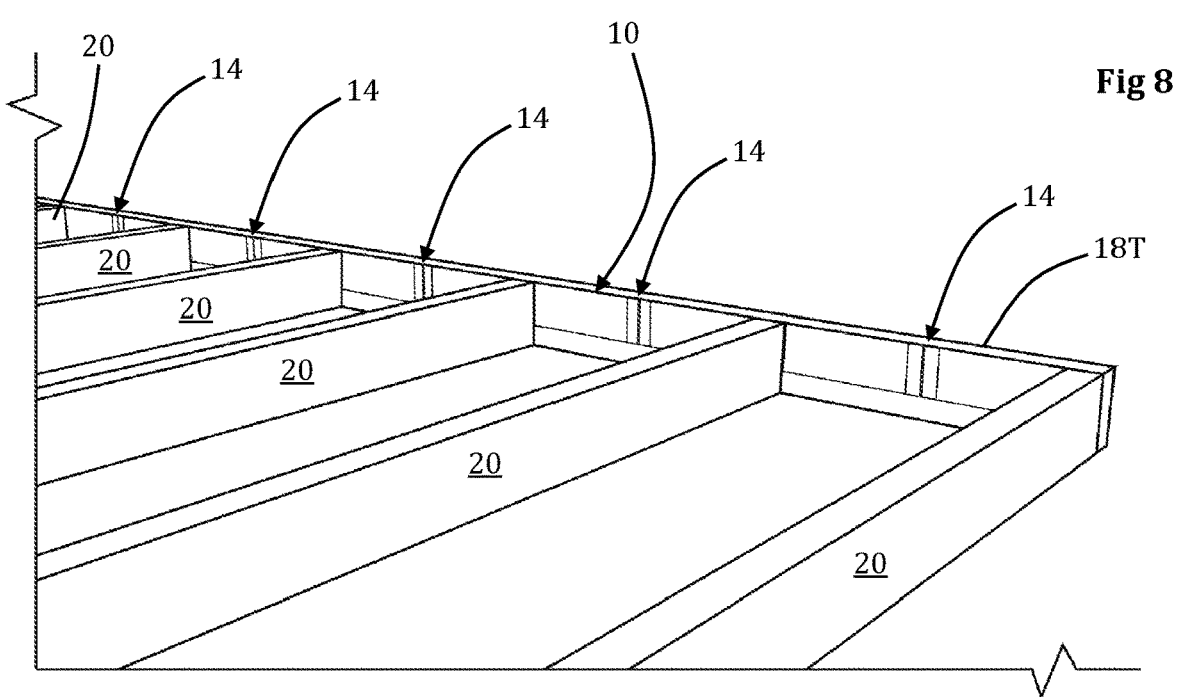
FIG. 8 is a perspective view, now showing, as is common when building a wall in this way, the plates having been placed on the floor, facing each other, (only one of the plates being visible, in the view shown), and showing studs having been placed at sixteen inch intervals, (often referred to as 'sixteen inch on centre'), by placing then two gap marks apart, (the gap marks being eight inches apart)
FIG. 9 is a close-up view of what is shown in FIG. 8, showing how an example start mark and/or end mark can be extremely useful, in positioning the studs as perfectly as possible.
Figure 16:
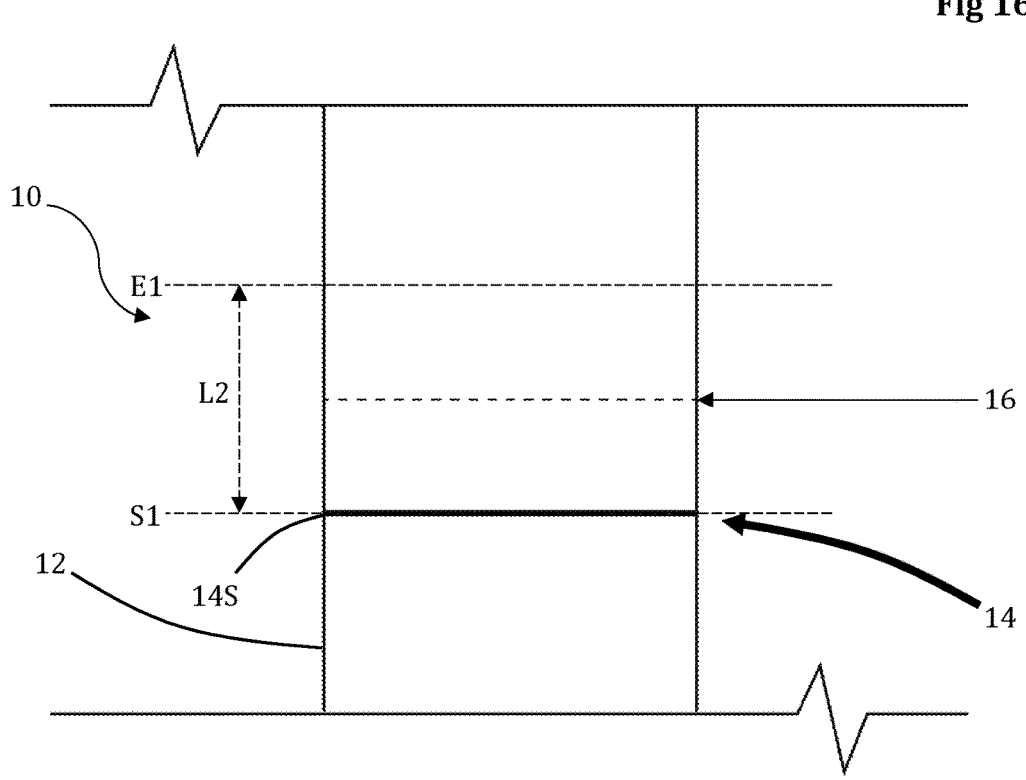
FIG. 16 is a cut-off close-up view, directly from above, showing an example of a gap mark within a scope of wherein the gap mark comprises a start mark and/or an end mark, (the example comprising a start mark but not an end mark), but does not comprise a centre mark.

(Example studs 20 are shown in FIGS. 8, 9, 10 and 17). A good example of this is the example of FIG. 8, where the gap marks 14 are at eight inch intervals, and the studs are positioned sixteen inches on centre. Thus the studs are positioned at two gap mark intervals. (Eight inches multiplied by two is sixteen inches). (Five gap marks 14 can clearly be seen, in the view of FIG. 8, that are 'not used' for a stud to be positioned there. For the sake of the present application, these are nevertheless considered to be 'phantom' stud positions. (The stud positions defined by gap marks that are actually used, (with a stud positioned there), for the sake of the present application, are considered 'actual' stud positions. (Therefore we have the terms 'phantom' stud position, and 'actual' stud position). However, it should be made clear, for the sake of the present application, whether a stud position is a 'phantom' stud position, or an 'actual' stud position, it is nevertheless considered to be within a scope of the term 'stud position'. Therefore, whether a gap mark is ultimately going to be used for a stud to be positioned at or not, it is considered, for the sake of the present application, to define a 'stud position'. Thus, even the five gap marks in FIG. 8 that can be seen not being used for a stud to be positioned at, (ie being 'phantom' stud positions), are still considered to be gap marks that 'define a stud position'. Thus the term 'stud position' is used broadly, and every gap mark shown in the Figures is deemed to define a 'stud position'. The term is therefore used in a 'potential' sense. To make clear what the definition of 'stud position' is, lines S1, (the 'S' standing for 'start', with reference to start of the stud position the gap marks defines), E1, (the 'E' standing for 'end', with reference to end of the stud position the gap marks defines) and L2, in FIG. 16, are helpful. First, it should be noted, in American wall building, for example, lumber that is termed '2 by 4', (which is in fact 3.5 inches by 1.5 inches), or lumber that is termed '2 by 6', (which is in fact 5.5 inches by 1.5 inches), tends to be used. Now looking at FIG. 15, lines S1 and E1 (and double arrowed line L2) demonstrate the confines of the stud position that the example gap mark defines. Line L2, in this example, (with reference to the lumber mentioned, (ie '2 by 4' lumber, or '2 by 6' lumber), is 1.5 inches in length, (to match the lumber). Thus the stud position defined by the gap mark here is 1.5 inches long, (as the stud, (whether it be a '2 by 4', (which is in fact 3.5 inches by 1.5 inches), or a '2 by 6', (which is in fact 5.5 inches by 1.5 inches), is 1.5 inches thick. Thus if the stud is 1.5 inches thick, the stud position defined by the gap mark, from start to end of the stud position, is 1.5 inches. (Note how lines S1 and E1 bisect the example start mark and example end mark in the example of FIG. 15. This is because, in the example of FIG. 15, the example start mark is 'centred' on the start of the stud position. (And, in the example of FIG. 15, the example end mark is 'centred' on the end of the stud position). Thus if the example start mark and example end mark are 2 mm thick, for example, there would be 1 mm of the start mark either side of where the stud position starts, and 1 mm of the end mark either side of where the stud position ends. It can be seen, in the close-up view of FIG. 9, how this can be useful. In FIG. 9, (if viewed closely), it can be seen that, with the stud correctly positioned, (as is shown), a small amount of the example start mark can be seen. (In the example, this is the same for the end mark, which cannot be seen in FIG. 9, due to the angle/view shown). This can be useful, for visualization purposes, to help the user line up the stud, and position it correctly, (exactly sixteen inch on centre, in the example). However, it should also be stated, a start mark, rather than being 'centred' on the start of the stud position, may start (or terminate) at the start of the stud position. Thus, looking at the example of FIG. 15, for example, the example start line 14S, rather than being 'centred' on the start of the stud position the gap mark defines, (with line S1 shown bisecting the example start mark), could terminate at the start of the stud position defined by the gap mark, (ie could terminate at line S1). (This could be done either from the start mark being outside the confines of the stud position, (ie 'outside' line S1), and then terminating at the start of the stud position, (ie terminating at line S1), or from the start mark being 'inside' the confines of the stud position, (ie 'inside' line S1), and then terminating at the start of the stud position, (ie terminating at line S1). It will be apparent that any of these options could/would be effective, at providing guidance for a user, to line up a stud. Thus any of these options could/would be effective, to facilitate stud positioning. (Note: All the disclosure here, (or anywhere else in the application), afforded to the/a start mark may, of course, also be afforded to the/an end mark, (and vice versa)). (It should also be stated that, whilst whatever disclosure here, (or anywhere else in the application), is provided, relating to a start mark (and/or end mark) may more broadly be afforded to how a gap mark marks a start of a stud position defined by the gap mark, (and/or how a gap mark marks an end of a stud position defined by the gap mark, (since it has been established, (eg via the example of FIG. 14), that a gap mark can mark a start of the stud position defined by the gap mark, without a start mark, (and can mark an end of the stud position defined by the gap mark, without an end mark). Thus the same disclosure, (relating to whether the start mark 'terminates' at the start of the stud position defined by the stud mark, or not), is also afforded, broadly, to any gap mark that marks the start of the stud position defined by the stud mark. So, similarly, the same disclosure, (relating to whether the end mark 'terminates' at the end of the stud position defined by the stud mark, or not), is also afforded, broadly, to any gap mark that marks the end of the stud position defined by the stud mark. Thus, for example, the example gap mark in FIG. 14, for example, may 'terminate' at the start of the stud position defined by the gap mark, or, (similar to what is shown in FIG. 9, for example), may go beyond the start of the stud position defined by the gap mark, (eg by 1 mm, (or 2 mm, for example). (So the same is the case for the end of the stud position. Thus, for example, the example gap mark in FIG. 14, for example, may 'terminate' at the end of the stud position defined by the gap mark, or, (similar to what is shown in FIG. 9, for example), may go beyond the end of the stud position defined by the gap mark, (eg by 1 mm, (or 2 mm, for example)). It will be apparent, (eg from looking at FIG. 9, that this could be used effectively, to facilitate stud positioning. Thus, if the example gap mark of FIG. 14 goes outside the confines of the start of the stud position it defines, (eg by 1 mm, for example), and goes outside the confines of the end of the stud position it defines, (eg by 1 mm, for example), it is still considered to be within a scope of being a gap mark that marks a start of the stud position defined by it, and that marks an end of the stud position defined by it, (because it is clearly 'acting as a guide', (for lining up the start of the stud with the start of the stud position, and the end of the stud with the end of the stud position). (It should also be stated, it is even possible a gap mark could be provided that comprises a start mark that is wholly within the confines of the stud position, and does not 'reach' the start of the stud position defined by the gap mark. For example, looking at the example gap mark of FIG. 15, for example, if it is imagined that the start mark and the end mark were moved several millimetres, for example, inside the confines of the stud position, so that they were wholly within the stud position the gap mark defined, (ie wholly within what is defined by line L2, in FIG. 15), and that, for example, there is a gap of 2 mm, for example, between the start mark and line S1, (and a gap of 2 mm, for example, between the end mark and line E1), then, looking at FIG. 17, for example, it will be apparent such a start mark and end mark, (and the gap mark as a whole), could be effectively used, for lining up a stud. Because the start mark 'acts as a guide', in such an example), (to lining up the start of the stud with the start of the stud position), such a gap mark that comprises such a start mark is considered within the scope of being a gap mark that marks a start of the stud position defined by the gap mark. Similarly, because the end mark, (in such an example), 'acts as a guide', (to lining up the end of the stud with the end of the stud position), such a gap mark that comprises such an end mark is considered within the scope of being a gap mark that marks an end of the stud position defined by the gap mark. However, it should also be stated, a start mark could even be provided that was outside of the confines of the stud position defined by the gap mark, and does not even 'reach' the start of the stud position defined by the gap mark, (ie is not at all within the confines of the stud position. For example, looking at the example start mark and end mark in FIG. 15, if the start mark was positioned just outside the confines of the start of the stud position, (ie outside the confines of what is defined by line L2), eg by 1 mm, for example, (or 2 mm, for example), and if the end mark was positioned just outside the confines of the end of the stud position, (ie outside the confines of what is defined by line L2), eg by 1 mm, for example, (or 2 mm, for example), it will be apparent that the user could use such a start and end mark, to centre the stud between them, (leaving the 1 mm (or 2 mm, for example) gap on each side of the stud, between the start of the stud and the start mark, and the end of the stud and the end mark, and this could successfully be used, to facilitate stud positioning. Thus, because the start mark, (in such an example), 'acts as a guide', (to lining up the start of the stud with the start of the stud position), such a gap mark that comprises such a start mark is considered within the scope of being a gap mark that marks a start of the stud position defined by the gap mark. Similarly, because the end mark, (in such an example), 'acts as a guide', (to lining up the end of the stud with the end of the stud position), such a gap mark that comprises such an end mark is considered within the scope of being a gap mark that marks an end of the stud position defined by the gap mark. Thus various options and/or embodiments are possible. (Thus a gap mark may, or may not, be the same size as the stud position it defines, (and this will be extremely clear, not only in light of the textual disclosure in the present application, but in light of the Figures, (eg FIG. 16, for example, (and also as explained, with reference to what is shown in FIG. 9)))). (It should also be stated, a gap mark embodiment could be provided with an extremely thick centre mark, (eg much thicker than the example centre mark 14C in FIG. 2, for example), which, by itself, (even without a start mark or end mark, for example), could be significantly more helpful to a user in lining up (and positioning) a stud 'perfectly', compared to just a thinner centre mark, for example.

Preferably a plurality or all of the gap marks mark a start of a stud position defined by the gap mark. (Examples of this are shown, for example, in all of FIGS. 1 to 24).

(Examples are shown in the Figures of gap marks that comprise a start mark 14S, to mark the start of the stud position defined by the gap mark. (The 'S' here, (in '14S'), is short for 'start')).

Preferably a plurality or all of the gap marks mark an end of a stud position defined by the gap mark. (Examples of this are shown, for example, in all of FIGS. 1 to 17, except FIG. 16, which shows a gap mark that marks the start of the stud position defined by the gap mark, but does not mark the end of the stud position defined by the gap mark).

(Examples are shown in the Figures of gap marks that comprise a start mark 14E, to mark the end of the stud position defined by the gap mark. (The 'E' here, (in '14E'), is short for 'end)).

Figure 14:
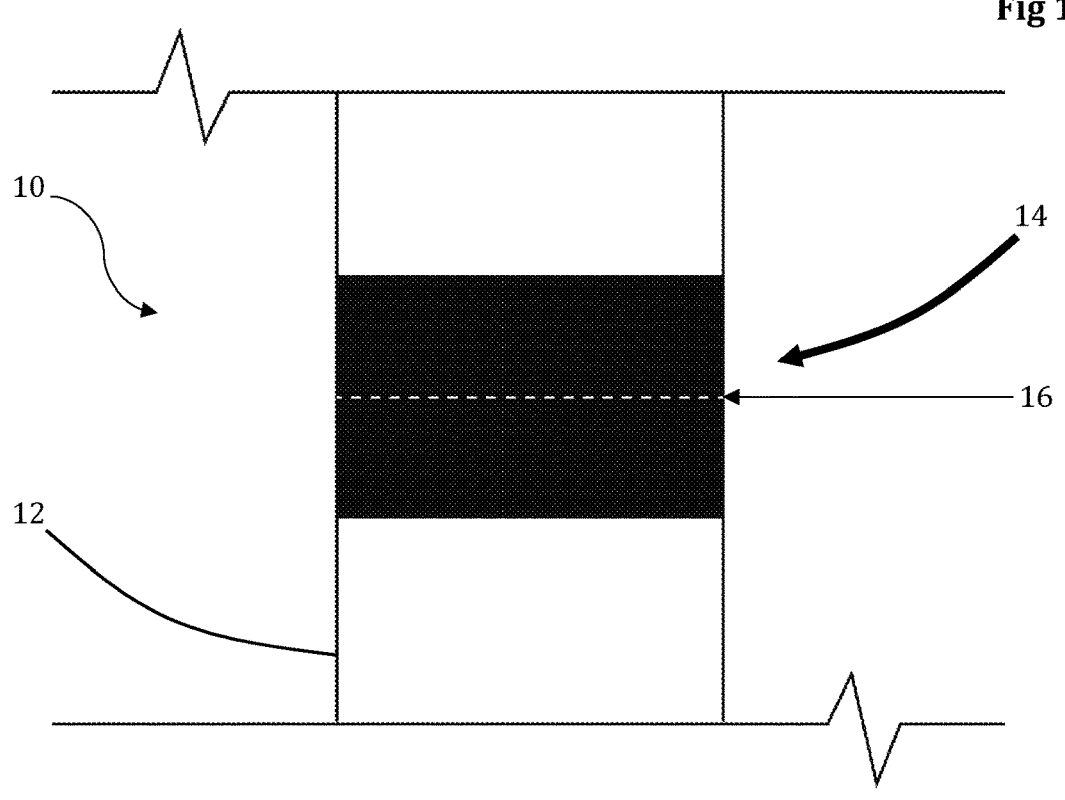
FIG. 14 is a cut-off close-up view, directly from above, showing an example embodiment of a gap mark that does not have a start mark or an end mark, but nevertheless marks the start and end of a stud position that the gap mark marks.
Figure 15:
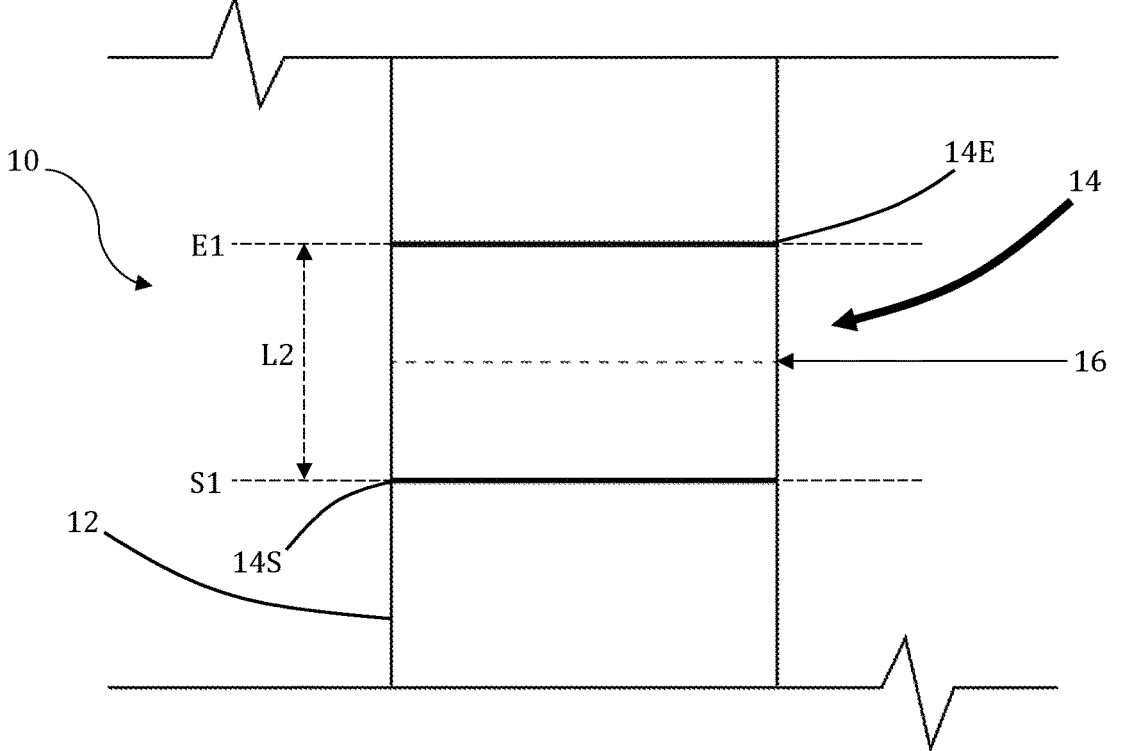
FIG. 15 is a cut-off close-up view, directly from above, showing an example of a gap mark within a scope of wherein the gap mark comprises a start mark and/or an end mark, (the example comprising both a start mark and an end mark), but does not comprise a centre mark.

(Note: Whilst example start marks 14S, centre marks 14C, and end marks 14E are shown in the Figures, it should be stated that there are times where a dedicated 'mark' is not required, for a given purpose. For example, FIG. 14 shows an example that marks the start of the stud position defined by the gap mark, (but does not comprise a 'start mark' 14S, per se). The example gap mark of FIG. 14 also marks the end of the stud position defined by the gap mark, (but does not comprise an 'end mark' 14E, per se). Thus the examples are provided by way of example only, and it will be apparent that various options and/or embodiments are possible).

Preferably, a plurality or all of the gap marks that mark the centre of the stud position also mark at least one of: a start of the stud position defined by the gap mark; an end of the stud position defined by the gap mark. (Examples of this are shown in FIGS. 1 to 13, and FIGS. 17 to 23, for example). (Examples are clearly shown of gap marks that mark the centre of the stud position, and also mark the start of the stud position defined by the gap mark. (Examples of this are shown in FIGS. 1 to 13, and FIGS. 17 to 23, for example). Examples are clearly shown of gap marks that mark the centre of the stud position, and also mark the end of the stud position defined by the gap mark. (Examples of this are shown in FIGS. 1 to 13, and FIGS. 17 to 23, for example). (Of course, embodiments may be provided wherein a plurality or all of the gap marks that mark the centre of the stud position also mark the start of the stud position defined by the gap mark, but do not mark the end of the stud position. Similarly, it is feasible embodiments may be provided wherein a plurality or all of the gap marks that mark the centre of the stud position also mark the end of the stud position defined by the gap mark, but do not mark the start of the stud position).

Preferably a plurality or all of the gap marks that mark the centre of the stud position also mark: a start of the stud position defined by the gap mark; and an end of the stud position defined by the gap mark. (Examples of this are shown in FIGS. 1 to 13, and FIGS. 17 to 23, for example).

Preferably a plurality or all of the gap marks mark at least one of: a start of a stud position defined by the gap mark; an end of the stud position defined by the gap mark. (Examples of this are shown in FIGS. 1 to 24, for example). (Preferably, a plurality or all of the gap marks mark a start of a stud position defined by the gap mark; and an end of the stud position defined by the gap mark. (Examples of this are shown in FIGS. 1 to 24, for example, except FIG. 16, which shows a gap mark that marks the start of the stud position defined by the gap mark, but does not mark the end of the stud position defined by the gap mark). Note: It is possible for a gap mark to mark a start of the stud position defined by the gap mark and/or an end of the stud position defined by the gap mark, without marking a centre of the stud position defined by the gap mark. For example, FIGS. 14, 15 and 16 all show examples of a gap mark 14, which is within a scope of marking a start of the stud position defined by the gap mark and/or marking an end of the stud position defined by the gap mark, without marking a centre of the stud position defined by the gap mark. (The gap marks shown in FIGS. 14 and 15 both mark both the start of the stud position defined by the gap mark and the end of the stud position defined by the gap mark. FIG. 16 is also an example of a gap mark within a scope of marking a start of the stud position defined by the gap mark and/or an end of the stud position defined by the gap mark, without marking a centre of the stud position defined by the gap mark. In FIG. 16, the example gap mark marks the start of the stud position defined by the gap mark, (but not the end of the stud position defined by the gap mark). Similarly, an example could be provided which marks the end of the stud position defined by the gap mark, (but not the start of the stud position defined by the gap mark). Thus various options are possible. (An embodiment such as that shown, (by way of example), in FIG. 16 can still be effective. The start of a stud can be lined up with the start of the stud position defined by the gap mark. Thus it can still be used effectively, to facilitate stud positioning. (Whilst the example gap marks in FIG. 8 and FIG. 17 mark both the start of the stud position defined by the gap mark and the an end of the stud position defined by the gap mark, it will be apparent, (from looking at FIG. 8 and FIG. 17, (and especially from looking at the close-up of FIG. 9), that even a gap mark embodiment such as that of FIG. 16 can be used, to effectively facilitate stud positioning. Similarly, a gap mark that marks the start of the stud position defined by the gap mark, (but not the end of the stud position defined by the gap mark) can be used, to line up with an end of a stud, to thus facilitate stud positioning. Thus various options are possible.

(Note: It has been stated that preferably a plurality or all of the gap marks comprise a centre mark 14C, to mark the centre of the stud position the gap mark defines. It should be made clear, it is feasible gap mark embodiments may be provided that do not comprise a centre mark, to mark a centre of where the stud goes. For example, a gap mark may comprise a start mark, to mark a start of where the stud goes, and/or an end mark, to mark an end of where the stud goes, (without there being a centre mark, to mark a centre of where the stud goes). This, (especially a gap mark embodiment that comprises a start mark, to mark a start of where the stud goes, and an end mark, to mark an end of where the stud goes), could function well, for marking. However, there are significant benefits to having a centre mark, to mark a centre of where the stud goes. Thus, preferably a plurality or all of the gap marks comprise a centre mark 14C, to mark the centre of the stud position defined by the gap mark. (It should also be stated, (looking at the example embodiment (s) of the Figures), that the gap marks may comprise the centre mark, for example, but without either the start mark, or the end mark, (or without both). For example, looking at the example(s) in the Figures where there is provided a centre mark 14C, the example gap marks could simply comprise the example centre mark, (without an end mark or a start mark). Nevertheless, a gap mark marking a start or an end of the stud position defined by the gap mark (and, in particular, marking both the start and the end of the stud position), is extremely useful, for providing a guide as to correct positioning of the studs. (This is demonstrated/shown particularly well, for example, in FIG. 9, where an example is shown, fairly close up, where it can be seen that two studs have been lined up with two example gap marks, and it can be seen how the example gap marks marking the start of the stud position is being/has been used, to line up the start of the stud in the correct position. (So, similarly, (in the example embodiment in FIG. 9, the gap mark marks the end of the stud position, thus facilitating lining up the end of the stud correctly).

Preferably the stud gap marker tape comprises a tearable area 16, configured for tearing, to facilitate tearing the strip element, across the strip element. (Various examples of this are shown in the Figures, and the close-up views of FIGS. 2, 13, 15, 16, 19, 22, 23 and 24 show this particularly clearly).

(Because the tearable area is 'configured for tearing', it facilitates a predictable result. For example, looking at the example tearable area 16 of FIG. 2, it is clear that, in the example, by using the tearable area, (ie tearing the strip element, via use of the tearable area), the tape will be torn perfectly in line with a centre of the stud position defined by the gap mark. This differs from tearing the tape 'freehand', for example, (ie without use of a tearable area 16). Tearing the tape 'freehand' may result in a messy/untidy tear. It may distort the tape, (if the material(s) the tape is made of is not conducive to tearing). (It may even be extremely hard, (or seemingly impossible), to tear the tape, 'freehand', if the tape is made out of material(s) that are extremely unconducive to tearing). (Looking at FIG. 2, (with reference to FIG. 4, where a tearable area has been torn), in FIG. 2, the example tearable area is perforated. However, it should be stated that, in other embodiments, the strip element may be (heavily) pressed/indented, (eg machine pressed), in such a way that, again, facilitates tearing at the tearable area. (It is even feasible a combination of both is used). Thus various options and/or embodiments are possible)).

More preferably, preferably the stud gap marker tape comprises more than one tearable area 16, configured for tearing, to facilitate tearing the strip element, across the strip element). (Various examples of this are shown in the Figures, and it is evidenced best in the views shown in FIGS. 3 and 5. (Note: These are not the only Figures that show a tearable area(s). However, due to distance of view, tearable areas 16 may be challenging to see, (and/or not visible) in other Figures).

Preferably, for at least one of the gap marks, there is a tearable area wherein a portion or a whole of the tearable area is within a stud position defined by the gap mark. (Note: The term 'within' includes anywhere, from start to end, of the stud position, (including the start and end, and anywhere in between the start and end)). Looking at FIG. 15 as an example, this is clearly an example of wherein a portion or a whole of the example tearable area 16 is 'within' a stud position defined by the gap mark. Looking at FIG. 15 as an example, this is clearly an example of wherein a whole of the example tearable area 16 is 'within' a stud position defined by the gap mark. (Anywhere, start to finish, from dashed line S1, (which defines the start of the stud position defined by the example gap mark), to dashed line E1, (which defines the end of the stud position defined by the example gap mark), would be within a scope of 'within' the stud position. Thus the example is clearly within a scope of wherein a portion or a whole of the example tearable area 16 is 'within' a stud position defined by the gap mark. (Note: If there was a tearable area 16 exactly in line with line S1, (or exactly in line with line E1), (or anywhere in between), that would be within the scope of being 'within' the stud position defined by the gap mark. Thus if even a portion of a tearable area is within this area, (ie, looking at FIG. 15, within what is denoted by line L2, (and which includes lines E1 and S1)), that is within a scope of being a tearable area, wherein a portion or a whole of the tearable area is within a stud position defined by the gap mark. (It will be apparent that many Figures show examples of this). (Note: It should be made clear, FIG. 16 shows an example where there is an example start mark 14S, but where the gap mark does not mark the end, (and does not mark the centre) of the stud position defined by the gap mark. Nevertheless, it is still clearly an example of wherein there is a tearable area, wherein a portion or a whole of the tearable area is within a stud position defined by the gap mark. (And it is an example of wherein a whole of the tearable area is within a stud position defined by the gap mark). (As has been explored/explained, lines S1 and E1, (and line L2) make clear the stud position defined by the gap mark). Having a gap mark that only has a start mark, (as shown in FIG. 16), and then having a tearable area, wherein a portion or a whole of the tearable area is at a centre of a stud position defined by the gap mark, (and, most preferably, wherein a portion or a whole of the tearable area is aligned with the centre of the stud position defined by the gap mark), is entirely possible, and may be extremely effective, (especially wherein a portion or a whole of the tearable area is aligned with the centre of the stud position defined by the gap mark). As stated, it is clearly an example within a scope of wherein there is a tearable area, wherein a portion or a whole of the tearable area is within a stud position defined by the gap mark. Thus various options and/or embodiments are possible). (Note: It should be stated, it is feasible a tearable area could be provided wherein a portion, (but not a whole) of the tearable area is within a stud position defined by the gap mark. For example, (taken by way of example only), looking at FIG. 15, for example, if one imagines a tearable area, where a portion of the tearable area was in line with line E1, for example, (which would immediately qualify the tearable area as being within a scope of wherein a portion or a whole of the tearable area is within a stud position defined by the gap mark), but that, perhaps at its sides, for example, (eg close to each edge of the strip element, a portion of the tearable area is outside of the confines of the stud position, that would be an example of wherein a portion, (but not a whole) of the tearable area is within a stud position defined by the gap mark. Thus various options and/or embodiments are possible).

(It should also be stated, for at least one of the gap marks, there may be more than one tearable area where a portion or a whole of the tearable area is within a stud position defined by the gap mark. (It should also be stated, for a plurality or all of the gap marks, there may be more than one tearable area where a portion or a whole of the tearable area is within a stud position defined by the gap mark)).

Preferably, for a plurality or all of the gap marks, there is a tearable area, wherein a portion or a whole of the tearable area is within a stud position defined by the gap mark. (This is evidenced best in the views shown in FIGS. 3 and 5, (where an example tearable area is denoted for each example gap mark in the examples), although other Figures also show examples of there being a tearable area, wherein a portion or a whole of the tearable area is within a stud position defined by the gap mark, for a plurality or all of the gap marks). (Preferably, for a plurality or all of the gap marks, there is a tearable area, wherein a whole of the tearable area is within a stud position defined by the gap mark). (Again, an example (s) of this is perhaps best evidenced in FIGS. 3 and 5).

Figure 2:
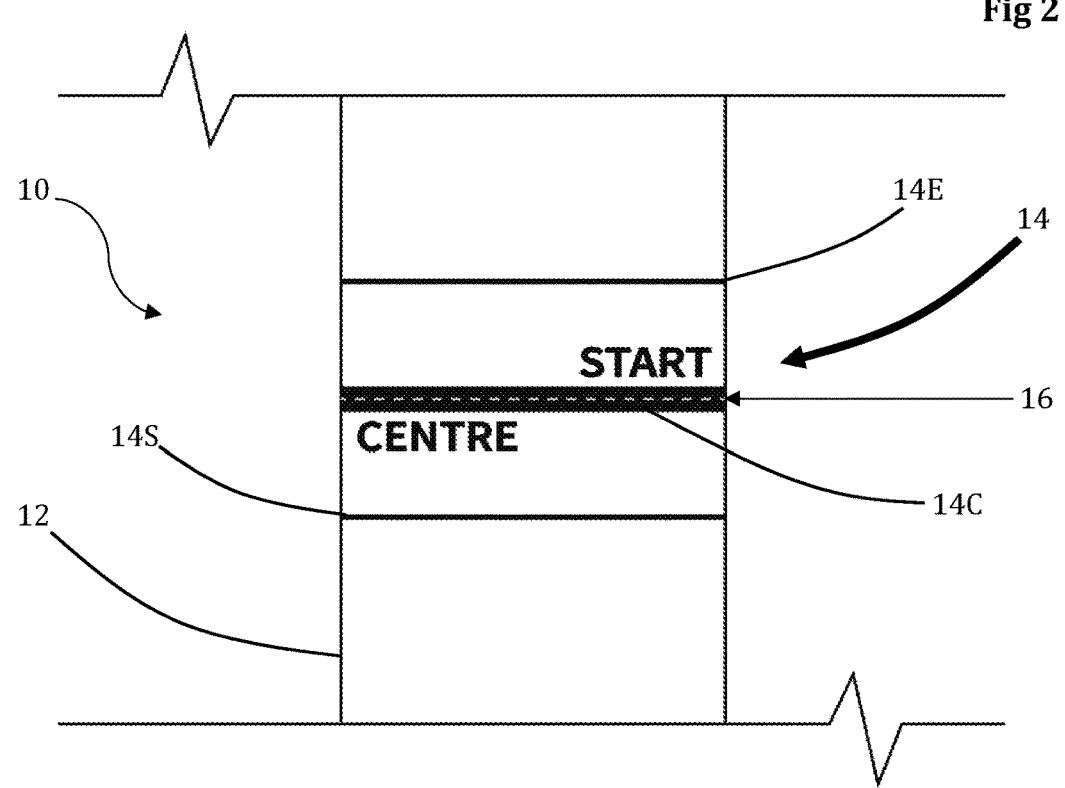
FIG. 2 is a cut-off close-up view, directly from above, showing an example of a particularly preferred embodiment of a gap mark, which, in the example, comprises an example centre mark, an example start mark, and an example end mark.
Figure 3:
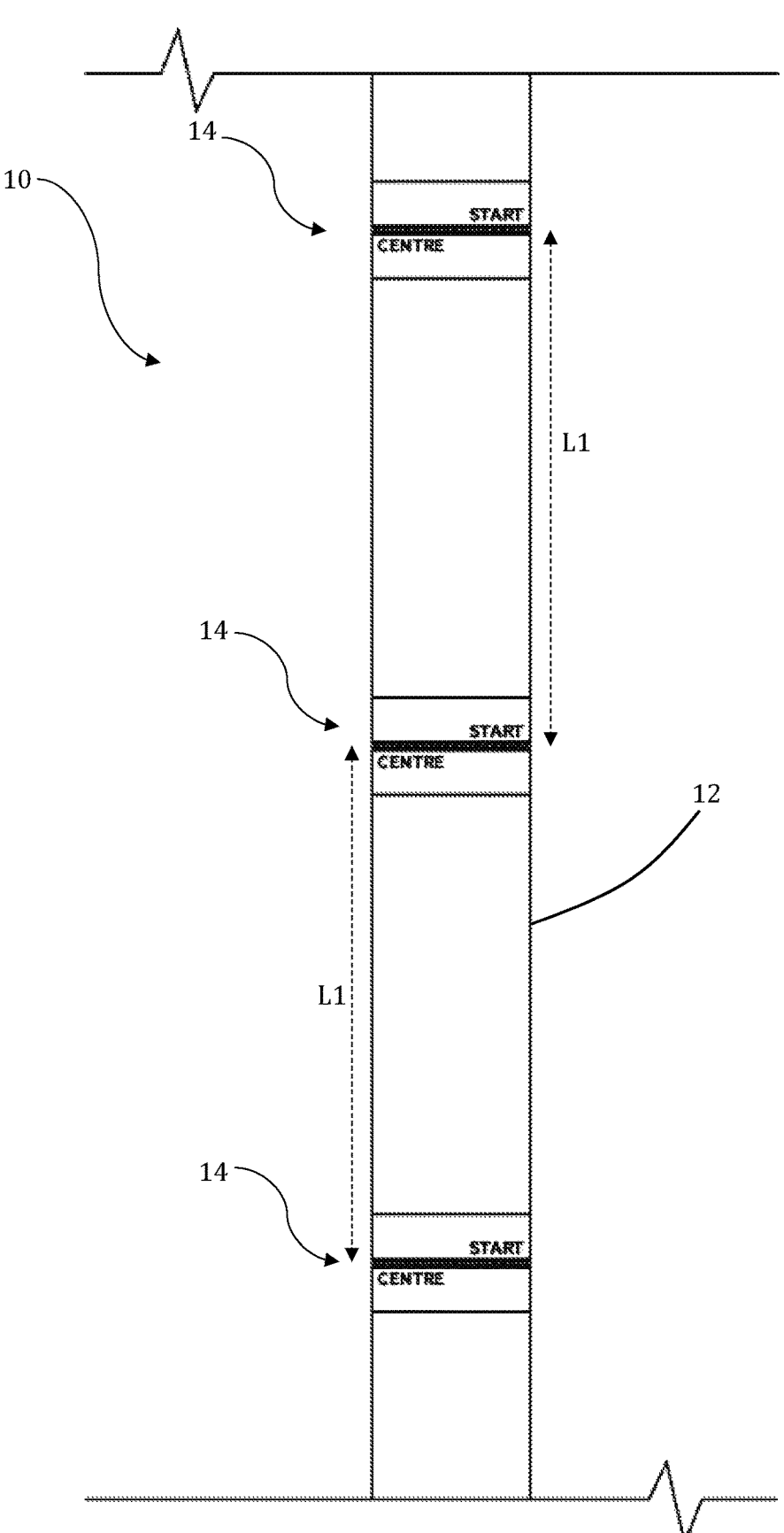
FIG. 3 is another view, again directly from above, showing a portion of the strip element of the stud gap marker tape, in an embodiment where there are eight inch intervals between the gap marks.
Figures 23, 24:
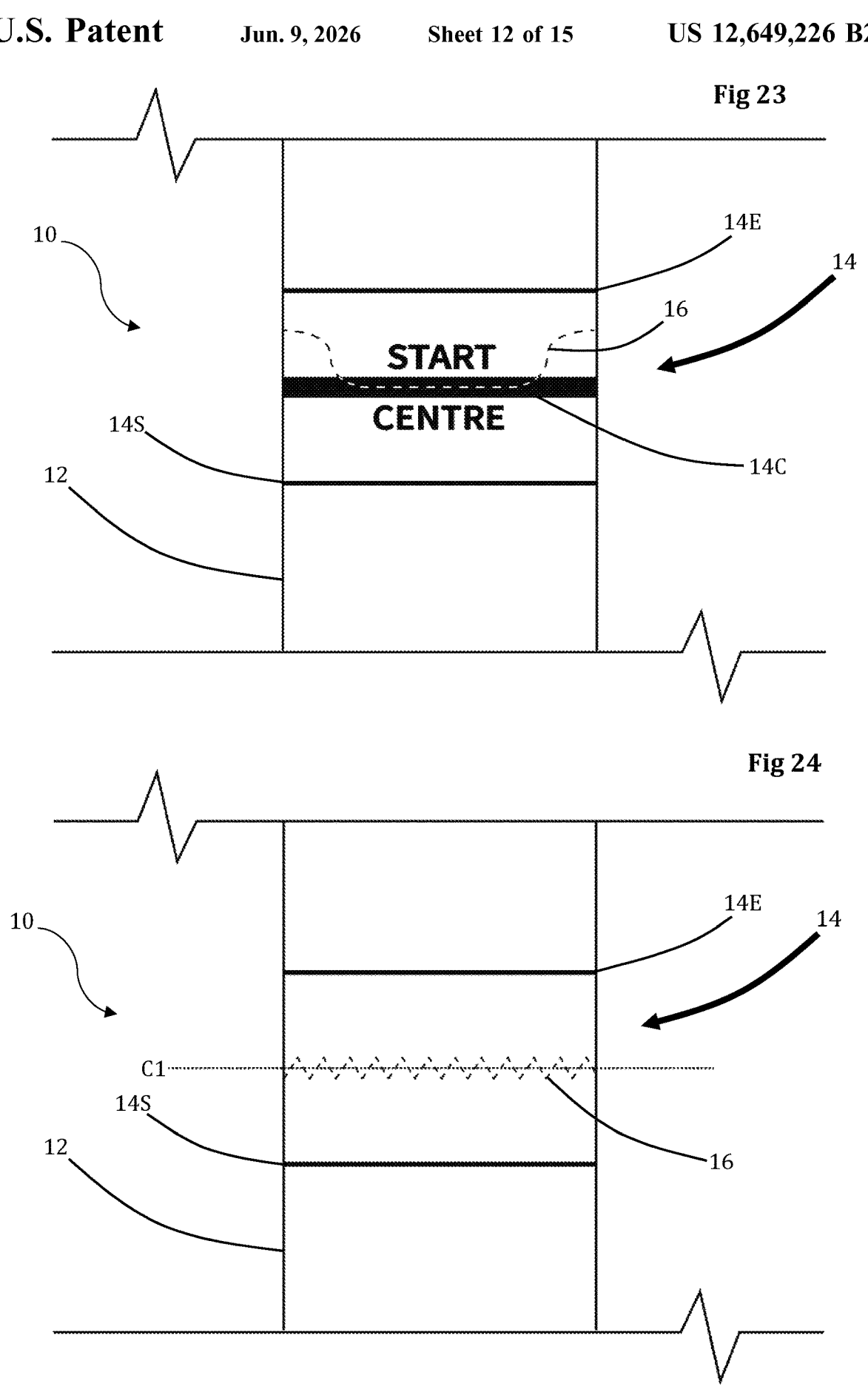
FIG. 23 is a cut-off close-up view, directly from above, of an example gap mark, showing an example of a tearable area, wherein a portion, (but not a whole), of the tearable area is aligned with a centre of a stud position defined by the gap mark.
FIG. 24 is a cut-off close-up view, directly from above, of an example gap mark, showing an example of a tearable area that 'cuts across' the centre of the stud position defined by the gap mark.

Preferably, for at least one of the gap marks, there is a said tearable area, wherein a portion or a whole of the tearable area is at a centre of a stud position defined by the gap mark. (Examples of this are shown in FIGS. 1, 2, 3, and many or all of the other Figures, (including FIGS. 13, 15, 16, 19, 22,

23, and 24, which also show good close-up examples of this). Perhaps a best view of this is shown in FIG. 2). (Note: 'A portion or a whole of the tearable area being at a centre of a stud position defined by the gap mark' includes within its scope a portion or a whole of the tearable area being aligned with the centre of the stud position defined by the gap mark. (An example(s) of this is shown in various Figures, (and whilst most examples of this shown show the whole of the tearable area being aligned with the centre of the stud position defined by the gap mark, FIG. 23, for example, shows an example of a tearable area 16, wherein a portion, (but not a whole), is aligned with the centre of the stud position defined by the gap mark. Thus various options and/or embodiments are possible). It should also be stated, 'a portion or a whole of the tearable area being at a centre of a stud position defined by the gap mark' also includes within its scope any part of the tearable area 'cutting across' the centre of the stud position defined by the gap mark. (An example of this is shown in FIG. 24, for example). (In FIG. 24, not even a portion, (let alone a whole) of the tearable area 16 is aligned with the centre of the stud position defined by the gap mark. However, the tearable area does 'cut across' the centre of the stud position defined by the gap mark. Thus it too is within a scope of being a tearable area, wherein a portion or a whole of the tearable area is 'at' a centre of a stud position defined by the gap mark, (because at any point(s) where the tearable area 'cuts across' the centre of a stud position defined by the gap mark, it is 'at' the centre of a stud position defined by the gap mark. (Thus if the tearable area and the centre of the stud position defined by the gap mark 'meet' at any point(s), that would be within a scope of a portion or a whole of the tearable area being at a centre of a stud position defined by the gap mark)). FIG. 24 shows a close-up of an embodiment of a gap mark, showing an example embodiment of a tearable area 16, within a scope of wherein 'a portion or a whole of the tearable area is at a centre of a stud position defined by the gap mark'. In FIG. 24, line C1 shows the centre of a stud position defined by the gap mark. In the example, the example tearable area is jagged. However, it is clear that at various points, it 'cuts across' the centre of a stud position defined by the gap mark. (It is clearly shown, cutting across line C1). Thus, whilst this is not an embodiment within a scope of wherein a portion or a whole of the tearable area is aligned with the centre of the stud position defined by the gap mark, it is, however, within a scope of being a tearable area, wherein a portion or a whole of the tearable area is at a centre of a stud position defined by the gap mark. (Note: Whilst the example tearable area embodiment cuts across the centre of the stud position defined by the gap mark many times, in the example, it should be said that even a tearable area embodiment that cuts across the centre of the stud position defined by the gap mark once would be within a scope of being a tearable area, wherein a portion or a whole of the tearable area is at a centre of a stud position defined by the gap mark). (In the example of FIG. 24, the example gap mark does not mark the centre of a stud position defined by the gap mark. However, preferably there is, in fact, a centre mark. (This is not shown, in order to provide simplicity/clarity as to what is shown, with regard to the tearable area).

Figure 4:
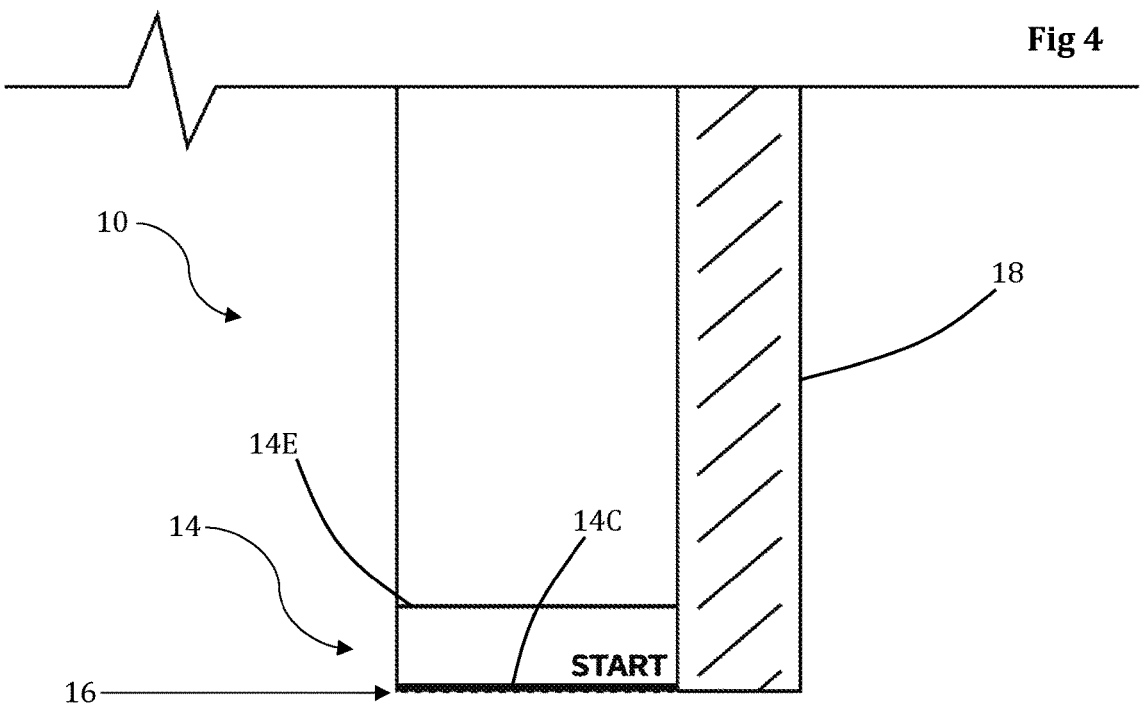
FIG. 4 is a view, again directly from above, showing an example of why a tearable area, configured for tearing, to facilitate tearing the strip element, across the strip element, at the centre mark, can be so useful, with the tape having been torn at the centre mark, and with that now being used as the start of where the tape is attached, (preferably via sticking), to an example plate.

It will be apparent, on reading of this application, that a tearable area, wherein a portion or a whole of the tearable area is aligned with the centre of the stud position defined by the gap mark, (thus facilitating tearing the strip element, across a portion or a whole of the centre of the stud position defined by the gap mark), is of particularly use. This is borne out from looking at FIG. 4, for example. To explain more, it will be known to those with skill, (or even merely knowledge), in the art of wall building with studs that, typically, (in America, and perhaps some other territories), studs are put at 'sixteen inches on centre'. What this means is that a stud is positioned, centred at sixteen inches from the start of the plate, and any further studs, from that point on, are at sixteen inch gaps. (Thus the initial stud positioned at the first sixteen inch measurement from the start of the stud is 'centred' at a sixteen inch gap from the start of the plate, and the studs are then all 'centred' at sixteen inch gaps from there-hence the term sixteen inches 'on centre'). (Because American standards are for the studs to be 1.5 inches thick, often a mark is made on the plate, by the person building the wall, three quarters of an inch back of each sixteen inches from the start of the plate, (ie at fifteen and one quarter inches from the start of the plate, for the first mark). This, then, defines the 'start' of the stud position. (Note how various gap mark embodiments in the Figures mark the start of the stud position, and how this is therefore useful). The mark, (however it is initially made, (eg just a short pencil mark), is often then made (eg with a pencil, (and often with a set square or framing square or the like)) across the stud. The person building the wall will often/sometimes also make a mark three quarters of an inch to the other side of the sixteen inches, (ie sixteen inches and three quarters). (The mark if often made, as stated, with pencil, etc, (or any relevant writing implement), (and often using other tool(s), as stated, (such as set squares, framing squares, etc). The person will often then mark a cross, (ie an 'X'), or any annotation(s), for example), in the space between the 'start' and 'end' of the stud position, (for better visualization of the stud position). (The annotation may even be intended to mark the centre of the stud position)). (Even if the person has only marked the start of the stud position, (and not the end), they may well still mark a cross or any annotation(s), for example), to more clearly show/remind themselves where the stud will go). This is how a stud position is usually marked. As can be seen, it is a highly manual process, requiring various tool(s)/implement(s), and can take some time. Returning now to the particular benefits of a tearable area, wherein a portion or a whole of the tearable area is aligned with the centre of the stud position defined by the gap mark, (and looking at FIG. 4 for a demonstration of this), it can be seen, in the example, how the tape is used, starting at the start of the plate 18, at the centre of the stud position defined by the example gap mark. (Please see FIG. 2 in combination with FIG. 4). In FIG. 4, the example tearable area is shown having been torn. There are several possible benefits to this. Firstly, when a user gets to an end of lining tape along a plate, (eg as shown/demonstrated in FIG. 6), they can tear the tape, using a tearable area 16. (They can therefore do this, rather than having to use a cutting tool, (or rather than the user having to tear it 'freehand', (ie without the use of a tearable area), which could lead to an untidy rip, (and, depending on what material(s) the tape is made out of, may be extremely hard to do, (or possibly even impossible))). If they want to then use the tape immediately, on another plate, (or plates, as demonstrated by way of example in FIG. 12), then they can immediately use the tape, much as shown in FIG. 4, starting from where the tape has been torn. This is very elegant in nature, and the tape, in the example, (used as shown in FIG. 4), will now mark all relevant stud positions. (Looking at FIG. 6 in combination with FIG. 4, it will be apparent that the embodiment shown provides an extremely elegant solution, where the user can use a tearable area, to tear the tape, and then can use the tape, starting at that exact point of where it has been torn, as the starting point for the next plate that is to be marked using the tape). (Note: If the user does not want to immediately use the tape on another plate, they may simply leave the tape torn at that tearable area, (eg keeping it in a nice roll), and can then use the tape from that point, next time they need the tape. To explain another benefit, even if the user does not use the tearable area to tear the tape when they finish using it on a plate(s), (eg even if they simply rip the tape, for example, (eg as may have been done in the example of FIG. 7, for example)), next time they want to use the tape, (whether it be to use it immediately on another plate, or some time later), if they want, they can tear a tearable area, (eg the next available tearable area on the tape, (eg the next tearable area after where it was ripped), and then, (much as shown in FIG. 4, for example, can start lining the tape along the plate, from where the tape has been torn at the tearable area. (Note: Even if the user used a tearable area to tear the tape previously, (eg when they got to the end of lining up a previous plate, (and especially if they did not immediately use the tape from there on another plate), they, as well, may choose to tear a tearable area, from where to start lining the tape along another plate, especially if they notice that the tape has been misshaped in any way, (which could happen by accident, eg when re-sticking a bit of the (end of the) tape back onto the rest of the tape, (eg back onto the roll). If the tape becomes misshapen or malformed, that could affect its precision in marking gaps at the right places. For this reason, as stated, in such a case, a user may use a tearable area, to tear the tape, trying to get rid of any of the tape that is misshapen or malformed. (It should also be stated, referring to another possible use/ benefit, (looking at FIG. 4), it is possible, looking at what is shown in FIG. 4, that the user actually started lining the tape along the plate, without first having torn the tearable area shown. They could nevertheless start lining the tape along the plate, starting at the start of the plate from where the tearable area is. At some point after this, (eg once the start of the tape, (or all the tape lined along the plate), is attached to the plate), they may then use the tearable area, just to get rid of the excess tape that is before the start of the plate. This, therefore, can be used to create the neat finish, as shown in FIG. 4, (by way of example). Thus there are various possible benefits for a tearable area, wherein a portion or a whole of the tearable area is aligned with the centre of the stud position defined by the gap mark, (and there are generally various benefits to a tearable area 16).

Note: Whilst the benefits of a tearable area, wherein a portion or a whole of the tearable area is aligned with the centre of the stud position defined by the gap mark, have been explored, as alluded to, a portion or a whole of a tearable area may be within a stud position, without facilitating tearing the strip element across a portion or a whole of a centre of the stud position. For example, looking at the example of FIG. 15, for example, rather than facilitating tearing the strip element across a portion or a whole of a centre of the stud position, there may be a tearable area, wherein a portion or a whole of the tearable area is aligned with the start of the stud position defined by the gap mark, for example, (aligned with line S1). (Thus, (in embodiments where there is a start mark), there could, for example, be a tearable area, wherein a portion or a whole of the tearable area is aligned with the start mark, for example). Furthermore, looking at the example of FIG. 15, for example, rather than facilitating tearing the strip element across a portion or a whole of a centre of the stud position, there may be a tearable area, wherein a portion or a whole of the tearable area is aligned with the end of the stud position, for example, (aligned with line E1). (Thus, (in embodiments where there is an end mark), there could be a tearable area, wherein a portion or a whole of the tearable area is aligned with the end mark, for example). (And, as has been mentioned, there could be a tearable area, wherein (a portion or a whole of) the tearable area is anywhere in between the start and end of the stud position, (all of these being an example of there being a tearable area, wherein a portion or a whole of the tearable area is within a stud position defined by a gap mark). However, it has been explored that there are particular benefits of a tearable, wherein a portion or a whole of the tearable area is aligned with the centre of the stud position defined by the gap mark. (It should also be stated, for at least one of the gap marks, there could be more than one tearable area, (ie two or more), where a portion or a whole of the tearable area is within a stud position defined by the gap mark. (Thus disclosure has been provided that, for at least one of the gap marks, there could be more than one tearable area, where a portion or a whole of the tearable area is within a stud position defined by the gap mark). Thus disclosure has been provided that, for a plurality or all of the gap marks, there could be more than one tearable area, where a portion or a whole of the tearable area is within a stud position defined by the gap mark). For example, (taken by way of example only), there could be a tearable area, wherein a portion or a whole of the tearable area is aligned with the centre of the stud position defined by the gap mark of the stud position, and a tearable are, wherein a portion or a whole of the tearable area is aligned with the start of the stud position defined by the gap mark. Or there could be a tearable area, wherein a portion or a whole of the tearable area is aligned with the centre of the stud position defined by the gap mark, and a tearable are, wherein a portion or a whole of the tearable area is aligned with the end of the stud position defined by the gap mark. Or there could be a tearable area wherein a portion or a whole of the tearable area is aligned with the centre of the stud position defined by the gap mark, a tearable area wherein a portion or a whole of the tearable area is aligned with the start of the stud position defined by the gap mark, a tearable area wherein a portion or a whole of the tearable area is aligned with the end of the stud position defined by the gap mark. Or there could be a tearable area wherein a portion or a whole of the tearable area is aligned with the start of the stud position defined by the gap mark and a tearable area wherein a portion or a whole of the tearable area is aligned with the end of the stud position defined by the gap mark. (These examples are provided by way of example only of where a tearable area(s) could be, with reference to there being a tearable area(s), wherein a portion or a whole of the tearable area is within a stud position defined by a gap mark). (Any permutation of a tearable area wherein a portion or a whole of the tearable area is at a centre of a stud position defined by the gap mark and/or a tearable area wherein a portion or a whole of the tearable area is at a start of a stud position defined by the gap mark and/or a tearable area wherein a portion or a whole of the tearable area is at an end of a stud position defined by the gap mark is possible). (Again, these examples are provided only by way of example only of where a tearable area(s) could be, with reference to there being a tearable area(s), wherein a portion or a whole of the tearable area(s) is within a stud position defined by a gap mark, and it should be stated, a portion or a whole of a tearable area(s) could be provided within a stud position defined by a gap mark, the tearable area(s) not being aligned with (and perhaps not even having any portion 'at'), the centre of the stud position defined by the gap mark, the start of the stud position defined by the gap mark, or the end of
the stud position defined by the gap mark. Thus various
options and/or embodiments are possible). However, having
more than one tearable area, wherein a portion or a whole of
the tearable area is within a stud position a stud position
defined by a gap mark may cause problems. It could lead to
the wrong tearable area getting torn, by mistake, for
example. It could also lead to increased complexity, which
may not be desirable. (It should be stated, however, that
there could be value in a portion or a whole of a tearable area
being aligned with an end of a stud position defined by a gap
mark. For example, imagining an example where a tearable
area is aligned with an end of the stud position defined by the
gap mark, it could allow a user to tear the tape, whilst
retaining the whole of the stud position defined by the gap
mark. This could potentially have benefits. (So there too may
feasibly be benefits in there being a tearable area, wherein a
portion or a whole of the tearable area is aligned with a start
of a stud position defined by a gap mark, feasibly). (Note, for
the sake of visualizing a tearable area wherein a portion or
a whole of the tearable area is aligned with a start of a stud
position defined by the gap mark, looking at FIG. 15, it can
be seen that the example tearable area is aligned with a
centre of the stud position defined by the gap mark. Now,
imagining the dashed line that represents/denotes the
example tearable area being instead aligned with the dashed
line S1 in FIG. 15, that would be an example of there being
a tearable area aligned with a start of the stud position
defined by the gap mark. (In such an example, (with refer-
ence to the example embodiment of FIG. 15), (provided
simply by way of example only), this would be an example
of wherein there is a tearable area, configured for tearing, to
facilitate tearing the strip element, across the strip element,
aligned with the start mark. (However, it should be stated,
embodiments can be provided wherein there is a tearable
area, wherein a portion or a whole of the tearable area is
aligned with a start of the stud position defined by the gap
mark, without there being a start mark). (And, for the sake
of visualizing a tearable area wherein a portion or a whole
of the tearable area is aligned with an end of a stud position
defined by the gap mark, looking at FIG. 15, it can be seen
that the example tearable area is aligned with a centre of the
stud position defined by the gap mark. Now, imagining the
dashed line the represents/denotes the example tearable area
being instead aligned with the dashed line E1 in FIG. 15, that
would be an example of there being a tearable area aligned
with an end of the stud position defined by the gap mark).
(In such an example, (with reference to the example embodi-
ment of FIG. 15), (provided simply by way of example
only), this would be an example of wherein there is a
tearable area, configured for tearing, to facilitate tearing the
strip element, across the strip element, aligned with the end
mark. (However, it should be stated, embodiments can be
provided wherein there is a tearable area, wherein a portion
or a whole of the tearable area is aligned with an end of the
stud position defined by the gap mark, without there being
an end mark).

It should be stated, a tearable area(s) may be provided, not
limited to a portion or a whole of the tearable area(s) being
within a stud position defined by a gap mark.

Various Figures, (perhaps, most demonstrably, FIGS. 1
and 2), show example of there being, for at least one of the
gap marks, a tearable area, to facilitate tearing the strip
element, across the strip element, across a portion or a whole
of a centre mark. (Whilst only one of the gap marks is shown
on each roll of FIG. 1, each roll is an example of wherein,
for a plurality or all of the gap marks, there is a tearable area, to facilitate tearing the strip element, across the strip ele-
ment, across a portion or a whole of a centre mark. (In that
example, (ie FIG. 1), the tearable area facilitates tearing the
strip element, across the strip element, across the whole of
the centre mark)).

Preferably a plurality or all of the tearable areas are at
repeating intervals. (Various examples of this are shown in
the Figures). Preferably a plurality or all of the tearable areas
are at repeating intervals that are a multiple of eight inches;
or at intervals that are a multiple of twenty centimetres; or
at intervals that are a multiple of fifteen centimetres. Pref-
erably a plurality or all of the tearable areas are at intervals
of eight inches; or at intervals of twenty centimetres; or at
intervals of fifteen centimetres. A plurality or all of the
tearable areas may be at intervals of sixteen inches; or at
intervals of forty centimetres; or at intervals of forty-five
centimetres. A plurality or all of the tearable areas may be at
intervals of twenty-four inches; or at intervals of sixty
centimetres. Preferably a plurality or all of the gap marks are
at repeating intervals, and a plurality or all of the tearable
areas are at repeating intervals that match the repeating
intervals of the gap marks. (More broadly, preferably a
plurality or all of the gap marks are at repeating intervals,
and a plurality or all of the tearable areas are at repeating
intervals that are a multiple of the repeating intervals of the
gap marks. (Multiple, (as will be apparent, in light of the
present application), includes within its scope the intervals
matching, (ie being the same). So, for example, if a plurality
or all of the gap marks are at eight inch intervals, then if a
plurality or all of the tearable areas are at eight inch
intervals; or at sixteen inch intervals, or at twenty-four inch
intervals, etc, then that is within a scope of wherein a
plurality or all of the gap marks are at repeating intervals,
and a plurality or all of the tearable areas are at repeating
intervals that are a multiple of the repeating intervals of the
gap marks). With regard to a plurality or all of the gap marks
being at repeating intervals, and a plurality or all of the
tearable areas being at repeating intervals that match the
repeating intervals of the gap marks, whilst this is shown in
various of the Figures, it is perhaps best shown in FIG. 3.
Preferably the interval between the gap marks is eight
inches. In such case, (looking at FIG. 3, dashed line L1 is
eight inches in length). It can also be seen, in FIG. 3, that
there is a tearable area aligned with a centre of the stud
position defined by the gap mark. (This is not numbered, in
order to preserve simplicity and clarity of what is being
shown in FIG. 3. However, they are present in FIG. 3). Thus
it will be apparent, looking at FIG. 3, that the intervals
between the example gap marks and the intervals between
the example tearable areas that are aligned with the centre of
the stud positions defined by the gap marks are the same.
(They 'match'). (Whilst the example of eight inches is
given, it will be apparent that this is given by way of
example. For example, if the intervals between the gap
marks was sixteen inches, or twenty-four inches, (or any
distance), the intervals between the example gap marks and
the intervals between the example tearable areas, (in terms
of what is shown in FIG. 3), would be the same. (It should
also be stated, even if the tearable areas were all aligned with
the start of the stud positions defined by the gap marks, (or
aligned with the end), for example, that would also be within
a scope of a plurality or all of the gap marks are at repeating
intervals, and a plurality or all of the tearable areas are at
repeating intervals that match the repeating intervals of the
gap marks, (and, more broadly, would also be within a scope
of wherein preferably a plurality or all of the gap marks are
at repeating intervals, and a plurality or all of the tearable areas are at repeating intervals that are a multiple of the repeating intervals of the gap marks. (And it should also be stated, it is possible, (looking at the example of FIG. 3 merely as an example), that tearable areas could be provided wherein a portion or a whole of the tearable area is not even within any stud position defined by any gap mark, and yet could still be at intervals that are the same as the intervals between the gap marks. (And more broadly speaking it is possible, (looking at the example of FIG. 3 merely as an example), that tearable areas could be provided wherein a portion or a whole of the tearable area is not even within any stud position defined by any gap mark, and yet could still be at repeating intervals that are a multiple of the repeating intervals of the gap marks)). Thus various options and/or embodiments are possible, which will be apparent.

(Preferably, (in embodiments wherein, for at least one of the gap marks, there is a tearable area, wherein a portion or a whole of the tearable area is within a stud position defined by the gap mark), preferably, of the at least one of the gap marks where a portion or a whole of the tearable area is within a stud position defined by the gap mark, at least one gap mark marks a centre of the stud position defined by the gap mark. (Preferably, (in embodiments wherein, for a plurality or all of the gap marks, there is a tearable area, wherein a portion or a whole of the tearable area is within a stud position defined by the gap mark), preferably, of the plurality or all of the gap marks where a portion or a whole of the tearable area is within a stud position defined by the gap mark, a plurality or all of the gap marks mark a centre of the stud position defined by the gap mark). (Preferably, (in embodiments wherein, for at least one of the gap marks, there is a tearable area, wherein a portion or a whole of the tearable area is at a centre, (most preferably aligned with a centre), of a stud position defined by the gap mark), preferably, of the at least one of the gap marks wherein a portion or a whole of the tearable area is at a centre, (most preferably aligned with a centre), of a stud position defined by the gap mark, at least one gap mark marks the centre of the stud position defined by the gap mark). (Preferably, (in embodiments wherein, for a plurality or all of the gap marks, there is a tearable area, wherein a portion or a whole of the tearable area is at a centre, (most preferably aligned with a centre), of a stud position defined by the gap mark), preferably, of the plurality or all of the gap marks where a portion or a whole of the tearable area is at a centre, (most preferably aligned with a centre), of a stud position defined by the gap mark, a plurality or all of the gap marks mark the centre of the stud position defined by the gap mark))).

Figures 18, 19:
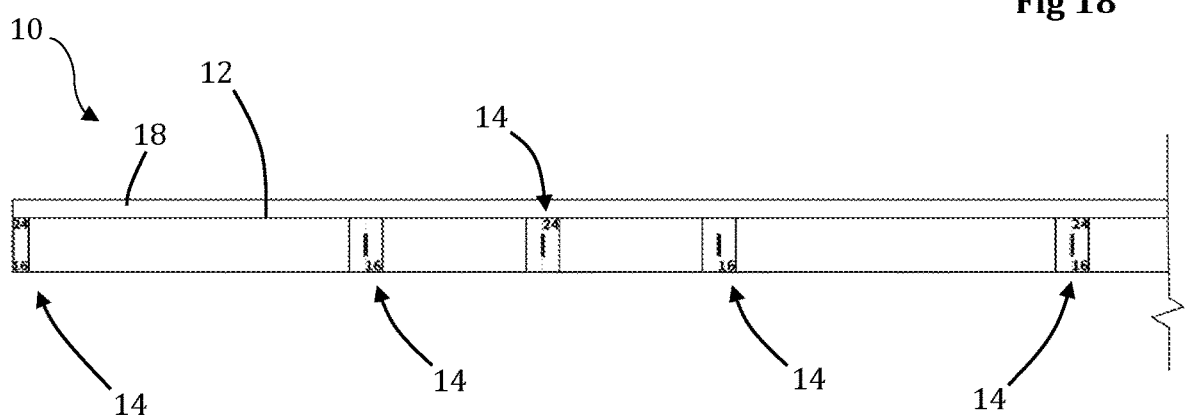
FIG. 18 is a cut-off view, directly from above, of another embodiment of stud gap marker tape, along a plate, that is shown facilitating options of stud positioning at sixteen inches on centre, or twenty-four inches on centre.
FIG. 19 is a close-up cut-off view of a portion of the tape shown in FIG. 18, showing a gap mark that defines a stud position, whether the user is positioning studs at sixteen inch intervals, or twenty-four inch intervals.

(Examples are shown in the Figures of wherein the gap mark(s) comprises a centre mark, to mark the centre of the stud position defined by the gap mark, and wherein there is a tearable area, wherein a portion or a whole of the tearable area is aligned with the centre mark. (FIG. 2 and FIG. 23 are just two of the examples in the Figures that are within a scope of this, for example. FIGS. 19 and 22, for example, are just two other examples that are within a scope of this)).

(Preferably, (in embodiments wherein, for at least one of the gap marks, there is a tearable area, wherein a portion or a whole of the tearable area is within a stud position defined by the gap mark), preferably, of the at least one of the gap marks where a portion or a whole of the tearable area is within a stud position defined by the gap mark, at least one gap mark marks at least one of: a start of the stud position defined by the gap mark; an end of the stud position defined by the gap mark. (Preferably, (in embodiments wherein, for a plurality or all of the gap marks, there is a tearable area, wherein a portion or a whole of the tearable area is within a stud position defined by the gap mark), preferably, of the plurality or all of the gap marks where a portion or a whole of the tearable area is within a stud position defined by the gap mark, a plurality or all of the gap marks mark at least one of: a start of the stud position defined by the gap mark; an end of the stud position defined by the gap mark. (Preferably, (in embodiments wherein, for at least one of the gap marks, there is a tearable area, wherein a portion or a whole of the tearable area is within a stud position defined by the gap mark), preferably, of the at least one of the gap marks where a portion or a whole of the tearable area is within a stud position defined by the gap mark, at least one gap mark mark: a start of the stud position defined by the gap mark; and an end of the stud position defined by the gap mark. (Preferably, (in embodiments wherein, for a plurality or all of the gap marks, there is a tearable area, wherein a portion or a whole of the tearable area is within a stud position defined by the gap mark), preferably, of the plurality or all of the gap marks where a portion or a whole of the tearable area is within a stud position defined by the gap mark, a plurality or all of the gap marks mark: a start of the stud position defined by the gap mark; and an end of the stud position defined by the gap mark))).

Figure 5:
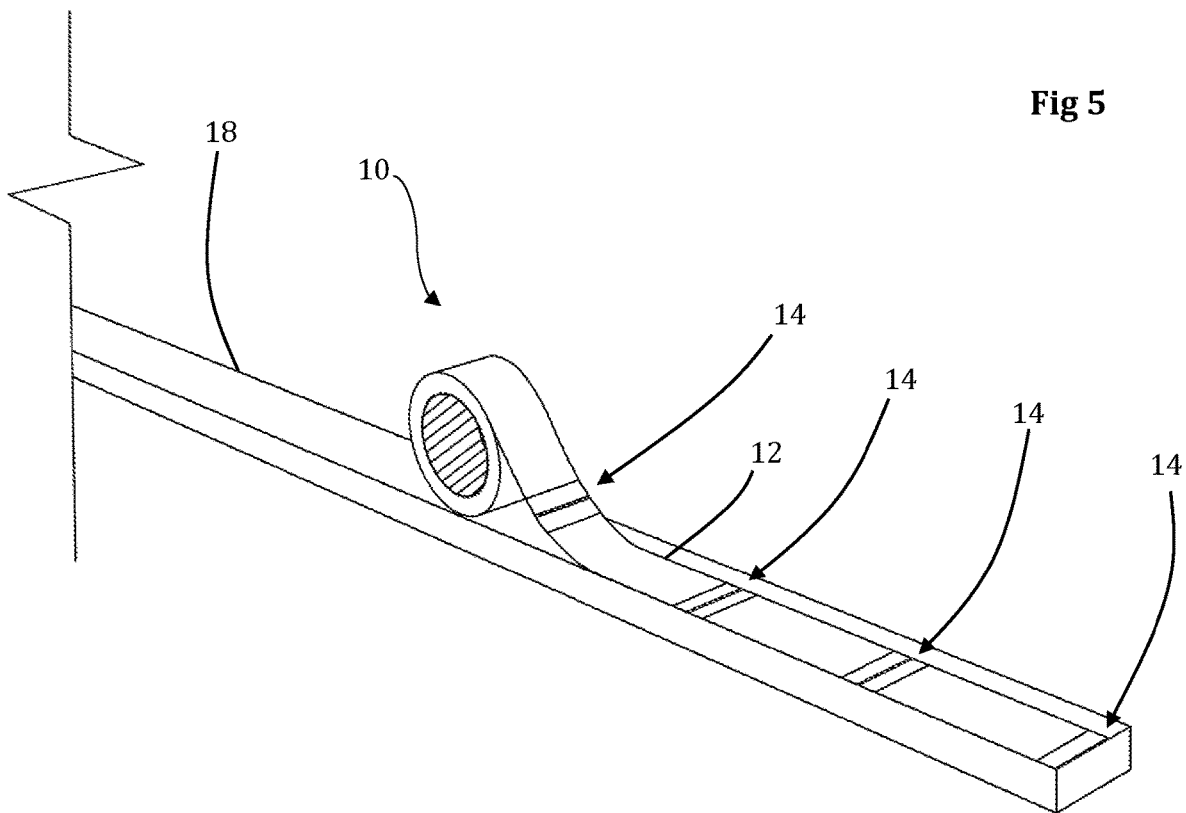
FIG. 5 is a perspective view, in line with what is shown in FIG. 4, showing tape being stuck along the example plate.
Figure 7:
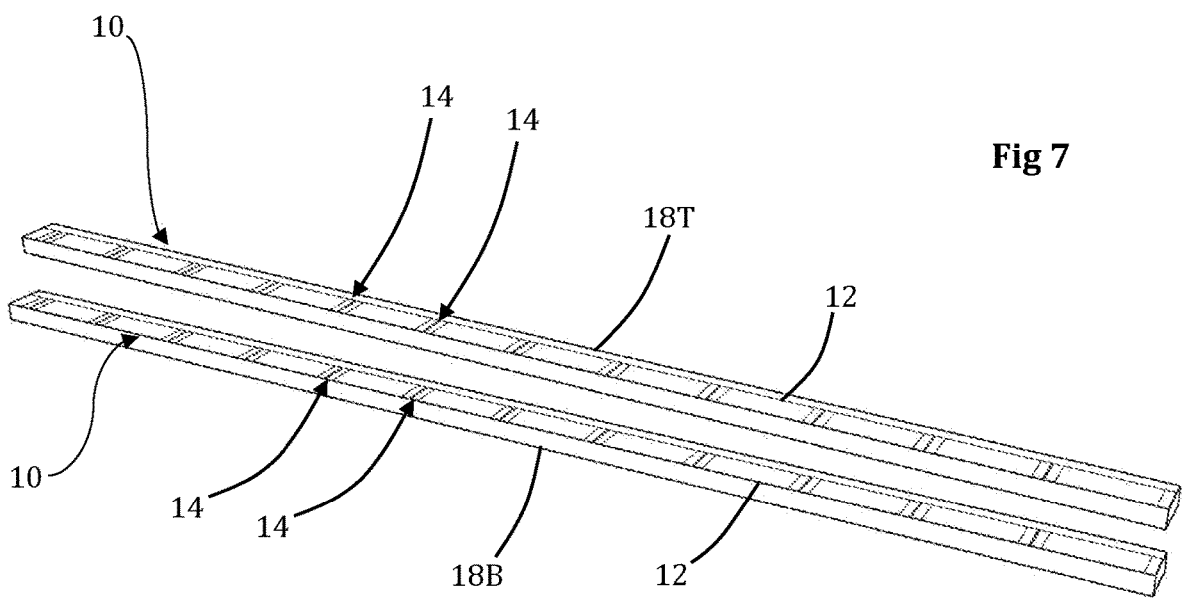
FIG. 7 is a perspective view, similar to that of FIG. 6, showing how this process can be completed for both top plate and base plate.

Preferably a portion or a whole of an underside of the strip element is adhesive, to facilitate sticking the strip element to a plate. (Note: The adjectives 'sticky' and 'adhesive' may be used interchangeably). (Preferably a whole of the underside of the strip element is adhesive, to facilitate sticking the strip element to a plate). In the example embodiment(s) in the Figures, a portion or a whole of an underside of the strip element is sticky, to facilitate sticking the strip element to a plate. (FIGS. 5, 6 and 7 show particularly good views demonstrating the tape being stuck to the plate. (Thus this is an example of the tape being 'attached' to the plate). It can be seen how elegant a solution this is. Thus the tape, in the example embodiment(s), can function much like, (and effectively 'is'), sticky tape. (Adhesion/stickiness has the advantage, for example, of not requiring tool(s)/implement(s), (eg stapler/staple gun, hammer, etc, (and/or any other tool(s)/implement(s))) and/or not requiring further element(s) to facilitate attachment, (eg staple(s), nail(s), etc, (and/or any other element(s) to facilitate attachment)). (It also has the advantage of lessening the possibility of any structural damage that could be done to the tape, (eg unintentional ripping, etc, due to elements such as nails, staples, etc, (ie 'penetrating' element(s))). (It also has the benefit of being simple, quick, and effective). However, it should be stated, (as will be explored and/or as has been mentioned above), there are other possibilities for how the tape can be attached to a plate).

Preferably the stud gap marker tape is provided rolled up, as a roll of tape. (This is most clearly shown in FIG. 1, and is also shown well in FIGS. 5 and 6). Providing the stud gap tape rolled up, as a roll of tape is a particularly effective way to provide it. It is compact, (as shown in FIGS. 1, 5 and 6), and easy to use, (as shown particularly well in FIGS. 5 and 6). (An example 'core' of the roll can be seen in FIG. 1. In the example, this provides structural strength, and shape, to the roll).

Preferably the tape is non-stretchable. (It will be apparent that, if the strip element stretches, this can or will negatively impact the accuracy of the gap marks). Thus preferably relevant material(s) are used, so that the strip element is non-stretchable/non-stretching. It will be known that many parcels (and envelopes) are made out of a brownish (sometimes with a hint of yellow) paper, and that a similar or same type of paper is often used for wrapping. (This type of paper is sometimes referred to as 'craft paper', (or, at least, what is referred to as 'craft paper' would be an example of this type of material that is here being described)). Preferably strip element—is made out of such material(s), (or a material (s) similar to this). Thus the strip element may be made out of paper, (or a material(s) similar to this). This material, (as mentioned above), is (or at least tends to be) non-stretching, (which, as stated, is an important factor). Preferably strip element is a similar such colour, (ie generally brownish paper colour, as mentioned previously), (although it will be apparent that many options and/or embodiment are possible, in terms of material(s) and/or colour).

Referring to the actual gap marks, (and looking at the example embodiments of the Figures, as an example), looking at the example embodiment of FIG. 2, preferably the example start mark and/or end mark are generally black in colour, (or of a dark colour(s), for example). (Thus preferably the start mark is dark in colour. Thus preferably the end mark is dark in colour). Preferably the example centre mark is red in colour, (although it could be a different colour(s)). In such an example, 'red' would be an accent colour. (It could be an accent colour(s), other than red). Preferably the text that reads 'START' is red in colour. Preferably the text that reads 'CENTRE' is red in colour. (Preferably both are red in colour). However, this is provided by way of example only, and with regard to colours, etc, it will be apparent that various options and/or embodiments are possible.

(Note: It will be noted that the text 'START', (shown clearly in FIG. 2, for example), is provided close to the example centre mark 14C, (rather than close to the example start mark 14S), (and, broadly speaking, is provided close to the centre of the stud position defined by the gap mark). The reason for this is clearly shown by virtue of FIG. 4, (in combination with various other Figures, eg FIG. 3, for example). So, for example, looking at FIG. 4, and taking an example where there is a gap mark every eight inches, for example, it will be apparent that, if the embodiment in FIG. 4 is the same as the example embodiment of FIG. 3, for example, and if the gap marks are at eight inch intervals, for example, then if what is shown in FIG. 4 is carried out, the tape will then mark sixteen inches 'on centre' from the start of the plate. (It will also, in such an example, mark twenty-four inches 'on centre'). Therefore it can be seen that if, when lining the tape along the plate, the user starts, (at the start of the plate), at a centre of a stud position defined by one of the gap marks, (as shown, by way of example only), in FIG. 4, for example), the desired result can be achieved. Therefore the ideal part (of the tape) for the user to start at, at the start of the plate, is a centre of a stud position defined by one of the gap marks. Thus the 'centre', (in order to help the user understand ideal use of the product), is marked 'START', (in the example of FIG. 4). It is also marked 'CENTRE', in the example embodiment, (as shown in FIG. 2). (Since there is a centre mark 14C in the example, the words 'START' and 'CENTRE' are provided close to the example centre mark 14C. (It is even feasible a portion or a whole of one or both words may be provided 'within' the centre mark 14C, in some embodiments). (As has been stated, it is feasible, (as in the embodiment of FIG. 15, for example), that there may not be a centre mark 14C. (However, in the case of both examples, (ie what is shown in FIG. 2, for example, and FIG. 15, for example), there is an example tearable area 16, configured for tearing, to facilitate tearing the strip element, across the strip element, wherein a portion or a whole of the tearable area, (the whole of the tearable area, in the example(s) of FIGS. 2 and 4), is aligned with a centre of the stud position defined by the gap mark.

(Thus, in both examples, where the tearable area is, (once torn), is where the user would next start from, when next lining the tape along a plate(s)). This is best shown in FIG. 4, which is a good example of a tearing area 16, (wherein a portion or a whole of the tearable area is aligned with a centre of the stud position defined by the gap mark, has been torn, and the user is now lining the tape along a plate, with this as the starting point. (This is why the centre mark 14C in FIG. 4 is only half as thick as the centre mark in FIG. 2—because half of it has been removed via tearing the example tearable area, which, (as can clearly be seen in the example of FIG. 2), is at the centre of the example centre mark). (It can be seen that FIG. 2 is clearly an example of wherein a portion or a whole of the tearable area is aligned with the example centre mark). Thus this is why the centre mark, (most clearly in FIGS. 2, 3 and 4), is marked with the text 'START'. It helps the user understand where to start from, when next lining the tape along a plate(s), (as shown in FIG. 4). (It should be stated, FIG. 14, (and many other Figures), also show examples of there being a tearable area, wherein a portion or a whole of the tearable area is aligned with a centre of a stud position defined by the gap mark). (Note: In several Figures, (especially those that show the tape from a significant distance), the words 'START' and 'CEN-TRE' (as shown in FIG. 2, for example), are not shown, even though such word(s), (or the like), are preferably provided. For example, looking at FIG. 5, and FIGS. 12 and 13, preferably the words 'START' and 'CENTRE' are provided for each gap mark, (eg similar or same to as shown in FIG. 2, for example). Thus, looking at FIG. 5, (with reference to what is shown in FIG. 4, for example), preferably the word 'START' would be provided, close to the start of the plate, (similar or same to as shown in FIG. 4). So the same is the case, for example, for FIGS. 12 and 13. So, for example, looking at FIG. 12, preferably the word 'START' would be provided, close to the start of the plate, (similar or same to as shown in FIG. 4). These words are not shown on several of the Figures that show the tape from a distance, since the words would appear very small. It will be known to those with skill in the art that some patent offices publish/render patent application drawings at low resolution. This, com-bined with the words being small, (due to the view of the Figure showing the tape from a distance), may lead to the word(s) not appearing clearly. Thus they are not included, for this reason.

(Note: It will be noted, when a tearable area is shown in the Figures, it is shown in contrast colour to what is around it, (ie when it is shown against a black background, the tearable area is shown in dashed white lines, and when it is shown against a white background, the tearable area is shown in dashed black lines. This is simply for illustrative purposes, so that the tearable area denoted is clear to see in the drawing. (Hence why, in FIG. 23, the example tearable area is shown with a mixture of dashed black lines and dashes white lines)).

The tearable area is configured for tearing, and facilitates tearing the strip element, across the strip element. Looking at FIG. 2, (with reference to FIG. 4), it is clear the example tearable area 16 facilitates tearing across the tape, at a pre-determined place, (determined by the tearable area 16). This differs from 'freehand' tearing, (ie tearing without use of a tearable area), which can lead to unwanted/untidy/ messy results, (eg possibly deforming/misshaping the strip element, and/or the tear possibly not occurring at the (exact) place the user intended). (Furthermore, depending on what type of material(s) the strip element is made out of, 'free-hand' tearing may either be challenging to do, or (close to)

impossible). With some material(s) the tape could be made out of, a tearable area may be necessary, simply to allow for tearing at all.

Figures 10, 11:
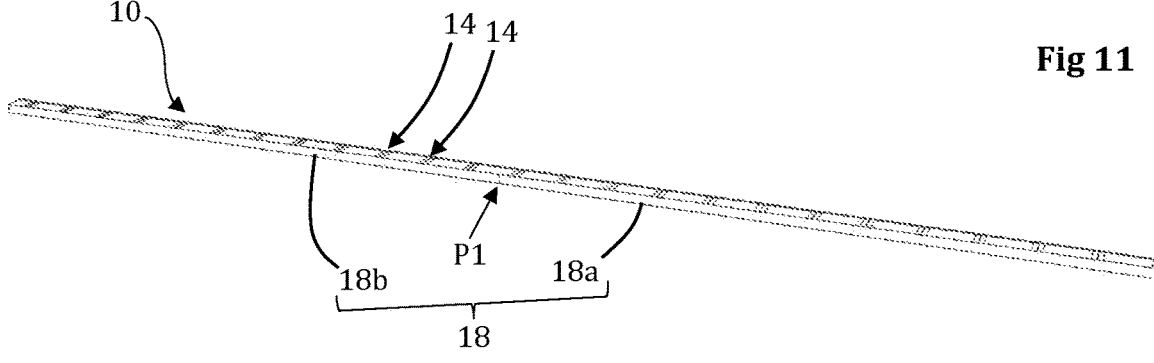
FIG. 10 is a front view, now showing the wall being erected, the studs now attached to the top plate and the base plate.
FIG. 11 is a perspective view, showing how the tape can even be used on a long wall, where the base plate comprises a plurality of pieces.
Figure 12:
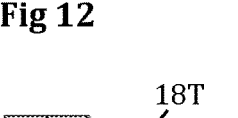
FIG. 12 is a view from above, showing an example of how two plates, (eg a top plate and bottom plate of a wall), can be marked simultaneously, with one length of tape.

Referring to FIG. 11, it will be known to those with skill (or even simply experience) in the art of wall building that sometimes, especially when a wall is long, a plate (eg the top plate and/or bottom plate) may be made out of more than one 'piece', (eg more than one piece of wood, for example, (if the plates are made of wood). For the sake of the present application, in such cases, these will be referred to as 'plate pieces'. FIG. 11 shows an example of a plate that comprises more than one plate piece. (There are two plate pieces, (example plate piece 18a and example plate piece 18b, in the example). (In FIG. 11, point P1 generally shows the place where the example plate pieces 18a, 18b meet). In other examples, a plate may even comprise more than two plate pieces). FIG. 11 shows how a plurality of plate pieces can be lined up, (the example plate pieces 18a and 18b are shown lined up), and tape can be lined along them, (almost treating the pieces as one piece). (Whilst this may not be the case in many situations, (especially if the tape was lined up along a thinner side of the plate, (ie a 1.5 inch thick side, if the plate is a '2 by 4', (ie 1.5 inch by 3.5 inch), or a '2 by 6', (ie 1.5 inch by 5.5 inch)), (and thus, in this case, the thinner side of the plate pieces), it is possible, in some situations, that a user may want to move the plate, (eg turn the plate onto its side, (eg as seen in FIG. 8, for example), (or even to separate the plate pieces again). In such case, the user may possibly want to break the tape, to be able to separate the plate pieces, and/or to avoid the tape between the plates becoming problematic, (eg to stop it twisting, if the plate pieces are moved). In such case, the user can break the tape. (For example, they may tear the tape, using a tearable area 16. Or they may cut the tape, (eg using a box cutter, or scissors, etc). If they cut the tape, (or, more broadly, break the tape in any way), they may do this at the point (P1) where the plate pieces meet. It is feasible they may even use more than one tearable area, (eg one on plate piece 18a and one on plate piece 18b, for example). Thus various options are possible. Nevertheless, in any case, the tape being attached to the plates, (eg by being stuck to the plates), would mean that, even if the tape were broken, (eg torn), tape that remains on each plate piece can continue to do its job, in terms of facilitating stud positioning. (And this is of course the case, even if the plate comprises more than two plate pieces). (Note: Even in a situation as shown in FIG. 12, where a tearable area has been torn, (at the last gap mark shown along the plate, at the top of the view shown in FIG. 12), in an embodiment such as that shown in FIGS. 11 and 12, because a start mark remains, (as clearly shown in the top gap mark in the view of Fog 12, where the tearable has been torn), that stud position is still marked, (and can be used, by a user, to line up (and thus position) a stud)). Thus, having been broken, (eg by being torn, or cut, for example), and even if the plate pieces are separated at all, the plate pieces can be re-aligned, and the tape can continue to do its job, with reference to facilitating stud positioning.

(Note: The term 'break', (with reference to breaking the tape), is here used as an extremely broad term, and includes within its scope any way of breaking the tape. It includes within its scope cutting, tearing, etc, (or any other way of breaking the tape). (It will be known that some people use their teeth, to 'break' sticky tape, for example. When a person does this, this is another example of 'breaking' tape). It will be apparent that use of a tearable area 16, configured for tearing, to facilitate tearing the strip element, across the strip element, (ie tearing a tearable area 16), is one way of 'breaking' the tape. Other ways, for example, include cutting the tape, (eg with scissors, of a box cutter, or any cutting tool(s), (and/or any (appropriate) tool/implement that can be used for cutting)). Another example of how to break tape is, (dependent on whether the tape is made out of material(s) that are conducive to it), tearing the tape 'freehand', (ie without use of a tearable area). However, tearing the tape 'freehand' may result in a messy/untidy tear. It may distort the tape, (if the material(s) the tape is made of is not conducive to tearing). (It may even be extremely hard, (or seemingly impossible), to tear the tape, 'freehand', if the tape is made out of material(s) that are extremely unconducive to tearing). (Thus, in the present application, the term 'break', (with reference to 'breaking the tape'), is a broad term)).

(It will be apparent that various Figures, (especially those that show the tape at distance), show examples of a plurality of gap marks, along the tape).

(It will be apparent that various examples are shown in the drawings of wherein a plurality or all of the gap marks are at repeating intervals. (FIGS. 3, 5, 6, 7, 8, 10, 11, 12, 17, 18, 20 and 21 perhaps best show examples of this). (Note: Regarding FIGS. 18 and 21, these embodiments are within a scope of wherein a plurality or all of the gap marks are at repeating intervals. For example, in FIG. 18, there are gap marks, (for positioning studs at sixteen inch intervals), that are at repeating intervals of sixteen inches. Thus this example is within a scope of wherein a plurality or all of the gap marks are at repeating intervals. (Furthermore, there are gap marks, (for positioning studs at twenty-four inch intervals), that are at repeating intervals of twenty-four inches). Similarly with FIG. 21, there are gap marks, (for positioning studs at forty-five centimetres (450 mm) intervals), that are at repeating intervals of forty-five centimetres. Thus this example is within a scope of wherein a plurality or all of the gap marks are at repeating intervals. (Furthermore, there are gap marks, (for positioning studs at sixty centimetres (600 mm) intervals), that are at repeating intervals of sixty centimetres).

If a stud gap marker tape embodiment has, from the first gap mark of the tape, (eg from the first gap mark of a roll of stud gap marker tape, (as shown in FIG. 1, for example), intervals between gap marks of 8 inches, then it will be apparent, (given the American standard of stud gaps of 16 inches (or sometimes 24 inches), that the second gap mark, for example, is of no great value. Thus an embodiment could be provided where that particular gap mark, (ie what would have been the second gap mark in an embodiment where the intervals between the gap marks are 8 inches), is missing, (ie is not provided). Thus, (if that was the only gap mark missing), there would be an interval of 16 inches from the first gap mark of the tape to the second gap mark of the tape, and then an interval of eight inches between the other gap marks. (This example is given simply by way of example only). Nevertheless, such an embodiment would still be within a scope of wherein a plurality or all of the intervals are 8 inches. (So the same would be the case for the same situation, with an embodiment where the intervals were 20 cm, (except an interval of 40 cm between the first and second gap mark), which would nevertheless be within a scope of wherein a plurality or all of the intervals are 20 cm. Similarly, if a stud gap marker tape embodiment has, from the first gap mark of the tape, (eg from the first gap mark of a roll of stud gap marker tape, (as shown in FIG. 1, for example), intervals between gap marks of 15 cm, then it will be apparent, (given the Australian standard of stud gaps of 45 cm (or sometimes 60 cm), that the second and third gap mark, for example, is of no great value. Thus an embodiment could be provided where those particular gap marks, (ie what would have been the second and the third gap mark in an embodiment where the intervals between the gap marks are 15 cm), are missing, (ie are not provided). Thus, (if they were the only gap mark missing), there would be an interval of 45 cm from the first gap mark of the tape to the second gap mark of the tape, and then an interval of 15 cm between the other gap marks. (This example is given simply by way of example only). Nevertheless, such an embodiment would still be within a scope of wherein a plurality or all of the intervals are 15 cm.

It has been shown that, with gap marks at eight inch intervals, the tape can facilitate stud positioning at sixteen inches, (via two gap mark intervals), and also at twenty-four inches, (via three gap mark intervals). Thus this is an example, (provided by way of example only), of wherein the tape marks at sixteen inches, (via two gap mark intervals); and at twenty-four inches, (via three gap mark intervals). (So it has also been shown that with gap marks at twenty centimetre intervals, the tape can facilitate stud positioning at forty centimetres, (via two gap mark intervals), and also at sixty centimetres, (via three gap mark intervals). Thus this is an example, (provided by way of example only), of wherein the tape marks at forty centimetres, (via two gap mark intervals); and at sixty centimetres, (via three gap mark intervals). Not dissimilarly, it has also been shown that, with gap marks at fifteen centimetre intervals, the tape can facilitate stud positioning at forty-five centimetres, (via three gap mark intervals), and also at sixty centimetres, (via four gap mark intervals). Thus this is an example, (provided by way of example only), of wherein the tape marks at forty-five centimetres, (via three gap mark intervals); and at sixty centimetres, (via four gap mark intervals). The examples provided are provided by way of example only.

Note: Particular focus is given, in the present application, to embodiments wherein a plurality or all of the intervals are a multiple of eight inches. (This is because the American standard, for stud gaps, is sixteen inches, (or twenty-four inches)). However, (especially since there are such similarities with a plurality or all of the intervals being a multiple of twenty centimetres, (ie the stud gaps being forty centimetres or sixty centimetres, for example, being at the same ratio as the American standard of sixteen inches or twenty-four inches)), any disclosure relating to interval(s) being a 'multiple of eight inches', (and, in particular, disclosure relating to eight inches/sixteen inches/twenty-four inches), should be seen as support, (for a claim(s), for example), for a plurality or all of the intervals being a multiple of twenty centimetres, (and, in particular, disclosure relating to twenty centimetres/forty centimetres/sixty centimetres), (and vice versa). (It should be stated, whilst the ratio between the Australian standards of 45 cm or 60 cm is different, nevertheless, there may be disclosure, relating to interval(s) being a 'multiple of eight inches', (or a multiple of twenty centimetres), that is relevant to interval(s) being a multiple of 15 cm. Thus this, (ie interval(s) being a multiple of 15 cm), gets all the benefit of, (and may draw from), such disclosure).

It will be apparent that there has been disclosure, in the present application, of wherein a plurality or all of intervals are a multiple of 8 inches. It will be apparent that there has been disclosure of wherein a plurality or all of intervals are 8 inches. It will be apparent that there has been disclosure of wherein a plurality or all of intervals are 16 inches. It will be apparent that there has been disclosure of wherein a plurality or all of intervals are 8 inches. It will be apparent that there has been disclosure, in the present application, of wherein a plurality or all of intervals are a multiple of 20 cm. It will be apparent that there has been disclosure of wherein a plurality or all of intervals are 20 cm. It will be apparent that there has been disclosure of wherein a plurality or all of intervals are 40 cm. It will be apparent that there has been disclosure of wherein a plurality or all of intervals are 60 cm. It will be apparent that there has been disclosure, in the present application, of wherein a plurality or all of intervals are a multiple of 15 cm. It will be apparent that there has been disclosure of wherein a plurality or all of intervals are 15 cm. It will be apparent that there has been disclosure of wherein a plurality or all of intervals are 45 cm. It will be apparent that there has been disclosure of wherein a plurality or all of intervals are 60 cm.

In Use

An example(s) will now be described in use, described by way of example only, referring to a particularly preferred embodiment(s), (where the tape comprises gap marks at eight inch intervals, where there is a tearable area, (to facilitate tearing the tape, across the tape), for each gap mark, (at a centre of the stud position by the gap mark), where a portion or a whole of an underside of the tape is adhesive, (sticky), to facilitate sticking the tape to the plate, and where the studs are to be placed sixteen inches on centre), in no way limiting a scope of the invention. (Note: Step(s) are not necessarily provided in chronological order, (even if words such as 'then', or 'now', or 'after this' (or the like) are used), and, within reason, may be carried out in any order that is fitting/appropriate. Thus the order any step(s) is described in should be assumed to simply to be a 'preferred' order).

Thus, referring in use (by way of example) to a particularly preferred example, in use, the user sticks the tape down, starting at a start of one of one (or both, if the user is marking both plates with one length of tape, simultaneously) wall plate(s), (ie the top and bottom plates, if the plates are a bottom and top plate of a wall, for example), starting, (with regard to the tape), at a centre of a stud position defined by a gap mark. The user now carefully sticks the tape to the plate, along the plate, making sure to try to keep the tape straight, to make sure the gap marks of the tape accurately mark the stud positions). (Since the tape, (in a preferred embodiment), comprises gap marks at eight inch, if the studs are to be positioned sixteen inches on centre, the tape has now successfully marked the stud positions, (at every other stud mark—ie at two gap mark intervals), along the plate (s)). There are various techniques the user may use, in adhering the tape(s) to the plate(s). For example, (in trying to get the tape as straight as possible), the user may stick the tape down at the start of the plate, (as shown in FIG. 5, for example), and may then pull the tape all the way to the end of the plate, (without adhering it between the start and the end of the plate), pulling it taught, and then engaging the plate with the tape at (or towards) the end of the plate, thus sticking it down there as well. This may help line up the tape straight, along the plate. Alternatively, the user may stick the tape down, along the plate, as the tape travels along the plate. (If they do this, care may need to be taken, to keep the tape straight). The user may, or may not, line the tape up with an edge(s) of the plate, which may help line up the tape straight. Alternatively, (if the tape is less wide than the plate surface it is being attached to, for example, (or even if it is not)), the user may line the tape up down the centre of the plate surface it is being attached to, which may also help line the tape up straight.

Once the user comes to the end of the plate, they have options for where to break the tape, (eg by tearing, for example, (whether taring is done via use of a tearable area, or not)). One possible option is to tear the tape at the last gap mark of the tape, before the end of the plate. (It will be known to those with skill, (or simply knowledge), in the art of wall building that a stud will tend to go at the start of the plate, and a stud will tend to go at the end of the plate. (This does not need any special gap measuring, because they tend to literally be positioned right at the start, and right at the end, of the plate). Since studs, (eg in America), are usually 1.5 inches thick, this means that the first and last 1.5 inches of the plate will tend to be 'occupied' by the first and last stud. Those with skill (or simply knowledge) will also know that it is considered best practice, even if the penultimate stud is very close (or right next to) the final stud, to nevertheless include that stud as part of the wall. (Please see FIG. 10, for an example of this, where it can clearly be seen that the end stud, (at a last side of the wall, in terms of the view shown in FIG. 10), has another stud, (which may be termed the 'penultimate' stud), very close to it. Therefore a good place, for example, to tear the tape may be at the last tearable area before the final stud, (ie before the final 1.5 inches of the plate, if the stud thickness is 1.5 inches). (Note: If the last gap mark before the end of the plate does not give enough room for a stud to be placed, (ie 'overlaps' with where the final stud will go), then there is an argument for the user to tear the tape at the gap mark before that one, (or even the gap mark before that, if that is where the final stud before the end stud will go). (Of course, this could be done very quickly, without consideration for whether the tearable area of the gap mark that the tape is torn at will actually be used as a real stud position. If the user takes time to actually check, (ie counting alternate gap marks, (if the gap marks are at eight inches and the studs are being placed at sixteen inches on centre), to know which gap marks of the tape will actually become real stud positions, then they could tear the tape at the last gap mark that will be used as a real stud position, for sure. (Even in this case, they may choose to tear the tape at the next tearable area after the final gap mark that will be used as a 'real' stud position, because, if the tearable area is at a centre of the stud position the gap mark marks, (and if the gap mark marks the end of the gap mark, (eg with an end mark 14E), for example), they may want to retain the whole gap mark, rather than part of it being removed via tearing the tearable area). It should also be said, the user may tear the tape at a tearable area that comes after the end of the plate, (and it should also be stated, if, on the off-chance, a tearable area happens to be dead level with the end of the plate, the user may tear the tape exactly level with the end of the plate. (Note, it should be stated, the user may use any tearable area 16 they so choose. So if there is a tearable area that is within the last 1.5 inches of the plate, they may still use that, (or even a tearable area that comes after the end of the plate). Any tearable area 16 may be used) (In either/any case, it will be apparent that tearable areas are of great use, and provide a very quick and elegant way to 'break' the tape). Thus, broadly put, the user may tear the tape before, exactly at, or after, the end of the plate. (If a user tears the tape at a tearable that is after the end of the tape, and there is excess tape after the end of the tape, the user may either attach it to the plate, (eg wrapping it around the end of the plate, (preferably by sticking it to the plate, (if a portion or a whole of the underside of the tape is adhesive)), or may break the tape in any other way, (eg cutting it, (eg with a box cutter or scissors, for example)). However, one of the intents of there being tearable areas is that such tool(s), (or, more broadly put, 'any' tool(s)), are not needed. Furthermore, in the examples in the Figures, where the tearable area facilitates tearing the tape at a centre of a stud position the gap mark marks, a benefit is that the tape can be used on the next plate to be marked, from where the tape has been torn, to again mark stud positions correctly, along the plate.

(Note: Much mention has been given to tearing via use of a tearable area 16. However, it should be stated, if the tape is made of appropriate material(s), (ie that allow the tape to be torn, across the tape, to break it, even without use of a tearable area), the user may break the tape, without use of a tearable area, (ie simply by ripping/tearing it, at any desired place). For example, looking at FIGS. 7 and 11, it can be seen that the tape ends flush with the end of the plate, (on the left side of the Figure, with reference to the view shown in those Figures). This could, (feasibly), be because there happened to be a tearable area there, (in some embodiments). However, in the case of FIGS. 7 and 11, it is because the user has broken the tape, without use of a tearable area. This may have been done just by 'freehand' tearing, (ie tearing without a tearable area 16, configured for tearing), or, for example, it may have been done using a tool(s)/implement(s), (eg scissors, or a box cutter, for example, or, for example, another bladed tool(s)), for example). If the tape is of appropriate material(s), and they have torn the paper, 'freehand', looking at FIGS. 7 and 11, (where it seems the tape is 'flush' to the end of the plate), this 'flush' finish may have been achieved by 'bending' the tape against the edge at the end of the plate, and either letting the tape tear due to pressure applied against the end edge of the plate, or my manipulating the tape to tear, (eg ripping it a bit, to start the tear), and then using pressure against the end edge of the plate, to tear it 'neatly', trying to get it flush to the end of the plate. (It is also feasible a combination of techniques could be used, eg, (looking at FIGS. 7 and 11), possibly by tearing the tape at a tearable area after the end of the plate, (or by tearing it 'freehand', at a place after the end of the plate), and then using a cutting tool(s), (eg scissors, or boxcutter, etc), to get the tape flush to the end of the plate, as shown. (However, it is not a requirement for the tape to end up 'flush' against the end of the plate).

If the tape has been lined up along just one plate, then the process can be repeated with the other plate. (Note: With a tearable area being at the centre of a stud position a gap mark defines, if the user has torn the tape at such a tearable area, the user can then use the tape on the next plate, (as shown in FIG. 4, for example), with the gap marks now again facilitating stud positioning at sixteen inches on centre, (or twenty-four inches on centre), (in the 'eight inch interval' preferred embodiment). However, as alluded to in FIG. 12, the tape can be used on two plates simultaneously, (ie with one length of tape). This can speed up the process even more. (Note: In FIG. 12, this is shown being done on two plates, (an example top plate and bottom plate of a wall), on the thinner sides of the plates, (which are 1.5 inches thick, if they are '2-by-4's' or '2-by-6's'). However, the same could easily be done on the broader side of the plates, (which are 3.5 inches wide, if they are '2-by-4's', or 5.5 inches wide, if they are '2-by-6's'). A benefit of using the tape on the thinner side of the plates is that the tape will cover a greater percentage of the surfaces than if it were used on the broader sides of the plates. (Some users may also have a preference for marking the plates on the thinner side, rather than the broader side, (or vice versa)).

However, it should be stated, having marks on the broader side of the plate, (as shown in FIG. 8, for example), can be helpful, if any of the studs are twisted. It can give good guidance to help the user attach the studs to the top and bottom plate as 'untwisted' as possible. (This can be done by physically trying to manipulate them, to correct any twisting, and attaching them, (eg with a power tool), to try to maintain the 'untwisted' state they are in). Some like to have marks both on the thinner side and the broader side of one or both plates. (It is feasible a user could use the tape to mark both the thinner side and the broader side of the plate). (Note: It should also be stated, whilst an example is shown, (in FIGS. 12 and 13), of tape being lined along a plurality of plates simultaneously, on the thinner sides of the plates, it should also be stated that lining tape along a plate, (not simultaneously with any other plate), could be done on a thinner side of the plate, (if the user so desired).

Thus, if the plates are being marked simultaneously, the tape is stuck to the plates, with a portion along the top plate, and a portion along the bottom plate, (as shown, for example, in the example of FIG. 12). (It could be said, in the example, that a 'left' portion of the tape is lined up along one of the plates, and a 'right' portion of the tape is lined up along the other plate). (Preferably it is exactly (or almost exactly) half of the tape along one plate, and exactly (or almost exactly) half along the other plate, although this is not necessary, (ie it does not have to be so precise)). (Note: Whilst in most of the Figures, the tape is shown in an embodiment where it is approximately 2.5 inches wide, the tape could come in greater width, (eg 3 inches, for example). (It could be wider, or less wide than 2.5 inches). A benefit of 3 inch width would be that, if the plates are 1.5 inches thick, then if the tape is used to mark two plates, (eg the bottom and top plate) simultaneously, the width of the tape, and the thickness of the two plates together, would be the same. This is elegant/beneficial, because, the marks would go right to the edge of the surface of the plates that it is lined along, (and it may also be helpful, to help line the tape up, along the plates).

Once the tape has been lined up along the plates, (and stuck to the plates), it can be broken, (in much the same way as previously described, eg via tearing). It can then be separated, so that the portion lined along (and preferably stuck to) one of the plates, (eg the top plate), is separated from the portion lined along (and preferably stuck to) the other plate, (eg the bottom plate). Preferably this is done via cutting, (eg with a box cutter, (or any other cutting tool, (and/or, more broadly, by any appropriate tool(s)/implement(s)). (Note: The tool/implement may not have to be sharp, but sharpness may or will help make cutting the tape easier). Any (slight) gap between the two plates may make it easier to carry out the cut, (either due to being able to see the gap through the tape, (if the tape is of a material(s) that the gap can be seen through), and/or because a portion of the tool/implement used, (eg at least a portion of a blade of a cutting tool, (eg of a box cutter, for example)), may be able to travel into the gap, the gap thereby acting as a guide for the cut). (This can also help speed up the cut, by helping the cut be made at the right place, therefore allowing the user to make the cut quicker than if they had to take greater care to make the cut right). (The dashed line of FIG. 12 is intended to denote the distinction between the two plates, (and therefore there may be a gap, where the dashed line is), (but is shown dashed, to denote that it may be partially or fully obscured by the tape, in the view shown, because it is underneath the tape). (If the tape is not transparent, it can be obscured fully. If the tape is partially transparent, it can be obscured partially). (Note: It is feasible the tape may have a tearable area(s), to tear the tape along the tape, (thus not requiring it to be cut). In such case, the dashed line, (irrespective of what it is primarily intended to denote), may be considered to be/represent such a tearable area, (configured for tearing, to facilitate tearing the tape, along the tape). However, having a tearable area(s), to tear the tape along the tape, may cause issues. For example, it may interfere, (and/or be interfered with), by a tearable area(s) that facilitates tearing the tape, across the tape, (rather than along the tape), which could lead to tearable area that facilitates tearing across the tape being torn, when the intent was only to tear the tearable area(s) that tear long the tape, (and vice versa). However, even if a tearable area(s) that facilitates tearing the tape along the tape is not provided, it should be stated that a mark(s) that marks along the tape, (preferably centrally, along the tape), may be provided. Thus a mark(s) may be provided, along the tape. For example, looking at FIG. 12, if the dashed line is now interpreted, for example, as being a mark along the tape, it will be clear that it can function as a guide. This could be useful for several reasons. For example, it may help the user line the tape up correctly, along the plates. (For example, such a mark(s) may be helpful in centring the tape, if the mark(s) is centred along the tape). Secondly, it may help them separate the tape at the right place. Preferably, such a mark(s), (if provided), is central, along the tape. In another embodiment, something as simple as dots may be provided, (eg a dot(s) within and/or before and/or before each gap mark, for example, simply to act as a guide. (Again, this could be useful for lining up the tape along the plates, and/or for separating the tape at the right place). In another embodiment, the tape may comprise a line, (eg dashed, dotted, or not), to denote this. Or, a plurality of dots, (or any other relevant shape) may be used, (eg a dot, between each gap mark, for example, centred along the tape, for example, to act as a guide). (These are just two possible embodiments, and it will be apparent, that a vast array of options and/or embodiments are possible. Thus the examples are provided by way of example only). Thus, broadly stated, a mark(s) may be provided, (for any of those reasons).

Figure 17:
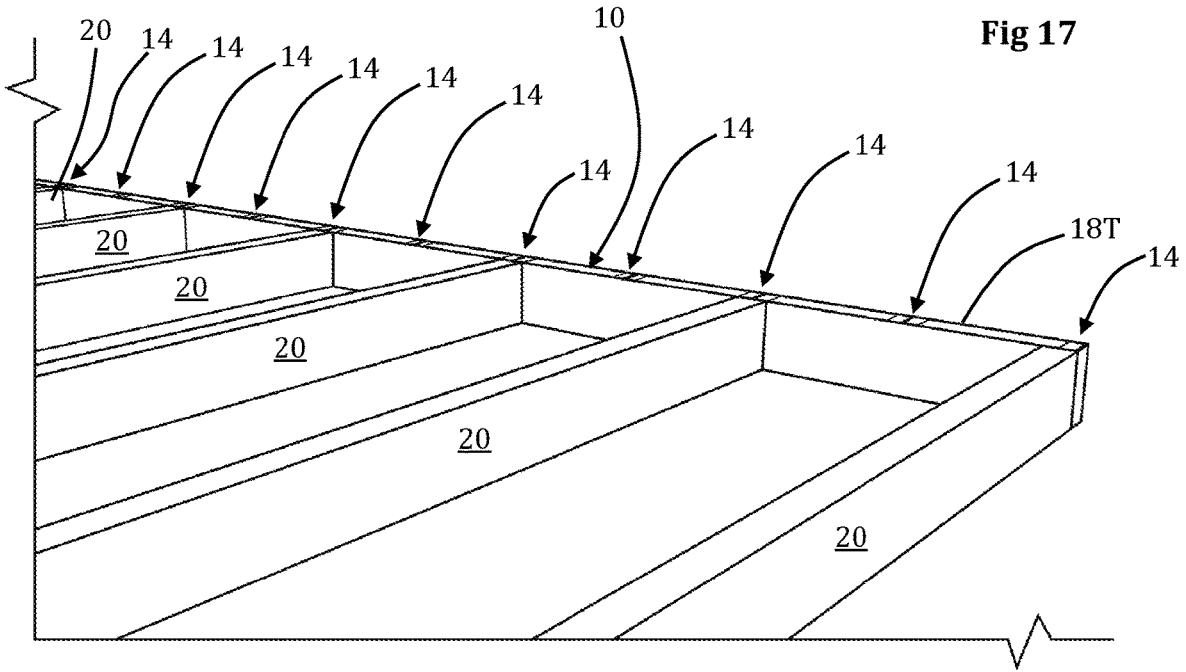
FIG. 17 is a perspective view, showing the same view as shown in FIG. 8, but now showing wherein the tape is lined up along the thin side of the plate, rather than the broad side as shown in FIG. 8.

With the plates having been marked, it is time to position the studs. This is usually done, (as shown in FIGS. 8, 9 and 17), by facing the plates towards each other, (often simply on the floor, (or on any relevant surface)). However, it may feasibly be done in any orientation, (eg upright, for example). A stud or studs is then positioned, using the gap marks. (They can be positioned one at a time, with each stud attached to the top and bottom plate, before the next stud is positioned (and attached), or several (or preferably all) can be positioned, before they are all attached. The studs tend to be attached by screw(s), (screwing each stud into both the top plate and bottom plate), (usually via use of a power tool). However, any method of attaching them, (and any combination of methods), may be used, (eg nail(s) and/or glue, etc). Screwing them to the top and bottom plate is considered best practice, and is usually carried out using a power tool.

(It will be noted, (looking at FIGS. 8, 9 and 17), that the tape can be used highly effectively, to facilitate stud positioning, whether it is used on the broad side of the plates, (as is shown in FIGS. 8 and 9), or the thinner side of the plates, (as is shown in FIG. 17).

With the studs having been attached, (and the first and last studs, (at the start and end of the plates), having been attached), if the wall is on its side, (as shown in FIGS. 8, 9 and 17), it can now be erected, (as shown in FIG. 10). The tape can save a significant amount of time, and work/effort.

Referring to FIG. 18, there is shown another embodiment of stud gap marker tape 10, showing a cut-off view of the example, along a plate, directly from above. A plurality of gap marks 14 are shown. In the example, the tape facilitates stud positioning at either sixteen inch gaps, or twenty-four inch gaps. (Either is possible). From where the tape/plate starts, it can be seen that the next gap mark is sixteen inches away. (It is annotated with the number '16', to show the user that it is a gap mark the user will use, if the user is positioning studs at sixteen inch intervals). It can be seen, (looking at the example gap mark the tape starts at, at the start of the plate, that, in the example, (much like the example of FIG. 4), the example tape is starting, (at the start of the plate), at a centre of a stud position defined by the gap mark. (In the example, a tearable area 16 has been torn, here). (In the example embodiment, there is a tearable area, aligned with the centre of the stud position that is defined by the gap mark, for all the example gap marks). There is also a gap mark twenty-four inches along the plate. That gap mark is annotated with the number '24', to show the user that it is a gap mark the user will use, if the user is positioning studs at twenty-four inch intervals. (It can be seen, in the example, that, unlike some other embodiments shown, there is no gap mark at an eight inch interval from the first gap mark, (at the start of the plate). (It should be stated, in other embodiments, such a gap mark at an eight inch interval may, or may not, be provided, and the gap mark shown is provided by way of example only). In the example, (due to the view being cut off), there is only a total, (not including the gap mark at the start of the plate), of three gap marks at sixteen inch intervals along the plate. In the example, (due to the view being cut off), there is only a total, (not including the gap mark at the start of the plate), of two gap marks at twenty-four inch intervals along the plate. Because three sixteens is forty-eight, and two twenty-fours is forty-eight, the final gap mark shown on the plate, furthest right of all the gap marks from the view shown in the Figure, defines a stud position, whether positioning studs at sixteen inches on centre, or twenty-four inches on centre. (It will be known, to those with skill/experience in the art of wall building, (and who know American standards, for example), that stud at forty-eight inches is of particular importance, because sheeting that goes over the studs tend to be forty-eight inches in size. They tend to be attached to the stud(s) that is at forty-eight inches, as part of making the wall. Depending on size of the wall, the next sheeting may then be attached to that stud, and to a stud another forty-eight inches away). Thus that gap mark is annotated both with the number '16' and '24'. A close-up cut-off view of that gap mark is shown in FIG. 19. (Note: The word 'START' is shown, in FIG. 19. That word is not included for the gap marks in FIG. 18, simply due to how small the gap marks appear, from the view of FIG. 18. (It will be known to those with skill in the art that some patent offices publish/render patent application drawings at low resolution. This, combined with the word being small, (due to the view of the Figure showing the tape from a distance), may lead to the word(s) not appearing clearly. Thus they are not included, for this reason)). It can be seen that the example gap mark of FIG. 19 is an example that marks a centre of the stud position defined by the gap mark. (An example start mark 14C is shown). In the example embodiment, the example gap mark marks a start of the stud position defined by the gap mark. In the example embodiment, the example gap mark marks an end of the of the stud position defined by the gap mark. (However, the example is shown simply by way of example only). (Whilst the example centre mark 14C does not go the whole way across the gap strip element, it nevertheless clearly marks the centre of the stud position defined by the gap mark. Thus the example gap mark shown is an example of a gap mark that marks the centre of the stud position defined by the gap mark.

In use, (referring to FIG. 18 particularly), if the user wants to place studs at sixteen inches on centre, they simply start at any gap mark that is for 16 inch intervals. (In the example the annotations of '16' make it particularly easy to know which gap marks are for this). (Such annotations may appear at a different position from in the example shown, which is shown by way of example only). The user then starts lining up the tape, from the start of the tape, from the example centre mark 14C of one of the gap marks for 16 inch intervals. In the example embodiment, if they want, they can tear the example tearable area 16, (please see FIG. 19). This may make it easier to line the tape up at the start of the plate, exactly. As stated elsewhere in the present application, preferably a portion or a whole of an underside of the strip element is adhesive, to facilitate sticking the strip element to a plate. Thus much the same process as has been described in the present application can be carried out by the user. It is clear, from looking at FIG. 18, that the tape is facilitating stud positioning at sixteen inch on centre. (If the user wants to place studs at twenty-four inches on centre, they can carry out much the same process, but starting at any gap mark that is for 24 inch intervals. (In the example the annotations of '24' make it particularly easy to know which gap marks are for this). Thus it can be seen, the example embodiments allows for either option, (16 inch intervals, or twenty four inch intervals). (It should be noted, an embodiment could be provided that only facilitates 16 inch intervals, (not having gap marks that only are for 24 inch intervals), and an embodiment could be provided that only facilitates 24 inch intervals, (not having gap marks that only are for 16 inch intervals). However, an embodiment that allows for both is preferred.

Whilst it may be beneficial for it to be so clear where sixteen inch and/or twenty-four inch gap marks are, a potential negative of such embodiments is that it may (or will) lead to more wastage of tape, compared to embodiments that facilitate stud positioning at sixteen inch intervals or 24 inch intervals, by having gap marks at eight inch intervals. For example, looking at the example of FIG. 18, if it is imagined that where the view is cut off, (on the right of the Figure) is actually the end of the plate, and if the user is positioning studs 24 inches on centre, then it will be apparent that there is only about perhaps four or five inches of tape, after the final 24 inch gap mark. Now, when the user wants to line the tape along another plate, for stud positioning at 24 inches on centre, approximately the next 20 inches of tape, (after where the tape is shown going to, on the right side of FIG. 18), is of no value, since the user will simply start the measuring, on the next plate, from the next gap marks that is for 24 inch intervals. With an embodiment where the user can start at any gap mark, every eight inches, there is less wastage of tape.

Referring to FIG. 20, there is shown another embodiment of stud gap marker tape 10, showing a cut-off view of the example, along a plate, directly from above. A plurality of gap marks 14 are shown. In the example, the gap marks are at fifteen centimetre intervals. Australian standards are for studs to be positioned at either 450 mm (45 cm) intervals, or 600 mm (60 cm) intervals. Thus an embodiment such as this may be extremely useful, since, if a user wants to position studs at 45 cm on centre, for example, they can simply position a stud at every three gap mark intervals, (three fifteens is forty-five); and if a user wants to position studs at 60 cm on centre, for example, they can simply position a stud at every four gap mark intervals, (four fifteens is sixty).

(The example otherwise functions extremely similarly to tape embodiments that have been disclosed, where a plurality or all of the gap marks are at eight inch intervals).

Referring to FIG. 21, there is shown another embodiment of stud gap marker tape 10, showing a cut-off view of the example, along a plate, directly from above. Again, this embodiment is to facilitate intervals of either 45 cm, or 60 cm. The example embodiment functions much like the example embodiment of FIG. 18, but instead of having gap marks for 16 inch intervals and gap marks for 24 inch intervals, the embodiment has gap marks for 45 cm intervals, and gap marks for 60 cm intervals, (which will be apparent, due to example annotations). It otherwise functions extremely similarly to the example of FIG. 18, (which has been described in detail).

In FIG. 22, similarly to FIG. 19, a close-up view if shown of the furthest most right gap mark that can be seen in FIG. 21. The example is provided by way of example only. (Note: The word 'START' is shown, in FIG. 22. That word is not included for the gap marks in FIG. 21, simply due to how small the gap marks appear, from the view of FIG. 21. (It will be known to those with skill in the art that some patent offices publish/render patent application drawings at low resolution. This, combined with the word being small, (due to the view of the Figure showing the tape from a distance), may lead to the word(s) not appearing clearly. Thus they are not included, for this reason)).

Broadly stated, a method of marking stud positions along a plate, for wall building, is provided, comprising: lining tape along a plate, the tape comprising a plurality of gap marks. (This is shown in the first box, (box 301) of the basic flowchart of FIG. 25, which shows a basic flowchart of a method for positioning stud(s) along a plate, and is also relevant to the first two boxes of the basic flowchart of FIG. 26, which shows a method of building a wall). Preferably the method of marking stud positions along a plate, for wall building, comprises attaching the tape to the plate. Preferably the attaching is done via sticking the tape to the plate, a portion or a whole of an underside of the tape being adhesive. (Note: Defining that the attaching is done via sticking the tape to the plate, (or that attaching is done via 'adhesion'), or the like, does not rule out that this may be done, in combination with any other methods. Thus if the tape is attached via sticking, and any other methods are used, (eg also using nail(s) and/or staple(s), for example), then that is considered to be within a scope of 'the attaching being done via sticking', (even if any other method(s) are used, on top of sticking). (Thus, as stated, if the tape is attached to the plate via a combination of sticking, (ie adhesion), and also any other method, then, for the sake of the present application, that is considered within a scope of 'attaching via sticking/adhesion', (even if it is done in combination with any other method). 'Sticking' is a preferred method of attaching. However, it is feasible other methods may be used. For example, the tape could be nailed to the plate, via a nail(s). (This could be done via hammer, or any other way, (with any tool configured for (or simply suitable for nailing)). However, it will be apparent that sticking the tape to the plate is particularly elegant, because it is simple and quick, (and does not require any other element(s), (eg nail(s)), or tools, (eg hammer, or any other tool).

(Examples have been disclosed wherein there are a plurality of gap marks, at intervals that are a multiple of eight inches).

Preferably a plurality or all of the gap marks mark a centre of a stud position defined by the gap mark, and the method comprises, (when lining the tape along the plate), starting, (at a start of the plate), at a said centre of a stud position defined by one of the gap marks.

Preferably a plurality or all of the gap marks mark at least one of: a start of a stud position defined by the gap mark; an end of the stud position defined by the gap mark. (Thus a method of building a wall may be provided, comprising lining up a start of a stud with a start of a stud position defined by a gap mark. Thus a method of building a wall may be provided, comprising lining up an end of a stud with an end of a stud position defined by a gap mark. (Thus a method of building a wall may be provided, comprising lining up a start of a stud with a start of a stud position defined by a gap mark; and lining up an end of the stud with an end of the stud position defined by the gap mark)). (A good example of 'lining up' is shown in the close-up view of FIG. 9, for example).

Preferably a plurality or all of the gap marks are at eight inch intervals or are at twenty centimetre intervals. (The benefits of this have been made clear, ie that, at intervals of eight inches, the tape can facilitate stud positioning at sixteen inches, (via two gap mark intervals), and also at twenty-four inches, (via three gap mark intervals). Since sixteen inches and twenty-four inches are the American standards, this is particularly useful. (So the same for twenty centimetre intervals facilitating stud positioning at forty centimetres, (via two gap mark intervals), and also at sixty centimetres, (via two gap mark intervals).

(It is feasible a plurality or all of the gap marks are at fifteen centimetre intervals. This could be useful for facilitating stud positioning at forty-five centimetres, (via three gap mark intervals), and also at sixty centimetres, (via four gap mark intervals). (Studs positioned at forty-five centimetres or sixty centimetres is often done in Australia).

Preferably the method further comprises tearing a tearable area of the tape, the tearable area configured for tearing, to facilitate tearing the tape, across the tape. There are several reasons why this may be useful. One option, for example, is for a user, having torn the tearable area, when lining the tape along the plate, starting, (at a start of the plate), where the tape has been torn. (It should also be stated that it's feasible that when lining the tape along the plate, (at a start of the plate), lining up may start at the tearable area, and the tearable area may be torn after this).

Whilst it is feasible a tearable area(s) could be provided at any point along the tape, preferably, as has been made clear, there is a tearable area, configured for tearing, to facilitate tearing the tape, across the tape, wherein a portion or a whole of the tearable area is within a stud position defined by a gap mark. (Preferably there is a tearable area, wherein the whole of the tearable area is within a stud position defined by a gap mark). Most preferably, (due to it being particularly beneficial, (as has been alluded to and disclosed)), a portion or a whole of the tearable area is aligned with a centre of a stud position marked by a gap mark of the tape. (The benefit of this has been explained, (especially with reference to FIG. 4, for example, which shows an example of using the tape, starting, at the start of the plate, from where it has been torn. If the gap marks are at intervals of eight inches, for example, the tape will now mark both sixteen inches on centre, and twenty-four inches on centre).

However, it should be stated, whilst a tearable area, configured for tearing, to facilitate tearing the strip element, across the strip element, is a particularly elegant and beneficial solution, broadly speaking, the tape may be 'broken', (ie 'severed'), (which includes tearing within its scope), in any way. For example, (looking at the example of FIG. 2 (and then looking at FIG. 4, where a tearable area has been torn), if there was not a tearable area, it will be apparent that the user could user scissors, for example, (or any cutting tool, for example), to cut the tape effectively at the same place/point, (and with effectively the same result), as what is seen in FIG. 4, for example). Furthermore, the user could even, (depending on what material(s) the tape is made out of), potentially simply rip/tear the tape, 'freehand', (even if there is no tearable area). However, this could create several problems. Firstly, if the tape is not of material(s) that are easily torn, it could mis-shape/distort) the tape, (eg via twisting), (and generally not be ideal). Secondly, without there being a tearable area 16, in tearing the tape, it will likely tear in an irregular fashion/way. Nevertheless, this could feasibly be done, (eg, looking at the example of FIG. 4, (with reference to FIG. 2, for example), the tape could be ripped at a point before the example centre mark 14C, and the user could then use the centre mark, as the starting point, when lining up the tape along the next plate. Thus the tape could feasibly be broken, (using any relevant tool/implement, (ie any tool/implement that could be used to 'break' the tape, (the term 'break' here being a broad term, and, it should be said, including within its scope 'cutting', for example)), or simply being torn, 'freehand', without use of a tearable area. Thus tearing, (and use of a tearable area, to tear the strip element, across the strip element), is simply one example of 'breaking' the tape. (It should also be stated, if the tape is made out of materials that are non-conducive to tearing, (ie so that either the tape cannot be torn, or such that it will be very challenging for a user to tear, (possibly leading to the tape becoming distorted), then the importance of a tearable area, (in order to tear the tape), may, of course, become far greater).

(It should also be said, whilst the method is disclosed that facilitates positioning stud(s) along a plate, (using a tape that comprises gap marks), it will be known to those with skill/knowledge in the art of wall building that a stud tends to be positioned at the start of the plate, and a stud tends to be positioned at an end of the stud. (The tape is not needed, to know where these should be placed, because one stud tends to go right at the start of the plate, and one stud tend to go right at the end of the plate)). Thus, (with reference to any method for wall building), preferably a stud is positioned at a start of the plate. Thus, (with reference to any method for wall building), preferably a stud is positioned at an end of the plate).

In box 302 of FIG. 25, one or more than one stud is positioned along the plate, using a relevant gap mark of the tape. (Thus FIG. 25 charts a basic method of positioning a stud(s) along a plate).

(As has been stated, the tape could be lined up along each plate of the wall, (ie top plate and bottom plate), separately, (ie with two lengths of the tape), (eg as shown well in FIG. 7, for example), and/or the tape could be lined up along both plates simultaneously, (ie in one length of the tape), (eg as shown well in FIG. 12, for example). (Both are considered within a scope of 'lining tape along a plate'). (Note: The term 'and/or' is used here, since it is feasible tape both of what is shown in FIG. 7, for example, and FIG. 12, for example, could be done. (This would use three lengths of tape, in total). A user may feasibly do this, if they see benefit in having the tape lined along the broader sides of the plates, (as in the example shown in FIG. 7, for example), and also having the tape lined along the thinner sides of the plates, (as in the example shown in FIG. 7, for example)). (It should also be said, tape could be lined along the thinner sides of the plates, separately, (ie with two lengths of the tape—one for each plate), (similar to as shown in FIG. 7, (but along the thinner sides, rather than the broader sides). So, similarly, it is feasible that the tape could be lined up along the broader sides of the plates simultaneously, (ie in one length of the tape), (eg as shown well in FIG. 12, for example, (but along the broader sides, rather than the thinner sides). Thus various options and/or embodiments are possible).

(Whether tape is lined up along each plate of the wall, (ie top plate and bottom plate), separately, (ie with two lengths of the tape), or tape is lined up along both plates simultaneously, (ie in one length of the tape), either can be said to be within a scope of a method of marking stud positions along a plate, for wall building, comprising: lining tape along the top plate; and lining tape along the bottom plate; wherein the tape comprises a plurality of gap marks, to facilitate stud positioning). (As stated, preferably the method comprises attaching the tape to the plate). (FIG. 12 shows an example of where tape is lined along two plates, (in the example, a bottom plate and a top plate of a wall), simultaneously, with one length of tape).

Thus a method of building a wall may be provided, comprising: lining tape along the top plate; lining tape along the bottom plate; wherein the tape comprises a plurality of gap marks; positioning one or more than one stud along the plates, using the tape, to facilitate stud positioning; and attaching the one or more than one stud to the top plate and bottom plate.

(A basic flowchart is shown in FIG. 26. In box 401 of FIG. 26, tape is lined along a top plate of a wall, the tape comprising a plurality of gap marks, to facilitate stud positioning. In box 402, tape is lined along a bottom plate of the wall, the tape comprising a plurality of gap marks, to facilitate stud positioning. In box 403, one or more than one stud is positioned along the plates, between the plates, (using a relevant gap mark along each plate). In box 404, the one or more than one stud is attached to the top plate and the bottom plate).

(In the example of FIG. 7, an example is shown, broadly speaking, of a first length of tape having been lined along a first plate; and a second length of tape having been lined along a second plate. (In the example, the plates are a top plate and a bottom plate of a wall). In the example of FIG. 7, an example is shown, broadly speaking, of a length of tape having been lined along a first plate; and a second plate. (In the example, the plates are a top plate and a bottom plate of a wall). With reference to the method of marking stud positions along a top and bottom plate of a wall simultaneously, (and, more broadly, a method of marking stud positions along a plurality of plates, simultaneously, a plurality of plates are shown positioned next to each other. What is also shown is tape that has been lined along the plates simultaneously, with one length of tape. (It can be seen that the tape comprises a plurality of gap marks, to facilitate stud positioning). (Note: With reference to the plates being positioned next to each other, they don't have to be touching. But it may be helpful if they are touching, to get them as close together as possible).

Figure 13:
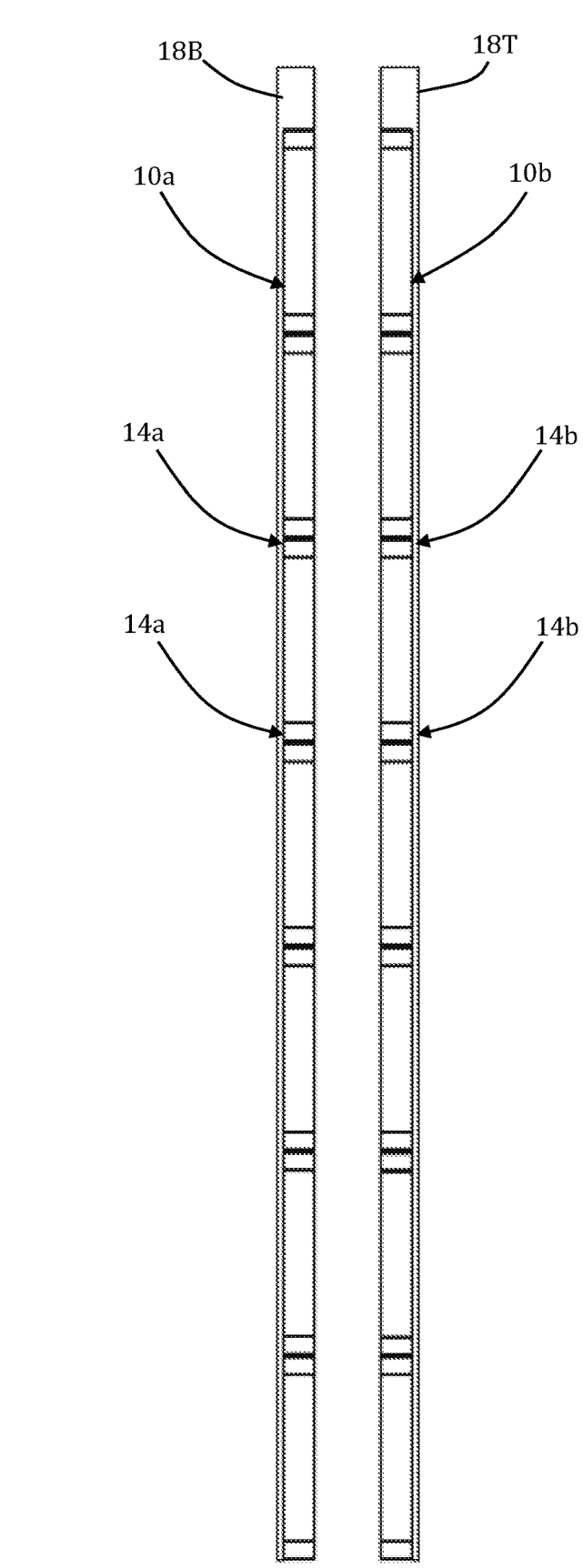
FIG. 13 is a view from above, showing the two plates of FIG. 12, with the plates and tape now separated, each plate marked with a portion of the one length of tape.

With reference to lining tape along the plates simultaneously, (and looking at FIG. 12), preferably the tape is separated, to separate a first portion lined along the first plate, and a second portion lined along a second plate. (Note: The portion (of tape) lined along a first plate may be referred to as a 'first portion' and may be referred to as a 'first plate portion' (of tape). Similarly, the portion (of tape) lined along a second plate may be referred to as a 'second portion' and may be referred to as a 'second plate portion' (of tape). If the plates are a top plate and a bottom plate, the portion lined along the top plate may be referred to as a 'top plate portion' (of tape), and the portion lined along the bottom plate may be referred to as a 'bottom plate portion' (of tape). (Note: In the example, the first plate and the second plate are the top plate 18T and the bottom plate 18B. However, broad terms, (ie 'first plate' and 'second plate') are used, since the method could feasibly be used with two plates when the two plates are not each the top plate and bottom plate, (of a same wall). It may be used for two top plates, for example, or two bottom plates, or any plates at all. Furthermore, it should be stated this method could feasibly be used on more than two plates. (This would be particularly possible with tape that is significantly wide). Thus broad terms are used. As stated, preferably the tape is separated, to separate a first portion lined along the first plate, and a second portion lined along a second plate. The plates can now be separated. This is shown in FIG. 13. The tape has been separated. The plates are shown separated, (now not next to each other). In FIG. 13, a bottom plate portion 10a of the tape can be seen. Atop plate portion 10b of the tape can also be seen. It can be seen, in the example in FIG. 13, how the first plate portion 10a of tape, (which, in the example, is the bottom plate portion of tape), and the second plate portion 10b of tape, (which, in the example, is the top plate portion of tape), each retain a portion of any gap marks that were along the tape. Thus they are both now marked. (Note: In the example, the portions of the gap marks that now mark the bottom plate may be referred to as, 'bottom plate gap mark portions'), and the portions of the gap marks that now mark the bottom plate may be referred to as 'bottom plate gap mark portions'. (In the example of FIG. 13, the bottom plate gap mark portions are numbered '14a', and the bottom plate gap mark portions are numbered '14b'. (Only several are numbered)). (More broadly, terms such as 'first plate gap mark portions', (eg numbered '14a'), and 'second plate gap mark portions', (eg numbered '14b'), etc, may be used). (Thus it can be seen, (looking, for example, at the second gap mark down from the top of the view as shown in FIG. 12), that the gap mark has been 'split', into two gap mark portions, (gap mark portion 14a and gap mark portion 14b). As stated, these may, (broadly), be termed a 'first plate gap mark portion' and a 'second plate gap mark portion'). (It is feasible this method could even be used to mark more than two plates. (The tape may have to be significantly wide, in order to achieve that). In which case, there may even be a 'third plate gap mark portion', etc, etc) Thus it can be seen, in the example of FIG. 13, that the tape has been separated. Thus it can be seen, in the example of FIG. 13, that the gap marks have been 'split', (into portions).

With reference to breaking the tape, (to break into different plate portions), preferably this is done by cutting. (This could be done via using a boxcutter, for example, or any bladed tool(s), (or anything that can be appropriately used, to cut the tape). However, it may be broken in any way. Note: Rather than the term 'break', the term 'separate' may be used here. Thus, in FIG. 12, it is clear that the example first portion 10a of tape has been separated from the example second portion 10b of tape. (As has been stated/alluded to, there could feasibly be a tearable area(s), configured for tearing, to facilitate tearing the tape, along the tape, to separate different plate portions. However, as stated, this may cause problems, (especially if the tape also comprises tearable area(s), to facilitate tearing the tape, along the tape. Yet even if a tearable area(s) to facilitate tearing the tape, along the tape, (to separate different plate portions) is not provided, it is feasible a mark(s) is provided, (as a guide), to help a user separate the tape at the right place. For example, looking at FIG. 12, if the dashed line is now interpreted, for example, as being a mark along the tape, it will be clear that it can function as a guide. This could be useful for several reasons. For example, it may help the user line the tape up correctly, along the plates. Secondly, it may help them separate the tape at the right place. Preferably, such a mark(s), (if provided), is central, along the tape. In another embodiment, something as simple as dots may be provided, (eg a dot(s) within and/or before and/or before each gap mark, for example, simply to act as a guide. (Again, this could be useful for lining up the tape along the plates, and/or for separating the tape at the right place.

With the tape having been separated, FIG. 17 shows a possible result of this, (with only one of the plates, (example plate 18T), being visible from the cut-off view shown). In FIG. 17, the bottom plate 18B and the top plate 18T have been separated, (but only example top plate 18T is visible, from the cut-off view shown).

(Note: It is feasible that the plurality of plates may not be a top plate and bottom plate, (for building of one wall). (For example, it is feasible the method of marking stud positions along a plurality of plates, simultaneously, (an example of which is shown in FIG. 12), may be done for two top plates, (of different walls), or two bottom plates, (of different walls), or for a top plate of one wall, and a bottom plate of another wall. (And, (especially if the tape is significantly wide), it is technically feasible this method could be done for more than two plates, (which may, or may not, comprise a top plate and a bottom plate of a wall, (ie may, or may not, comprise a top plate and a bottom plate of the same wall). However, it will be apparent that, in the case of what is shown in FIG. 7, and in the case of what is shown in FIG. 12, this is particularly useful when the plates are a top plate and a bottom plate of a wall, (ie are a top plate and a bottom plate of the same wall)).

(Note: As has been stated, step(s) are not necessarily provided in chronological order, (even if words such as 'then', or 'now', or 'after this' (or the like) are used), and, within reason, may be carried out in any order that is fitting/appropriate/possible. Thus the order any step(s) is described in should be assumed to simply to be a 'preferred' order. (So, similarly, the order of boxes provided in any flowchart(s) does not necessarily limit what order steps can be performed)).

Figure 27:
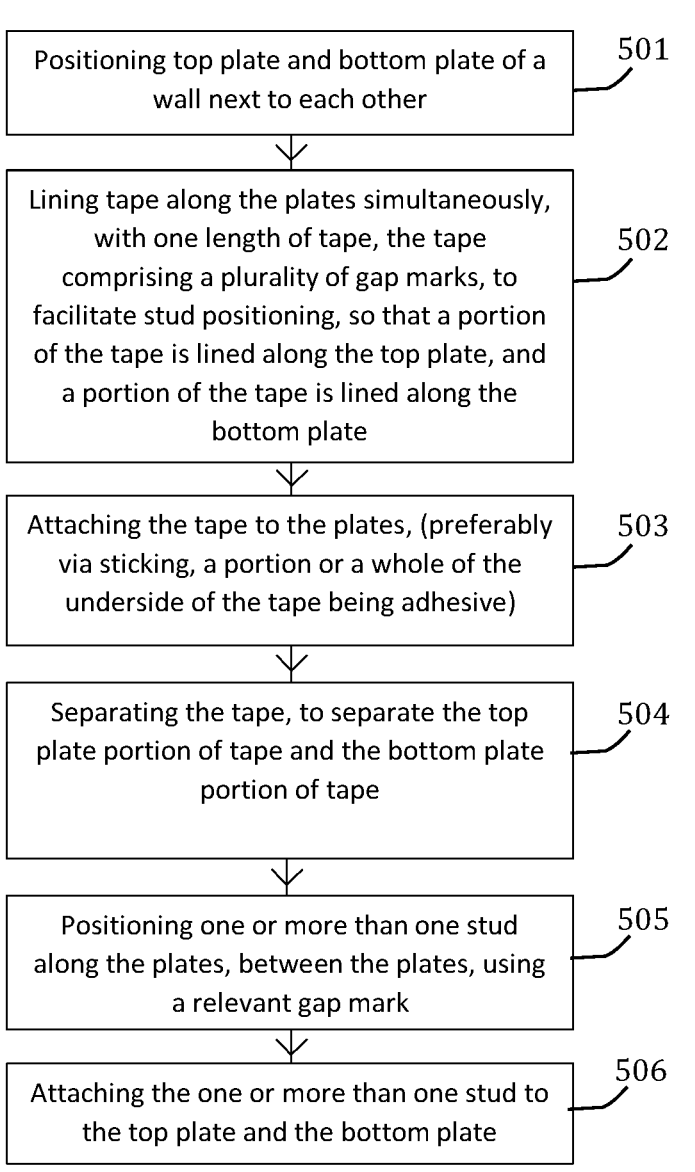
FIG. 27 is a flowchart showing a particularly preferred method of how to build a wall.

In FIG. 27, a flowchart is provided, which, in the first two boxes of the flow chart, shows a method of marking stud positions along a top plate and a bottom plate of a wall, simultaneously. In box 501, a top plate and bottom plate of a wall are positioned next to each other. (An example of this is shown in FIG. 12. In box 502, tape is lined along the plates simultaneously, with one length of tape, the tape comprising a plurality of gap marks, to facilitate stud positioning. (An example of this is shown in FIG. 12). (It can be seen that a portion of the tape is lined along the top plate, and a portion of the tape is lined along the bottom plate. In box 503, the tape is attached to the plates. (As has been stated (and heavily disclosed), this is preferably done via adhesion, a portion or a whole of the underside of the tape being adhesive. In box 504, the tape is separated, separating the bottom plate portion of tape, (lined along the bottom plate), and the top plate portion of tape, (lined along the top plate). (An example of this can be seen in FIG. 13). It can also be seen how the plates can now be separated, (as shown in FIG. 13). In box 505, one or more than one stud is positioned along the plates, between the plates, using a relevant gap mark of each plate. (An example of this is shown in FIG. 17, for example, (and FIGS. 8 and 9, for example, are also relevant). (The term 'one or more than one' is here used, not taking into account a start stud and end stud of a wall. (It will be known that a start stud and end stud tend to be positioned, right at the start and end of each plate. In such case, they do not need the tape, for positioning, because they go right at the start and end of each plate. Thus the 'one or more than one' stud refers to the stud(s) that are actually positioned, using the tape, (and thus the 'one or more than one' does not include the start and end stud, here). It will be known that there will tend to be more than one stud, (not including the start and end stud). But it is feasible, for a small wall, that there could be just one stud that the tape facilitates positioning of).

In box 506, the one or more than one stud is attached to the top plate and the bottom plate. This tends to be done with a power tool. (An example of one or more than one studs attached to the plates, using the tape, is shown in FIG. 10. (The example wall is shown, upright). Whilst the tape is on the broader side of the plates, in FIG. 10, it will be apparent that the method shown in FIGS. 12 and 13, (and alluded to, with the tape being on the thinner side of the plates, in FIG. 17), can be used, to make the wall as shown in FIG. 10. (It has also been mentioned that the method of lining tape along a plurality of plates, simultaneously, can be done, on the broader sides of the plates).

It will be apparent that any of the methods for marking stud positions along a top plate and a bottom plate of a wall, (and any of the methods for positioning a stud(s), (and any of the methods for building a wall)), may include a tearable area(s) being torn. (The user may, for example, tear a tearable area, to break the tape, after lining tape along a plate(s)).

(With reference to laying a top plate and a bottom plate of the wall next to each other, an example of this is shown in FIG. 12. (However, it should be said, whilst the example plates in FIG. 12 are oriented so that the tape can be lined up along the thin side of the plates, it is possible, (as has been mentioned), that the plates could be laid next to each other in the orientation shown in FIG. 7, for example, (imagining there were laid next to each other, rather than at a distance as is the case in FIG. 7). Tape could then be lined up along the broader side of the plates. Thus various options are possible.

The flowchart of FIG. 27 charts steps of a method of building a wall.

(Looking at FIG. 17, for example, the studs are often positioned and attached whilst the plates are facing each other, on the floor, (or any relevant surface). Thus, in such case, the wall needs to be put upright, (which may also be referred to as being 'erected'), (as shown in FIG. 10, for example).

Thus an example has been described, in use.

It should be stated, once again, that the example(s) described, in use, is/are described simply by way of example only, referring to a particularly preferred embodiment(s), and in no way limiting a scope of the invention.

According to another aspect of what is invented, there is provided an apparatus that marks gap marks along a plate, to facilitate stud positioning.

Preferably the apparatus is electronic.

Preferably the apparatus comprises an electronic interface. Thus the user may be able to choose how they want the plate marked, (so that the apparatus carries out what the user wants). For example, they may be able to mark the plate(s) for sixteen inches on centre, or twenty-four inches on centre, (or possibly both, if so desired). (The apparatus may be able to carry out marking a plate(s), with marking similar or same to any marking the tape provides, for example).

The apparatus may comprise a gap marker element, (this may also be referred to as a 'gap marker'), that is movable, (in position). (However, the apparatus may comprise any gap marker(s), not limited to being movable, (in position). There may be a plurality of gap markers. Preferably there is a gap marker(s) that is movable across the plate. Thus, as the apparatus moves along the plate, preferably a gap marker(s) can move, (in position), across the plate. This may be extremely important, to be able to create marks that go across the plate. For example, the apparatus may be able to make a line, for example, that goes across the plate, from one side of the plate, to the other. (This may be to mark a start, (or an end), of a stud position, for example). (Note: Being movable across the plate does not limit the gap marker(s) to only being movable across the plate—it may be able to move in multiple/many directions). The gap marker(s) may be slidable, (with reference to position). This it may be able to slide across the plate. (Sliding is a type of movement). Being slidable may be a particularly good method of a gap marker (s) moving. (A gap marker(s) may move in an automated manner. This may be done via software. (Thus, as the apparatus moves along the plate, movement of a gap marker (s) may not require any action from the user).

The gap marker(s), (at its most basic), may simply be an element(s) that engages, and marks, the plate. That is one way to mark a plate.

Preferably the apparatus marks the plate by laser. Thus the apparatus may comprise a laser gap marker(s). The apparatus may 'print' mark(s) onto the plate. Thus, in a preferred embodiment, the apparatus comprises a gap marker(s) that marks the plate by laser, and is slidable.

The apparatus may comprise a side guide, that guides the apparatus, as it moves along the plate. This may guide the apparatus extremely well, keeping it in position, as it moves along the plate. (An example side guide 78 can be seen in FIG. 28, (which shows the apparatus from a side view). The example side guide 78 can also be seen. In FIG. 29, (from a view as if below the apparatus). Thus it will be apparent this can guide the apparatus, as it moves along the plate. The side guide is intended to go up against (or very close to) a side of the plate, so close that it helps the apparatus travel along the plate, without veering off-course. Thus it can keep it moving in line with the plate.

The example apparatus is shown comprising an example handle, the handle comprising an example holding portion 82.

The apparatus may be able to gauge how far it has travelled. This may be done in any way. It may be done via electronic technology. For example, using laser, (eg against the/a surface the apparatus is moving along), the apparatus may be able to understand the distance it has travelled. It may be able to computer the distance. This may be important, to make sure it marks the plate in the right place(s). (Laser technology is mentioned, but any solution for how to do this may be provided. For example, use of a camera(s), (and relevant software), may be used, to gauge distance travelled. Thus various options and/or embodiments are possible.

Preferably the apparatus has feature(s) that facilitate movement, (eg wheels). In the example, of FIGS. 28 and 29, the apparatus comprises a roller(s) 53. (This is a feature to facilitate movement).

The user may be able to use the electronic interface, to choose how they want the plate marked. Thus whether it be sixteen inches on centre, twenty-four inches on centre, forty centimetres on centre, sixty centimetres on centre, or forty-five centimetres on centre, (or any combination of these, (or any other gap), the apparatus may be able to carry out. (The apparatus may be able to execute any of the gap mark configurations disclosed with reference to the tape, for example).

An example will now be described, provided simply by way of example only. Thus an example of a stud gap marking apparatus 501 is provided, in FIGS. 28 and 29, comprising: a body 66 for moving over a plate for wall building; and a gap marking arrangement, to mark gap marks along the plate, as the body moves along the plate, to facilitate correct stud placement along the plate. (In FIG. 28, there is shown an example of such an apparatus, for example).

Figure 28:
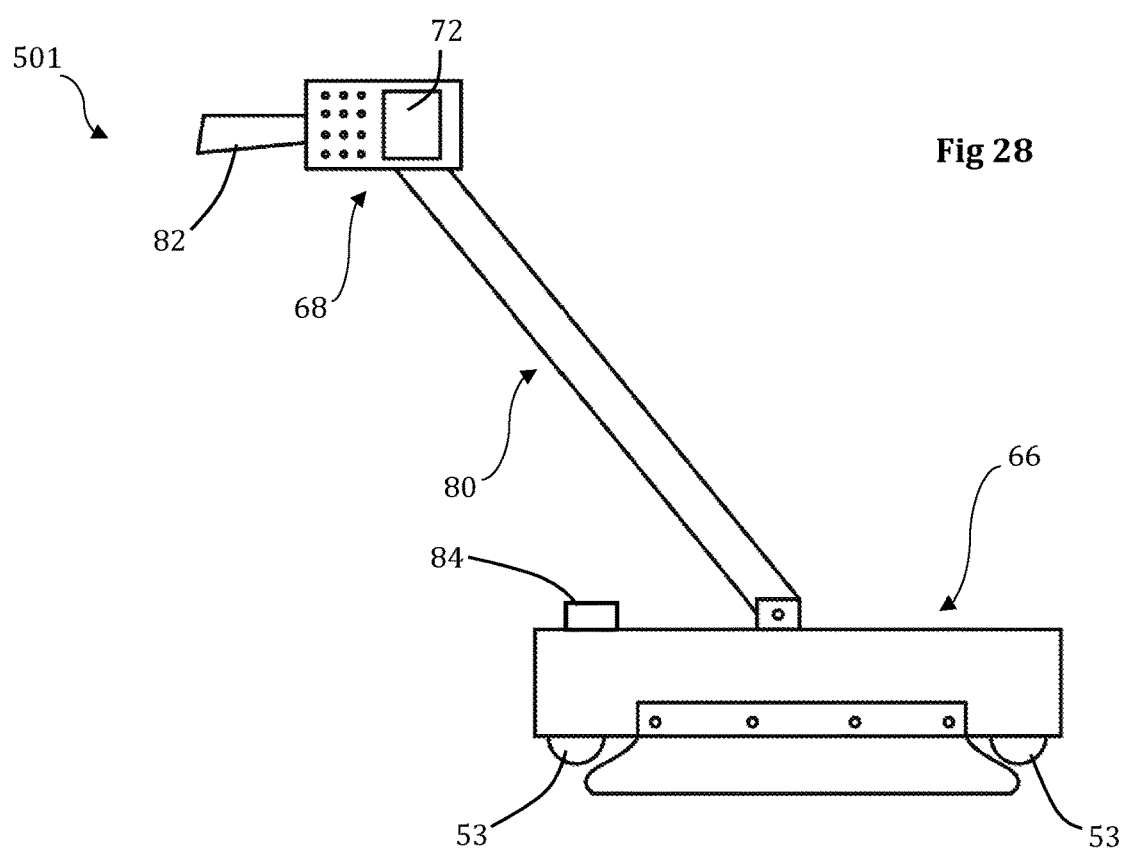
FIG. 28 is a side view of an example stud gap marking apparatus, which in the example comprises a laser element, to facilitate gap marking.
Figure 29:
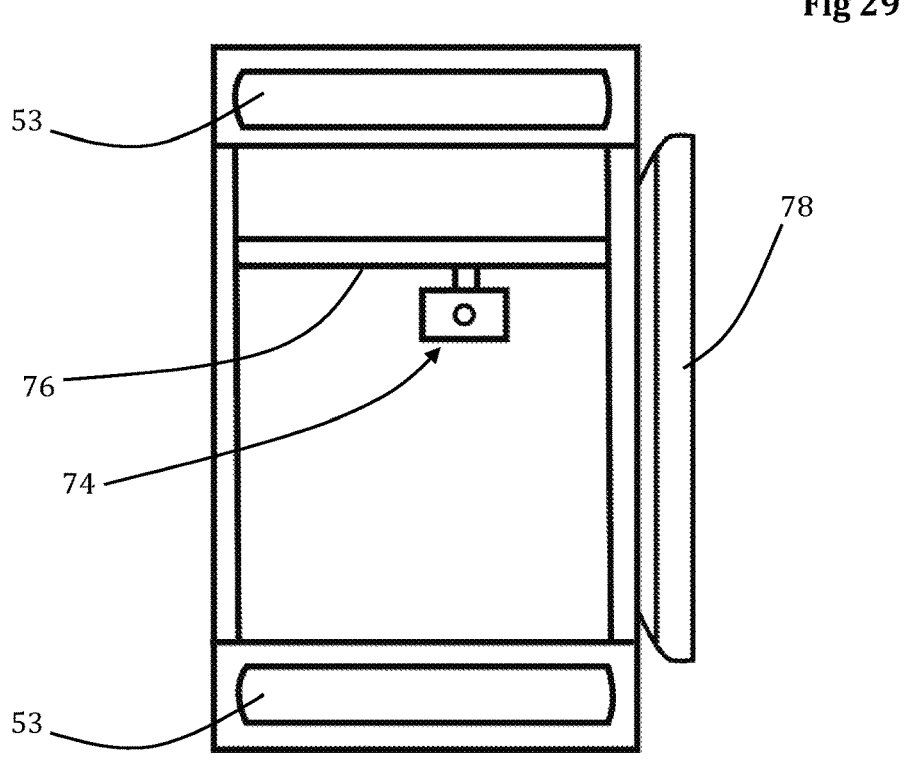
FIG. 29 is a view, from below, of the example body of the example stud gap marking apparatus of FIG. 28, showing an embodiment of a gap marker that marks by laser, wherein the gap marker is slidable in position.

(The example shown in FIGS. 28 and 29 is an example of a gap marking apparatus that comprises an electronic gap marking arrangement. (It is an example of a gap marking apparatus that comprises an electronic gap marking arrangement that electronically marks gaps along the plate)).

(Relating to use of the term 'electronic' in the present application, the term is used to broadly mean 'in any way involving electronics'—eg an apparatus/device which in any way uses electronics, to fulfil its end, is deemed an 'electronic apparatus/device').

It is feasible the apparatus may be an electronic apparatus, that electronically determines position of the gap marks. (An example of this is shown in the example(s) of FIGS. 28 and 29).

It is feasible the apparatus may comprise an electronic interface 68, to facilitate the user in choosing how they want the plate marked. (An example of this is shown in FIGS. 28 and 29). The user may be able to input gap distance data via the electronic interface, for example. In the example, the electronic interface is provided generally around the handle area. However, it should be stated, the/an electronic interface may be provided anywhere about the apparatus. (Eg it may be provided on (and/or incorporated into) the body 66). Furthermore, in the example shown, the electronic interface is not incorporated into the apparatus. In fact, in the example (or any example), it may even be removably attachable. However, in other embodiments, the or any electronic interface may be incorporated into the apparatus (partially or wholly).

In the example, the electronic interface comprises user means to input and/or select gap distance data. (This is represented by way of various buttons and/or keys shown. However, this may also be achieved via touch-screen, for example, (and/or by various other means, not limited to the examples given). In the example, the electronic interface comprises a screen 72. Thus data may be shown on the screen. (The screen may be used, to view data, and/or to choose how they want the plate marked, (eg via inputting gap distance data).

The user may be able to select how they want the plate marked, via the electronic interface.

The electronic interface may allow for altering gap distance. (eg A user, for one job, may select (via the electronic interface) to have gaps of sixteen inches. For another job, the user, may select (via the electronic interface) to have gaps of twenty four inches, for example).

Thus the (or any) electronic interface may be used, to choose how the plate is marked.

The gap marking arrangement may comprise a laser element 74. (An example laser element 74 is shown in FIG. 29, (not visible from the view shown in FIG. 28). (This is an embodiment wherein the apparatus marks the plate by laser). The laser element may laser print the gap marks on the plate.

In the example embodiment, (provided by way of example only), the apparatus comprises an example slide arrangement 76, to facilitate the laser element sliding, to mark the gap. (An example of a slide arrangement 76 is shown in FIG. 29, where an underside of the example body 66 shown in FIG. 28 and FIG. 29 is shown. It can be seen how the laser element is thus able to slide along the slide arrangement. (This (ie the laser element sliding) is preferably done electronically. Preferably this is done substantially automatically, once the apparatus is in use, moving along the plate. (The term 'slide mechanism' may also be used).

The gap marking arrangement may utilise ink to make the gap mark on the plate. (The ink (and apparatus) may function very much like a paper printer (often used with home computers, for example). Thus the ink may ink similar or same to as used for a computer printer, for example). (It should also be stated, the apparatus may 'etch' the mark(s) on the plate. Thus a laser element(s) may etch a gap mark(s) on the plate. (In various types of laser, heat, for example, of the laser is able to cause etching).

(It is even feasible the gap marking arrangement may use (and thus comprise) a pencil. Thus a pencil could be moved, to make the mark. (This is just one example, (provided by way of example only), of a gap marker that engages the plate, to mark the plate).

Gap distance may be determined by laser. Thus the stud gap marking apparatus may comprise at least one laser element, to facilitate determining stud gap distance.

Thus the apparatus may comprise a laser arrangement, to facilitate determining gap distance. Thus the apparatus may comprise a laser arrangement that marks the (or any) gap mark(s), (eg by etching and/or printing). It is feasible the same laser arrangement both facilitate determining gap distance, and marks the (or any) gap mark(s). However, it is also feasible the apparatus comprises a laser arrangement, to facilitate determining gap distance; and also comprises another laser arrangement that marks the (or any) gap mark(s). (It should also be stated, the apparatus may print the (or any) gap mark(s), (not at all limited to laser printing). Thus any feature(s)/arrangement may be provided, to facilitate printing. For example, the apparatus may carry out ink printing, of any type, for example. (There may also then feasibly be a laser arrangement, to facilitate determining gap distance, for example. Thus various options and/or embodiments are possible). (With reference to the (or any) 'laser arrangement', there may be just one laser element, or the laser arrangement may comprise a plurality of laser elements. Thus it is feasible the (or any) laser arrangement may comprise a plurality of laser elements)).

(The (or any) gap marking arrangement may comprise a laser arrangement).

What is shown in FIGS. 28 and 29 is an example of: a stud gap marking apparatus, comprising: a body 66 for moving over a plate for wall building; and a laser arrangement, to facilitate marking gap marks along the plate. Thus disclosure has been provided of: a stud gap marking apparatus, comprising: a body for moving over a plate for wall building; and a laser arrangement, to facilitate marking gap marks along the plate.

The apparatus may comprise a rotational movement arrangement, to facilitate moving along the plate. A rotational movement arrangement comprises at least one rotational element. An example of a rotational element is a wheel. Another example of a rotational element is a roller. Thus the apparatus may comprise a wheel(s), to facilitate moving along the plate. Thus the apparatus may comprise roller(s) (which is a roller element(s)), to facilitate moving along the plate. In the example of FIGS. 28, and 29, the apparatus comprise a plurality of rollers 53). The apparatus may comprise a rotational element that is of a circumference that facilitates marking the gap on the plate, at the regular intervals. (Thus the circumference of the or any rotational element may match the gap distance that is marked on the plate, by the apparatus, for example).

The (or any) rotational element may comprise a gap indicator.

The apparatus may comprise a rotational movement element(s) at a front end of the apparatus as it moves across the plate, and a rotational movement element(s) at a back end of the apparatus as it moves across the plate. (An example of this is shown in FIGS. 28 and 29, where it is clear there is a roller 53 at the front end, and a roller at the back end. In other embodiments, there may be a wheel(s) at the front end, and a wheel(s) at the back end).

In other embodiments, the body 66 may simply slide along the plate. (Thus the apparatus is not limited to comprising a rotational movement arrangement, to facilitate moving along the plate).

The apparatus may comprise a side guide 78. In the example embodiment, there is an example side guide 78 that, in use, goes lower than a top surface of the plate, to facilitate guiding the body as it moves along the plate. (Thus the apparatus can be guided (by the side guide) to move in a substantially straight manner, over the plate). The side guide may, for example, gently engage a side of the plate, in use, thus guiding the apparatus. In other embodiments, there may be provided a side guide at both sides of the body, (rather than just a side guide for one side, as in the example of FIG. 29). Thus the apparatus may comprise a said side guide to guide at each side of the plate. Thus disclosure is provided of an embodiment of the apparatus comprising a plurality of guide elements that, in use, go lower than the top surface of the plate. It is feasible that there are provided more than two side guides, (eg a plurality at each side). Thus disclosure of a guide element(s) is provided. Thus a guide element(s), to guide the apparatus as it moves along the plate, is disclosed.

The or any side guide may be movable inwards and outwards, laterally. This may be useful, for the side guides to get close to (and/or engage) the side(s) of the plate, to help guide the apparatus. In some embodiments, the user may be able to manipulate (ie move) the (or any) side guide, inwardly and outwardly, to achieve this. In some embodiments, it is feasible a spring may spring loadedly help the (or any) side guide move inward, toward the plate.

The apparatus may comprise a handle arrangement. In the example, the handle arrangement comprises a handle body 80. The handle body (as shown in the example) may extend upwards (with reference to the floor (and plate)). Thus this, in the example shown, allows a user to use the apparatus whilst standing. The handle arrangement may comprise a portion 82 for holding. The example shown in FIG. 28 is an example of wherein the stud gap marking apparatus comprises a handle body operable at an angle that extends upwards from the body of the device, (away from the plate, in use). (Note: It may be possible to change the angle of the, (or any of the), handle arrangement (eg the handle body). Thus it may be possible to rotate/pivot the handle body to a different angle, (eg parallel with (or close/closer to parallel with) the floor. (Whether the angle of the handle body can be changed or not, what is shown is an example of a handle body operable at an angle that extends upwards (from the body of the device), (away from the plate, in use)).

If the apparatus comprises a handle arrangement, then hopefully it is longer than length of the body 66 that moves along the plate. If the apparatus comprises a handle arrangement, then hopefully it is longer than width of the body 66 that moves along the plate.

The apparatus may be powered via use of a plug (eg to go into a mains electricity socket) and cord, for example. In the example of FIG. 28, the apparatus comprises an example battery 84, (denoted in basic fashion). Preferably the battery is removably attachable. In the example, the battery is located partially or wholly within the example body 66. In other examples, it may be located wholly within the body. The (or any) battery is not limited to being located partially or wholly within the body, and may be located anywhere about the apparatus. It may be located partially or wholly within any part/area of the apparatus. Preferably the battery is rechargeable.

The embodiments described above are provided by way of example only, and various other modifications will be apparent to persons skilled in the art without departing from the scope of the invention as defined in the appended claims. Broader and/or Different Invention(s) May be Claimed (and are Supported)

The appended claims define limited inventions. However, it should be recognized and understood that the disclosure of the present application includes a vast array of inventions, not limited to inventions set out in the appended claims and/or any statement(s) of invention.

For example, if the present disclosure of the present application (inclusive of drawing(s) and/or description) discloses features a to z, it should be recognized and understood that any invention may be claimed, comprising any feature (s) out of features a to z. Thus if the appended claim 1 defines the invention claimed as comprising essential features a, b, and c, it should be understood that an invention may be claimed comprising solely feature a, or solely feature b, or solely feature c, or any combination of features a, b, and c. Furthermore, it should be understood that an invention may be claimed comprising any of feature(s) d to z, whether or not also comprising any of features a, b, or c.

Furthermore, no feature disclosed is limited to only being set forth in a claim when used in conjunction with other particular feature(s) it is disclosed with in the specification, but may be claimed with any other feature or combination of features disclosed in the present application. Thus if a feature is disclosed 'clustered' with several other feature(s) when disclosed in the specification, the applicant(s) nevertheless reserves the right to 'extract' that feature(s) from the several other feature(s) it is disclosed with, and set it forth in a claim, combined with any other feature(s) disclosed in the present application, which other feature(s) may, or may not, also be 'extracted' from any other feature(s) they are clustered with in the disclosure of the present application. Thus any permutation/combination of features may be claimed for patent in a future claim and/or patent application.

A final claim is (or may be) appended which serves to signify that I reserve the right to claim any invention (ie 'thing'), comprising any feature, or combination of features, disclosed in the present application (inclusive of drawing(s) and/or description). This statement (and/or final appended claim), if so desired, should be seen as a statement of invention, stating any invention (ie 'thing'), comprising any feature, or combination of features disclosed in the present application (in any permutation/combination). The applicant (s) reserves the right to claim any (such) invention (ie 'thing'), and considers an objection by a patent office/examiner (stating that such an invention is not supported by/disclosed in the present application) to be in direct conflict with this statement of invention. Thank you to the relevant patent office/examiner for taking note of this. It is intended (or plausible) that such invention(s) may be claimed in a future application(s) which claims benefit of priority of the present application, or, for example, in future filed claims of the present application. The present disclosure of the present application supports such invention(s)/claim(s).

Adjectival and Adverbial Use, in the Present Application, does not Limit the Ability to Claim without the Adjective/Adverb In the present application, adjectival definition of a noun/feature in no way limits the ability to claim, (or in any way include in a claim(s)), the noun/feature, without the adjective. Thus if a 'curved edge' is disclosed, it should be understood that it is disclosed simply by way of example, as an embodiment of 'an edge', and that an invention may be claimed, comprising an 'edge', and not limited to comprising a 'curved edge', even if the only disclosure in the specification is of a 'curved edge'. This goes for every single adjective example in the present application, and also applies to adverbs in the same way, with reference to how they limit a broader verb/action, which verb/action/characterizing feature may be included in a claim (and is supported), not limited by the adverb that further defines it. This also applies to 'usage for' definitions. Thus if an instrument/apparatus, for example, is described, with reference to use for a particular thing (eg a 'pet cleaning apparatus', (which is therefore a cleaning apparatus, for use on pets)), then a 'cleaning apparatus' may be claimed, (or in any way be included in a claim(s)), not limited to being a 'pet' cleaning apparatus and/or not limited to being for use on pets, even if all disclosure in the patent application relates to a 'pet cleaning apparatus'.

The Title Of The Present Application Does Not Limit What May Be Claimed

The title of the present application (and the claims presented) do not limit what may be claimed futurely, based upon (and supported by) the present application. For example, if the title is 'Pet Cleaning Apparatus', even if all disclosure in the patent application relates to a pet cleaning apparatus (as do the claims), nevertheless, a 'cleaning apparatus' may be claimed (not limited to being for pets), as it is clear a 'pet cleaning apparatus' is an embodiment of a 'cleaning apparatus'. As stated previously, in the present application, adjectival definition of a noun in no way limits the ability to claim, (or in any way include in a claim(s)), the noun, without the adjective. This also applies to the title. Furthermore, an invention may be claimed comprising any feature, or combination of features, disclosed in the present application.

Any Feature Disclosed May be More Broadly Defined/Claimed as a Feature/Arrangement Any feature (for/with a given purpose) disclosed in the present application, whatever it is disclosed or defined as, may be more broadly defined in a claim as a feature (or arrangement) for the given purpose. Thus, if, for example, in the present application, a 'pin' is disclosed, for holding element 'a' and element 'b' together, such disclosure supports definition in a claim (in this, or a future patent application that claims benefit of priority to the present patent application) of a 'holding feature' (or 'holding arrangement'), for holding element 'a' and element 'b' together. This is the case for all feature(s)/disclosure, even including feature(s) defined in any statement(s) of invention and/or title of the invention.

Feature(s) Shown in the Drawings May be Combined to Form an Invention

Any feature(s) or combination of feature(s) shown in any drawing(s) may be combined with any other feature(s) or combination of feature(s) shown in any other drawing(s), to form an invention, which may be claimed. This may be the case for any embodiment shown in any drawing(s), and applicant(s) reserves the right to claim any such invention (s). Furthermore, such feature(s) may, of course, be combined with any other feature(s) and/or disclosure of the present application, to form an invention(s), which may be claimed. Such an invention(s) may be claimed in a future application(s) which claims benefit of priority of the present application, or, for example, in future filed claims of the present application. The present disclosure of the present application supports such invention(s)/claim(s).

The invention claimed is:

1. A method of stud positioning for wall building, comprising:

lining a stud gap marker tape along a plate, the stud gap marker tape comprising a plurality of gap marks, visible on a top side of the tape, that define stud positions at repeating 8-inch intervals that may or may not be used for positioning a stud at, a centre of one of the stud positions being at a start of the plate, the stud gap marker tape thus being configured to facilitate both;

stud positioning at each 16-inch interval taken from the start of the plate via using an interval of two said gap marks as a guide for stud positioning; and stud positioning at each 24-inch interval taken from the start of the plate via using an interval of three said gap marks as a guide for stud positioning; and using an interval of two said gap marks as a guide for stud positioning, positioning a stud, centred, at each 16-inch interval taken from the start of the plate that occurs between the start of the plate and an end of the plate, not including where stud positioning would encroach on position of an end stud positioned at the end of the plate.

2. A method of stud positioning for wall building as claimed in claim 1, wherein the plate is now defined as a first plate, and wherein the method comprises:

lining another length of the stud gap marker tape along a second plate in the same way as defined in claim 1 for the first plate, the first plate and the second plate thus being correspondingly marked;

positioning an opposing end of each said centred stud at the same corresponding position along the second plate as it is positioned along the first plate, using the same interval of said gap marks as a guide for stud positioning, using the other length of the stud gap marker tape lined along the second plate.

3. A method of stud positioning for wall building as claimed in claim 2, wherein the method comprises:

positioning a start stud at the start of the first plate, the start stud starting at the start of the first plate, and positioning an opposing end of the start stud at the start of the second plate, the opposing end of the start stud starting at the start of the second plate; and positioning a said end stud at the end of the first plate, the end stud ending at the end of the first plate, and positioning an opposing end of the end stud at the end of the second plate, the opposing end of the end stud ending at the end of the second plate.

4. A method of stud positioning for wall building as claimed in claim 1, wherein the plate is now defined as a first plate, and wherein the method comprises:

lining a second plate alongside the first plate with a start of the second plate lined up with the start of the first plate;

marking both plates with the stud gap marker tape, using only a single length of the stud gap marker tape, by having the single length of the stud gap marker tape running along both the plates at the same time as the plates are lined alongside each other, the plates thus sharing the same single length of the stud gap marker tape;

separating the single length of stud gap marker tape, leaving each plate lined with a portion of the single length of stud gap marker tape; and positioning an opposing end of each said centred stud at the same corresponding position along the second plate as it is positioned along the first plate, using the same interval of said gap marks as a guide for stud positioning, using the portion of the single length of stud gap marker tape lined along the second plate.

5. A method of stud positioning for wall building as claimed in claim 4, wherein the method comprises:

positioning a start stud at the start of the first plate, the start stud starting at the start of the first plate, and positioning an opposing end of the start stud at the start of the second plate, the opposing end of the start stud starting at the start of the second plate; and positioning a said end stud at the end of the first plate, the end stud ending at the end of the first plate, and positioning an opposing end of the end stud at the end of the second plate, the opposing end of the end stud ending at the end of the second plate.

6. A method of stud positioning for wall building as claimed in claim 1, wherein the method comprises:

positioning a start stud at the start of the plate, the start stud starting at the start of the plate;

positioning a said end stud at the end of the plate, the end stud ending at the end of the plate.

7. A method of stud wall building, comprising:

the method of stud positioning as defined in claim 6;

wherein the method of stud wall building further comprises:

attaching each said stud to the plate.

8. A method of stud positioning for wall building as claimed in claim 1, wherein the method comprises:

prior to lining the stud gap marker tape along the plate, a tearable area of the stud gap marker tape being torn, thus creating a torn area, the tearable area being configured for tearing, to facilitate tearing the tape, across the tape, and being shaped and positioned to facilitate lining up said centre of said one of the stud positions with the start of the plate by lining the stud gap marker tape along the plate with at least a portion of the torn area being at the start of the plate; and lining the stud gap marker tape along the plate with the at least a portion of the torn area being at the start of the plate.

9. A method of stud positioning for wall building as claimed in claim 1, wherein the method comprises:

attaching the stud gap marker tape to the plate.

10. A method of stud positioning for wall building as claimed in claim 9, wherein the method comprises attaching the stud gap marker tape to the plate via adhering the stud gap marker tape to the plate, a portion or a whole of an underside of the stud gap marker tape being adhesive.

11. A method of stud positioning for wall building, comprising:

lining a stud gap marker tape along a plate, the stud gap marker tape comprising a plurality of gap marks, visible on a top side of the tape, that define stud positions at repeating 8-inch intervals that may or may not be used for positioning a stud at, a centre of one of the stud positions being at a start of the plate, the stud gap marker tape thus being configured to facilitate both:

stud positioning at each 16-inch interval taken from the start of the plate via using an interval of two said gap marks as a guide for stud positioning; and stud positioning at each 24-inch interval taken from the start of the plate via using an interval of three said gap marks as a guide for stud positioning;

and using an interval of three said gap marks as a guide for stud positioning, positioning a stud, centred, at each 24-inch interval taken from the start of the plate that occurs between the start of the plate and an end of the plate, not including where stud positioning would encroach on position of an end stud positioned at the end of the plate.

12. A method of stud positioning for wall building as claimed in claim 11, wherein the plate is now defined as a first plate, and wherein the method comprises:

lining another length of the stud gap marker tape along a second plate in the same way as defined in claim 1 for the first plate, the first plate and the second plate thus being correspondingly marked;

positioning an opposing end of each said centred stud at the same corresponding position along the second plate as it is positioned along the first plate, using the same interval of said gap marks as a guide for stud positioning, using the other length of the stud gap marker tape lined along the second plate.

13. A method of stud positioning for wall building as claimed in claim 12, wherein the method comprises:

positioning a start stud at the start of the first plate, the start stud starting at the start of the first plate, and positioning an opposing end of the start stud at the start of the second plate, the opposing end of the start stud starting at the start of the second plate; and positioning a said end stud at the end of the first plate, the end stud ending at the end of the first plate, and positioning an opposing end of the end stud at the end of the second plate, the opposing end of the end stud ending at the end of the second plate.

14. A method of stud positioning for wall building as claimed in claim 11, wherein the plate is now defined as a first plate, and wherein the method comprises:

lining a second plate alongside the first plate with a start of the second plate lined up with the start of the first plate;

marking both plates with the stud gap marker tape, using only a single length of the stud gap marker tape, by having the single length of the stud gap marker tape running along both the plates at the same time as the plates are lined alongside each other, the plates thus sharing the same single length of the stud gap marker tape;

separating the single length of stud gap marker tape, leaving each plate lined with a portion of the single length of stud gap marker tape; and positioning an opposing end of each said centred stud at the same corresponding position along the second plate as it is positioned along the first plate, using the same interval of said gap marks as a guide for stud positioning, using the portion of the single length of stud gap marker tape lined along the second plate.

15. A method of stud positioning for wall building as claimed in claim 14, wherein the method comprises:

positioning a start stud at the start of the first plate, the start stud starting at the start of the first plate, and positioning an opposing end of the start stud at the start of the second plate, the opposing end of the start stud starting at the start of the second plate; and positioning a said end stud at the end of the first plate, the end stud ending at the end of the first plate, and positioning an opposing end of the end stud at the end of the second plate, the opposing end of the end stud ending at the end of the second plate.

16. A method of stud positioning for wall building as claimed in claim 1, wherein the method comprises:

positioning a start stud at the start of the plate, the start stud starting at the start of the plate;

positioning a said end stud at the end of the plate, the end stud ending at the end of the plate.

17. A method of stud wall building, comprising:

the method of stud positioning as defined in claim 16;

wherein the method of stud wall building further comprises:

attaching each said stud to the plate.

18. A method of stud positioning for wall building as claimed in claim 11, wherein the method comprises:

prior to lining the stud gap marker tape along the plate, a tearable area of the stud gap marker tape being torn, thus creating a torn area, the tearable area being configured for tearing, to facilitate tearing the tape, across the tape, and being shaped and positioned to facilitate lining up said centre of said one of the stud positions with the start of the plate by lining the stud gap marker tape along the plate with at least a portion of the torn area being at the start of the plate; and lining the stud gap marker tape along the plate with the at least a portion of the torn area being at the start of the plate.

19. A method of stud positioning for wall building as claimed in claim 11, wherein the method comprises:

attaching the stud gap marker tape to the plate.

20. A method of stud positioning for wall building as claimed in claim 19, wherein the method comprises attaching the stud gap marker tape to the plate via adhering the stud gap marker tape to the plate, a portion or a whole of an underside of the stud gap marker tape being adhesive.

* * * * *